United States Patent
Kang et al.

(10) Patent No.: US 11,349,978 B2
(45) Date of Patent: May 31, 2022

(54) ELECTRONIC DEVICE FOR TRANSMITTING AND RECEIVING MESSAGE INCLUDING EMOJI AND METHOD FOR CONTROLLING ELECTRONIC DEVICE

(71) Applicant: Samsung Electronics Co., Ltd., Suwon-si (KR)

(72) Inventors: Donggoo Kang, Suwon-si (KR); Para Kang, Suwon-si (KR); Joohee Park, Suwon-si (KR); Sohmin Ahn, Suwon-si (KR); Eunyoung Lim, Suwon-si (KR); Gulji Chung, Suwon-si (KR); Sangchul Yi, Suwon-si (KR); Chouljun Hwang, Suwon-si (KR); Cheolho Cheong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 43 days.

(21) Appl. No.: 16/954,369

(22) PCT Filed: Dec. 27, 2018

(86) PCT No.: PCT/KR2018/016797
§ 371 (c)(1),
(2) Date: Jun. 16, 2020

(87) PCT Pub. No.: WO2019/132555
PCT Pub. Date: Jul. 4, 2019

(65) Prior Publication Data
US 2021/0084137 A1    Mar. 18, 2021

(30) Foreign Application Priority Data
Dec. 27, 2017  (KR) .......................... 10-2017-0181530

(51) Int. Cl.
H04M 1/72427    (2021.01)
H04M 1/72463    (2021.01)
(Continued)

(52) U.S. Cl.
CPC ........ H04M 1/72427 (2021.01); G06F 21/36 (2013.01); G06Q 20/4014 (2013.01);
(Continued)

(58) Field of Classification Search
USPC ........ 379/29.1, 88.11, 88.13, 102.02, 201.01
See application file for complete search history.

(56) References Cited

U.S. PATENT DOCUMENTS 5,987,508 A    11/1999  Agraharam et al.
8,918,339 B2   12/2014  Rubinstein et al.
(Continued)

FOREIGN PATENT DOCUMENTS

CN    103765465 A    4/2014
CN    103870957 A    6/2014
(Continued)

OTHER PUBLICATIONS

European Search Report dated on Nov. 16, 2020, issued in European Application No. 18896868.9-1216.
(Continued)

Primary Examiner — Yosef K Laekemariam
(74) Attorney, Agent, or Firm — Jefferson IP Law, LLP

(57) ABSTRACT

Disclosed is an electronic device including a communication interface connecting to an external device, an input interface receiving a user input, a memory storing at least one application, a display displaying an image, and a processor electrically connected to the communication interface, the input interface, the memory, and the display. The processor displays a user interface (UI) of a first application for transmitting or receiving a message stored in the memory, on
(Continued)

a display, receives a user input for transmitting an emoji, to which a specified function is set, to an external electronic device through the input interface, obtains information necessary to perform the specified function, using identification information of the external electronic device, includes the obtained information in the emoji such that the external electronic device performs the specified function through the emoji, displays the emoji on the UI displayed on the display, and transmits the emoji to the external electronic device through the communication interface. Other various embodiments as understood from the specification are also possible.

18 Claims, 40 Drawing Sheets

(51) Int. Cl.
  *G06F 21/36* (2013.01)
  *G06Q 20/40* (2012.01)
  *G07C 9/00* (2020.01)

(52) U.S. Cl.
  CPC .... *G07C 9/00309* (2013.01); *H04M 1/72463* (2021.01); *G07C 2009/00515* (2013.01)

(56) References Cited

U.S. PATENT DOCUMENTS

| | | | |
|---|---|---|---|
| 8,947,982 B2 | 2/2015 | Lee et al. | |
| 9,049,161 B2 | 6/2015 | Durand et al. | |
| 9,508,072 B2 | 11/2016 | Granbery | |
| 9,571,611 B2 | 2/2017 | Suryavanshi | |
| 10,033,678 B2 | 7/2018 | Venkatakrishnan et al. | |
| 10,084,738 B2 | 9/2018 | Venkatakrishnan et al. | |
| 10,127,544 B2* | 11/2018 | McElmurry | G06Q 20/386 |
| 10,210,002 B2 | 2/2019 | Zheng | |
| 10,298,534 B2 | 5/2019 | Rubinstein et al. | |
| 10,298,739 B2 | 5/2019 | Lee et al. | |
| 10,482,163 B2 | 11/2019 | Hullette et al. | |
| 10,764,222 B2 | 9/2020 | Venkatakrishnan et al. | |
| 10,817,866 B2 | 10/2020 | McElmurry et al. | |
| 10,931,622 B1 | 2/2021 | Rubinstein et al. | |
| 10,955,991 B2 | 3/2021 | Harper | |
| 11,295,282 B2 | 4/2022 | Venkatakrishnan et al. | |
| 2005/0160149 A1 | 7/2005 | Durand et al. | |
| 2010/0299400 A1 | 11/2010 | Durand et al. | |
| 2013/0054459 A1 | 2/2013 | Granbery | |
| 2013/0148474 A1 | 6/2013 | Lee et al. | |
| 2013/0300867 A1* | 11/2013 | Yoder | H04N 7/18 348/143 |
| 2014/0052633 A1 | 2/2014 | Gandhi | |
| 2014/0378105 A1 | 12/2014 | Suryavanshi | |
| 2015/0088699 A1 | 3/2015 | Rubinstein et al. | |
| 2015/0200881 A1 | 7/2015 | Zheng | |
| 2016/0171481 A1 | 6/2016 | McElmurry, IV et al. | |
| 2016/0261675 A1* | 9/2016 | Block | G06F 3/0481 |
| 2017/0041272 A1* | 2/2017 | Chang | G06F 3/0488 |
| 2017/0118154 A1 | 4/2017 | Venkatakrishnan et al. | |
| 2017/0131870 A1 | 5/2017 | Harper | |
| 2017/0161238 A1 | 6/2017 | Fang | |
| 2018/0315029 A1 | 11/2018 | Kim | |
| 2019/0087811 A1 | 3/2019 | McElmurry | |
| 2020/0081960 A1 | 3/2020 | Hullette et al. | |
| 2020/0133464 A1 | 4/2020 | Harper | |
| 2021/0103912 A1 | 4/2021 | McElmurry et al. | |

FOREIGN PATENT DOCUMENTS

| | | |
|---|---|---|
| CN | 104123639 A | 10/2014 |
| CN | 104412286 A | 3/2015 |
| CN | 206193905 U | 5/2017 |
| CN | 107251071 A | 10/2017 |
| CN | 107453974 A | 12/2017 |
| EP | 2667339 A1 | 11/2013 |
| EP | 3 073 682 A1 | 9/2016 |
| JP | 2003-163744 A | 6/2003 |
| KR | 10-2011-0005555 A | 1/2011 |
| KR | 10-1195741 B1 | 11/2012 |
| KR | 10-2017-0017289 A | 2/2017 |
| KR | 10-2017-0047797 A | 5/2017 |
| KR | 10-1757408 B1 | 7/2017 |
| KR | 10-2017-0094226 A | 8/2017 |
| WO | 2012/121555 A2 | 9/2012 |
| WO | 2015/163937 A1 | 10/2015 |
| WO | 2016/099493 A1 | 6/2016 |
| WO | 2017/044300 A1 | 3/2017 |
| WO | 2017/075515 A1 | 5/2017 |
| WO | 2017/078446 A1 | 5/2017 |

OTHER PUBLICATIONS

European Search Report dated Mar. 19, 2021, issued in European patent application No. 18896868.9-1216.
Chinese Office Action dated Mar. 23, 2021, issued in Chinese Application No. 201880084346.0.
Indian Office Action dated Nov. 10, 2021, issued in Indian Patent Application No. 202047028173.
Chinese Notice of Allowance dated Apr. 1, 2022, issued in Chinese Patent Application No. 201880084346.0.

\* cited by examiner

ELECTRONIC DEVICE FOR TRANSMITTING AND RECEIVING MESSAGE INCLUDING EMOJI AND METHOD FOR CONTROLLING ELECTRONIC DEVICE

TECHNICAL FIELD

Embodiments disclosed in this specification relates to a technology for transmitting or receiving a message.

BACKGROUND ART

With the development of the related technologies according to the distribution of mobile devices such as smartphones and tablet PCs, a mobile electronic device provides users with various functions such as a multimedia playback function, a game function, an Internet function, and the like in addition to simple calls and text message functions.

The technology for transmitting a message may transmit a message including multimedia, such as a picture, a video, or the like as well as a text. Furthermore, the message technology may transmit a message including an emoji expressed by one image or a plurality of image frames. A user may effectively deliver the user's intent, emotional state, or the like, using the emoji.

DISCLOSURE

Technical Problem

When an electronic device sets a specified function to an emoji such that a specified function is capable of being performed through an emoji by a reception device, it may be difficult to set various functions, to which security technologies requiring information associated with the reception device and a recipient are applied, to the emoji. Besides, the electronic device may fail to perform the function set to the emoji in the reception device by setting the function difficult to perform in the reception device in the emoji.

According to an embodiment of the disclosure, the electronic device may set various and performable functions in the emoji, using the information of the reception device and a recipient. In other words, the electronic device may set and transmit the predetermined function to the emoji such that the specified function is capable of being performed through the emoji by the reception device. At this time, to set various functions in the emoji based on information associated with the reception device and the recipient, the electronic device may use security information or may perform an authentication process for accessing the security information. In addition, the electronic device may assign at least part of resources (e.g., a memory, a function control authority, or the like) of the electronic device using emoji such that the reception device receiving the emoji, to which the predetermined function is set, is capable of performing the function set to the emoji.

Technical Solution

According to an embodiment disclosed in this specification, an electronic device may include a communication interface connecting to an external device, an input interface receiving a user input, a memory storing at least one application, a display displaying an image, and a processor electrically connected to the communication interface, the input interface, the memory, and the display. The processor may display a user interface (UI) of a first application for transmitting or receiving a message stored in the memory, on a display, may receive a user input for transmitting an emoji, to which a specified function is set, to an external electronic device through the input interface, may obtain information necessary to perform the specified function, using identification information of the external electronic device, may include the obtained information in the emoji such that the external electronic device performs the specified function through the emoji, may display the emoji on the UI displayed on the display, and may transmit the emoji to the external electronic device through the communication interface.

Furthermore, according to an embodiment disclosed in this specification, an electronic device may include a communication interface connecting to an external device, an input interface receiving a user input, a memory storing at least one application, a display displaying an image, and a processor electrically connected to the communication interface, the input interface, the memory, and the display. The processor may receive an emoji including information necessary to perform a specified function through the communication interface, may display a UI of an application for transmitting or receiving a message stored in the memory, on a display, may display the emoji on a UI displayed on the display, may receive a user input for performing the specified function through the input interface, and may perform the specified function, using information included in the emoji. The information necessary to perform the specified function may be obtained using identification information of the electronic device.

Advantageous Effects

According to embodiments disclosed in the specification, when generating an emoji that makes it possible to perform the set function in a reception device, an electronic device may use information associated with the reception device. Accordingly, the electronic device may set various functions, to which security technologies requiring information about a recipient or the reception device need to be applied, in the emoji. Furthermore, the electronic device may set a function, which is executable by the reception device, to an emoji, using the information of the reception device, thereby preventing an error from occurring when a function set to the emoji is performed by the reception device.

Besides, a variety of effects directly or indirectly understood through the disclosure may be provided.

DESCRIPTION OF DRAWINGS

With regard to description of drawings, the same or similar components may be marked by the same or similar reference numerals.

MODE FOR INVENTION

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
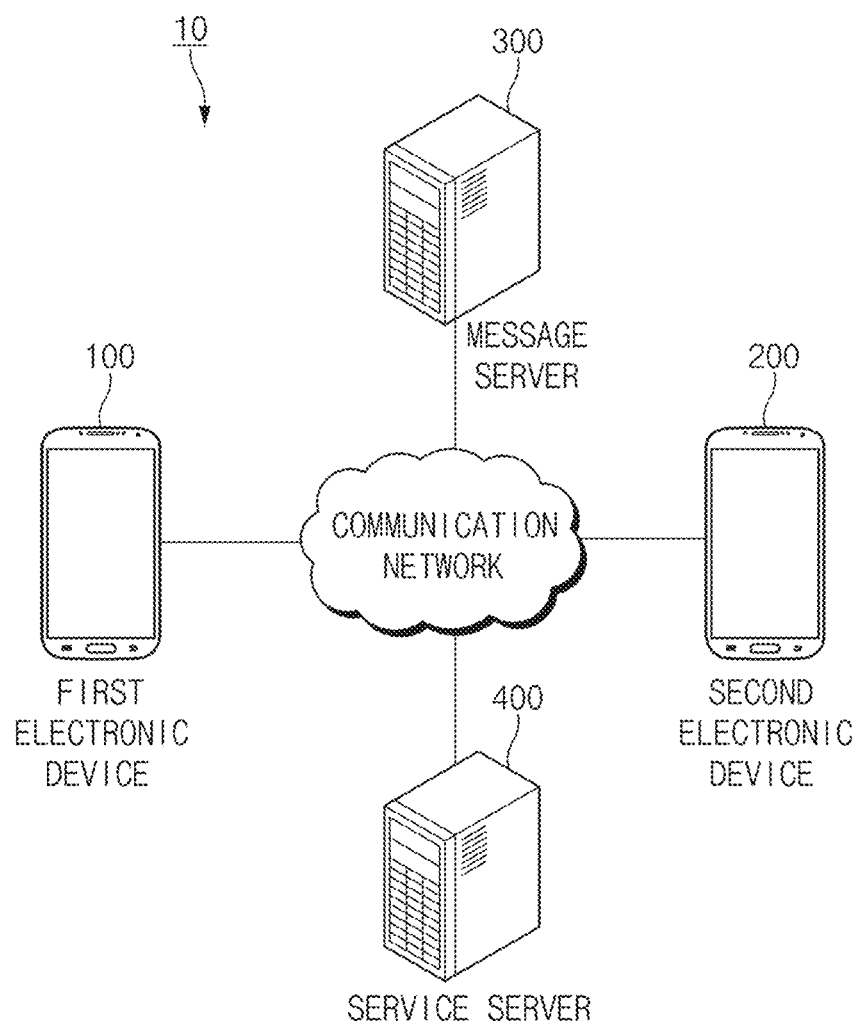
FIG. 1 is a view illustrating a message service system, according to various embodiments.

FIG. 1 is a view illustrating a message service system, according to various embodiments.

Referring to FIG. 1, an emoji providing system 10 may include a first electronic device 100, a second electronic device 200, a message server 300, and a service server 400.

According to an embodiment, the first electronic device 100 may transmit a message to the second electronic device 200. For example, the first electronic device 100 may transmit a message to the second electronic device 200 through the message server 300. For example, the message may include at least one of a short message service (SMS) message, a long message service (LMS) message, a multimedia message service (MMS) message, and a rich communication services (RCS) message. According to an embodiment, the first electronic device 100 and the second electronic device 200 may display transmitted and received messages on the display, respectively.

According to an embodiment, the first electronic device 100 may transmit a message including an emoji to the second electronic device 200. For example, the emoji may be a pictograph generated using Unicode system. According to an embodiment, the first electronic device 100 may display an emoji including at least one image on the display. For example, the emoji may be animation or video.

According to an embodiment, the first electronic device 100 may set the specified function to the emoji. For example, the first electronic device 100 may set a specified function to the emoji by including information necessary to perform the specified function in the emoji. For example, the specified function may be a function performed through the service server 400. According to an embodiment, the second electronic device 200 may perform a function set to the received emoji. For example, the second electronic device 200 may perform the specified function, using information included in the received emoji. For example, the second electronic device 200 may perform a function set to the emoji through the service server 400.

According to an embodiment, the message server 300 may deliver a message transmitted from the first electronic device 100 to the second electronic device 200. According to an embodiment, the message server 300 may store the delivered message. Accordingly, the message server 300 may transmit the stored message to an electronic device (e.g., the first electronic device 100 or the second electronic device 200) depending on a request.

According to an embodiment, the message server 300 may transmit state information of a message delivered to the second electronic device 200 to the first electronic device 100. The first electronic device 100 may provide the state information to a user.

According to an embodiment, the service server 400 may provide a specified service to the electronic device. For example, the service server 400 may provide the second electronic device 200 with a service for performing a function set to an emoji received from the first electronic device 100. For example, the emoji may include information needed to execute the specified function. According to an embodiment, the service server 400 may transmit, to the electronic device, information necessary to perform the specified service. For example, the service server 400 may transmit, to the first electronic device 100, information necessary to set the specified function to the emoji.

According to another embodiment, the message server 300 and the service server 400 may be implemented with a single server. For example, the single server may provide an electronic device with a plurality of services including a message service.

When there is no information associated with the second electronic device 200 receiving the emoji, the first electronic device 100 may set only the simple or limited function to the emoji and may set a function difficult to be executed by the reception device to the emoji. For example, it may be difficult for the first electronic device 100 to set a function (e.g., payment function) requiring the security to the emoji; alternatively, the first electronic device 100 may set a function, which is difficult to be executed by in the second electronic device 200, to the emoji. According to an embodiment of the disclosure, the first electronic device 100 may transmit an emoji, to which executable and various functions are set, to the second electronic device 200 by using the information associated with the second electronic device 200.

Hereinafter, an embodiment in which the first electronic device 100 transmits an emoji, to which a specified function is set, to the second electronic device 200 will be described mainly.

Figure 2:
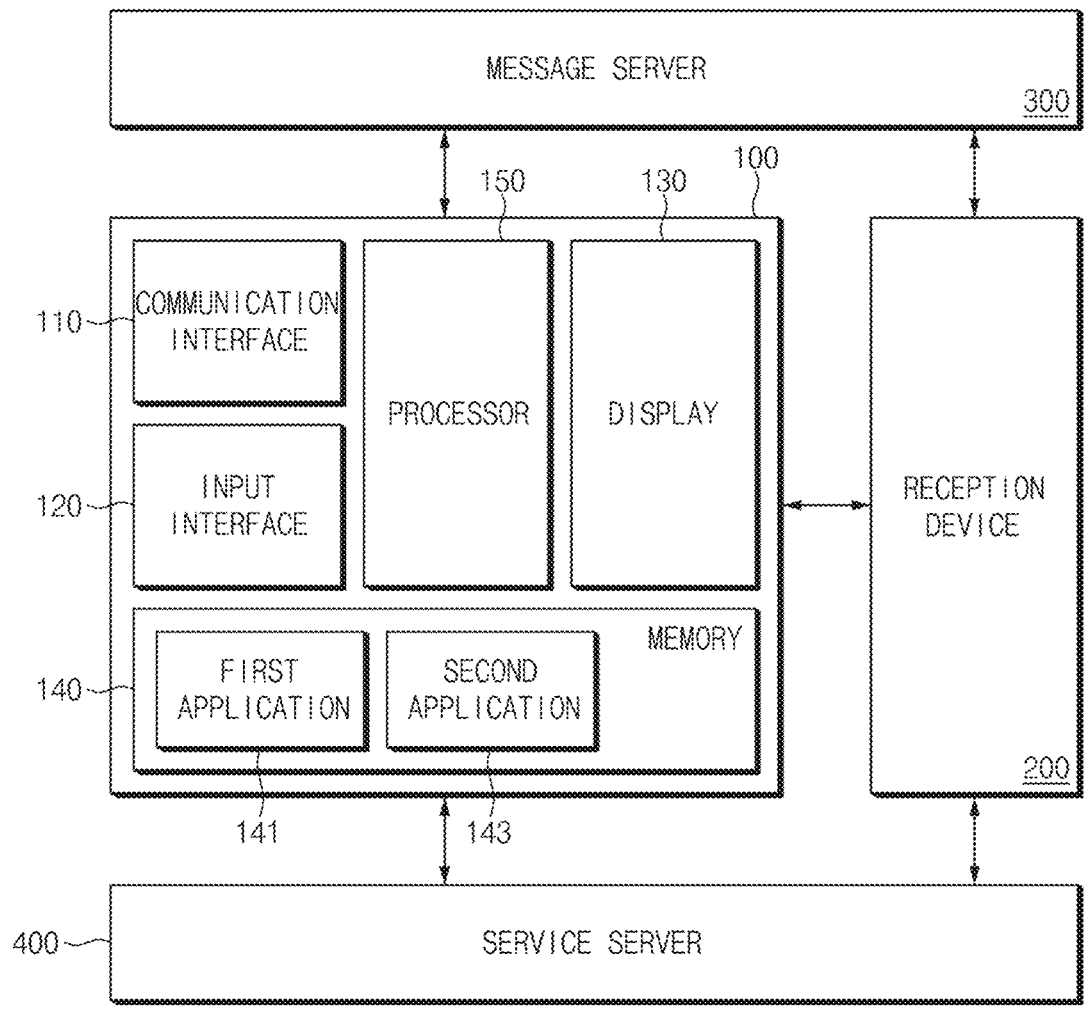
FIG. 2 illustrates a block diagram of a configuration of a transmission device, according to various embodiments.

FIG. 2 is a block diagram illustrating a configuration of a first electronic device, according to various embodiments.

Referring to FIG. 2, the first electronic device 100 may include a communication interface 110, an input interface 120, a display 130, a memory 140, and a processor 150.

According to an embodiment, the communication interface 110 may be connected to an external device to transmit or receive data (or information). For example, the communication interface 110 may be connected to at least one of the second electronic device 200, the message server 300, and the service server 400 to transmit or receive data. According to an embodiment, the communication interface 110 may include a wireless interface for transmitting or receiving data.

According to an embodiment, the input interface 120 may receive a user input for controlling the electronic device 100. For example, the input interface 120 may receive a user's touch input through a touch panel included in the display 130. For another example, the input interface 120 may receive a user input through a physical button. For example, the user input may be to transmit or receive a message.

According to an embodiment, the display 130 may display an image. For example, the display 130 may display the user interface (UI) of the executed application.

According to an embodiment, the memory 140 may store at least one application (or an application program). For example, the memory 140 may store a first application 141 (e.g., a message application (app)) for transmitting or receiving messages and a second application 143 (e.g., a payment app, a doorlock app, or the like) for performing a specified function.

According to an embodiment, the processor 150 may be electrically connected to the communication interface 110, the input interface 120, the display 130, and the memory 140 to control the overall operation of the electronic device 100.

According to an embodiment, the processor 150 may execute the first application 141 stored in the memory 140 to transmit or receive a message. In other words, the processor 150 may execute the first application 141 (e.g., a message app) to transmit or receive a message. Hereinafter, the operation performed by the processor 150 to transmit (or receive) a message may be an operation of performing the function of the first application 141. For example, the first application 141 may transmit or receive a message based on a phone number or may transmit or receive a message based on an Internet protocol (IP) address.

According to an embodiment, the processor 150 may display the UI of the executed application on the display 130. For example, the processor 150 may display the UI for transmitting or receiving a message on the display 130. The processor 150 may display the transmitted or received message on the UI displayed on the display 130.

According to an embodiment, the processor 150 may receive a user input for transmitting a message through the input interface 120. For example, the processor 150 may receive a user input for transmitting an emoji to which a specified function is set. The user input may be one or more of user inputs to select an emoji, an external electronic device (e.g., the second electronic device 200) for transmitting the emoji, and a function to be set to the emoji. For example, the specified function may include a payment function, an unlock function of a door lock, or the like.

According to an embodiment, the processor 150 may set the selected function to the emoji. For example, the processor 150 may set a specified function to the emoji by including information necessary to perform the specified function in the emoji. According to an embodiment, the processor 150 may obtain information necessary to perform the specified function using the identification information of the reception device. For example, the processor 150 may transmit the identification information of the reception device to the service server 400 and may obtain information necessary to execute the specified function from the service server 400. For example, the identification information may include at least one of a phone number, IP address, MAC address, SIM card identifier, IMEI, Near Field Communication (NFC) ID, a serial number of an electronic device, or the like for identifying the corresponding electronic device. According to an embodiment, the processor 150 may obtain information necessary to perform the specified function, using information about the user (or a recipient) of the reception device as well as the identification information of the reception device. Accordingly, the function set to the emoji may be performed by an external electronic device corresponding to the identification information included in the emoji.

According to an embodiment, the processor 150 may receive the identification information of the reception device and the information about the recipient through the communication interface 110. For example, the processor 150 may receive identification information of the reception device and information about the user from the reception device. For example, when receiving a user input to select the reception device (e.g., the second electronic device 200), the processor 150 may the receive identification information of a reception device and the information about a user.

According to an embodiment, the processor 150 may receive information necessary to perform a specified function through the communication interface 110. For example, the processor 150 may receive information necessary to perform the specified function from the service server 400.

According to an embodiment, the processor 150 may transmit a message to an external electronic device through the communication interface 110. For example, the processor 150 may transmit a message to the external electronic device (e.g., the second electronic device 200) through the message server 300. For example, the message may include an emoji to which a specified function is set.

According to an embodiment, the processor 150 may display the emoji on the UI of the first application 141 displayed on the display 130. According to an embodiment, the processor 150 may change the emoji displayed on the UI depending on the state of the emoji of the reception device. For example, the processor 150 may change the emoji displayed on the UI based on whether the function set to the emoji is executable or whether the execution is completed.

According to an embodiment, the processor 150 may manage the transmitted or received message. According to an embodiment, the processor 150 may store the transmitted or received message in the memory 140. According to an embodiment, the processor 150 may include a module (e.g., a message management module) for managing a message.

According to an embodiment, the processor 150 may determine a message transmission method based on information about the state of the reception device. For example, the processor 150 may determine a transmission format, a transmission protocol, and a transmission channel based on information about the state of the reception device (e.g., the second electronic device 200). In other words, the processor 150 may determine the type of message (e.g., an SMS message, an LMS message, an MMS message, or an RMS message) to be transmitted based on information about the state of the reception device. According to an embodiment, the processor 150 may receive information about the state of the reception device through the communication interface 110. For example, the processor 150 may receive information about the state of the reception device from the message server 300. For example, the information about the state of the reception device may include operation system (OS) information of the reception device and application program information installed in the reception device.

According to an embodiment, the processor 150 may convert a message to be transmitted to the reception device (e.g., the second electronic device 200) depending on the determined transmission method. For example, the processor 150 may convert the input message into an SMS message, an MMS message, or an RMS message depending on a size and content type. According to an embodiment, the processor 150 may include a module (e.g., a message conversion module) for determining a message transmitting method and converting a message depending on the determined transmitting method.

According to an embodiment, the processor 150 may perform a security operation associated with the transmitted or received message. For example, the processor 150 may perform a security operation associated with the function settings of an emoji. For example, the security operation may perform an encryption or decryption operation of an emoji, a user authentication operation for transmitting or receiving an emoji, and an authorization setting operation of an emoji. According to an embodiment, the processor 150 may include a module (e.g., a security module) for performing the security operation.

According to an embodiment, the processor 150 may manage information associated with an external electronic device (or a reception device). For example, the processor 150 may manage identification information of an external electronic device (e.g., the second electronic device 200) and information about a user (or recipient). In addition, the processor 150 may manage state information (e.g., OS information and application program information) of the external electronic device. According to an embodiment, the processor 150 may store the information in the memory 140 (or a database). According to an embodiment, the processor 150 may include a module (e.g., an information management module) for managing the information.

According to an embodiment, the processor 150 may execute the second application 143 to perform the specified function. The processor 150 may perform an operation for performing the function of the second application 143 (e.g., a payment function app, a door lock app, or the like).

According to an embodiment, the second electronic device 200 may include a configuration similar to the configuration of the first electronic device 100 and may perform a similar operation. According to an embodiment, the second electronic device 200 may transmit or receive a message. For example, the second electronic device 200 may receive a message from the first electronic device 100. For example, the message may include an emoji including a specified function.

According to an embodiment, the second electronic device 200 may execute an application for transmitting or receiving a message and may display the UI of the application on a display. According to an embodiment, the second electronic device 200 may display the received message on the UI. For example, the second electronic device 200 may display the emoji on the UI. According to an embodiment, the second electronic device 200 may receive a user input to select an emoji through an input interface.

According to an embodiment, the second electronic device 200 may perform a function set to the emoji depending on the user input. For example, the second electronic device 200 may perform a specified function (e.g., a payment function, an unlock function of a door lock, or the like), using information included in the emoji. According to an embodiment, the second electronic device 200 may perform the specified function through the service server 400. For example, the second electronic device 200 may transmit information for performing the specified function to the service server 400 to perform a function set to the emoji.

According to an embodiment, the second electronic device 200 may change the emoji displayed on the UI depending on the state of the received emoji. For example, the second electronic device 200 may change the emoji displayed on the UI based on whether the function set to the emoji is executable or whether the execution is completed.

Accordingly, the first electronic device 100 may transmit an emoji, to which executable and various functions are set, to the second electronic device by using the information associated with the second electronic device 200.

Figure 3:
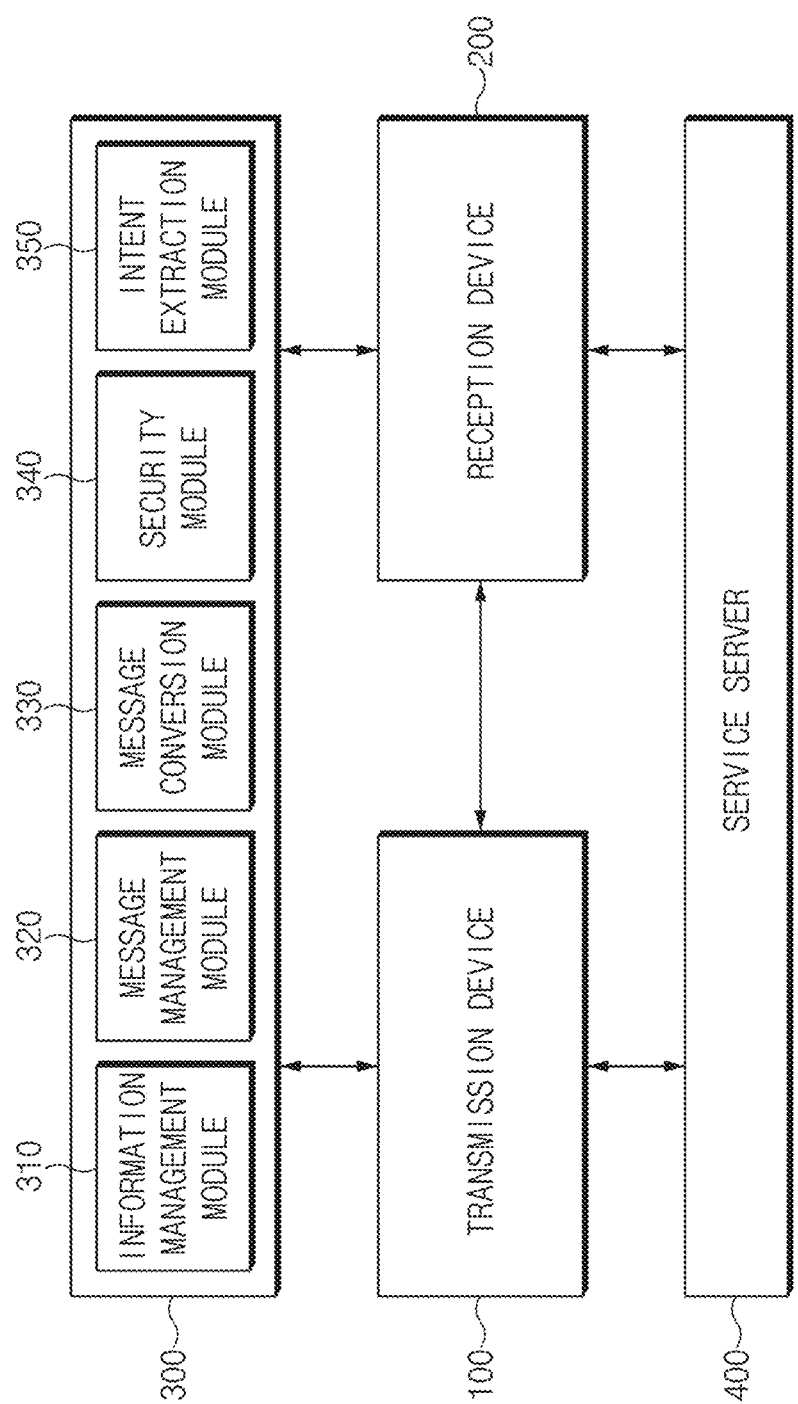
FIG. 3 is a block diagram illustrating a configuration of a message server, according to various embodiments.

FIG. 3 is a block diagram illustrating a configuration of a message server, according to various embodiments.

According to an embodiment, the message server 300 may include an information management module 310, a message management module 320, a message conversion module 330, a security module 340, and an intent extraction module 350.

According to an embodiment, the information management module 310 may manage profile information and group information of a user. For example, the information management module 310 may manage information associated with an external electronic device (e.g., the first electronic device 100 or the second electronic device 200). For example, the information associated with the external electronic device may include identification information of the external electronic device, information about a user of the external electronic device, and information about a state of the external electronic device. For example, the group information may include information about a group including the user in contacts. According to an embodiment, the information management module 310 may receive the information from at least one of the first electronic device 100 and the second electronic device 200. According to an embodiment, the information management module 310 may deliver the information to other external electronic devices. For example, the information management module 310 may receive information associated with the second electronic device 200 to transmit the information to the first electronic device 100. According to an embodiment, the information management module 310 may store the information in a database.

According to an embodiment, the message management module 320 may manage messages exchanged between external electronic devices. For example, the message management module 320 may deliver the message transmitted from the first electronic device 100 to the second electronic device 200. According to an embodiment, the message management module 320 may store the delivered message in the database. When there is a request from an external electronic device, the message management module 320 may provide a message transmitted or received by the external electronic device.

According to an embodiment, the message management module 320 may identify the compatibility of an electronic device (or a reception device) for receiving a message to be delivered. For example, the message management module 320 may determine whether the reception device is capable of receiving the delivered message by using information associated with the reception device (e.g., the second electronic device 200). For example, the information associated with the reception device may include at least one of hardware information, information about the installed software (e.g., application program), or information about a communication protocol, an electronic document format, and a security technology.

According to an embodiment, the message management module 320 may determine a message transmitting method based on the identified compatibility information. For example, the message management module 320 may determine the type of message (e.g., an SMS message, an MMS message, or an RMS message) to be delivered, based on information about the state of the reception device. According to an embodiment, the message management module 320 may change the entered message, using the message conversion module 330 depending on the determined message transmitting method.

According to an embodiment, the message conversion module 330 may convert a message to be delivered to the reception device depending on the determined transmitting method. For example, the message conversion module 330 may convert the message to be delivered, by mapping the message to be delivered into the determined type of message depending on the size of the message to be delivered to the reception device (e.g., the second electronic device 200) and the type of content included in the message.

According to another embodiment, the message management module 320 may request the reception device to install a new application or to change the version of the application based on the identified compatibility information.

According to an embodiment, the security module 340 may perform a security operation associated with the delivered message. For example, the security module 340 may perform an operation for encrypting or decrypting the transmitted message. For another example, the security module 340 may perform user authentication of the external electronic device. According to an embodiment, the security module 340 may perform the security operation, using identification information of a reception device of the transmitted message.

According to an embodiment, the security module 340 may allow the specified electronic device to perform a function set to an emoji. For example, the security module 340 may allow the specified electronic device (e.g., the second electronic device 200) to perform a function set to the emoji by using the security operation.

According to an embodiment, the intent extraction module 350 may extract the intent of a user input. For example, the intent extraction module 350 may extract the user's intent from a voice, a text, and an image (e.g., a video image). According to an embodiment, the intent extraction module 350 may extract the intent of a user input for transmitting or receiving a message to or from an external electronic device. For example, the intent extraction module 350 may extract the intent of a user input for transmitting an emoji to which a specified function is set. According to an embodiment, the intent extraction module 350 may transmit information about the extracted intent to an external electronic device. For example, the information about the extracted intent may include information for performing an operation according to the extracted intent.

Accordingly, the first electronic device 100 may transmit the emoji, to which various functions are set, to the second electronic device 200 by using information associated with the reception device.

Figure 4:
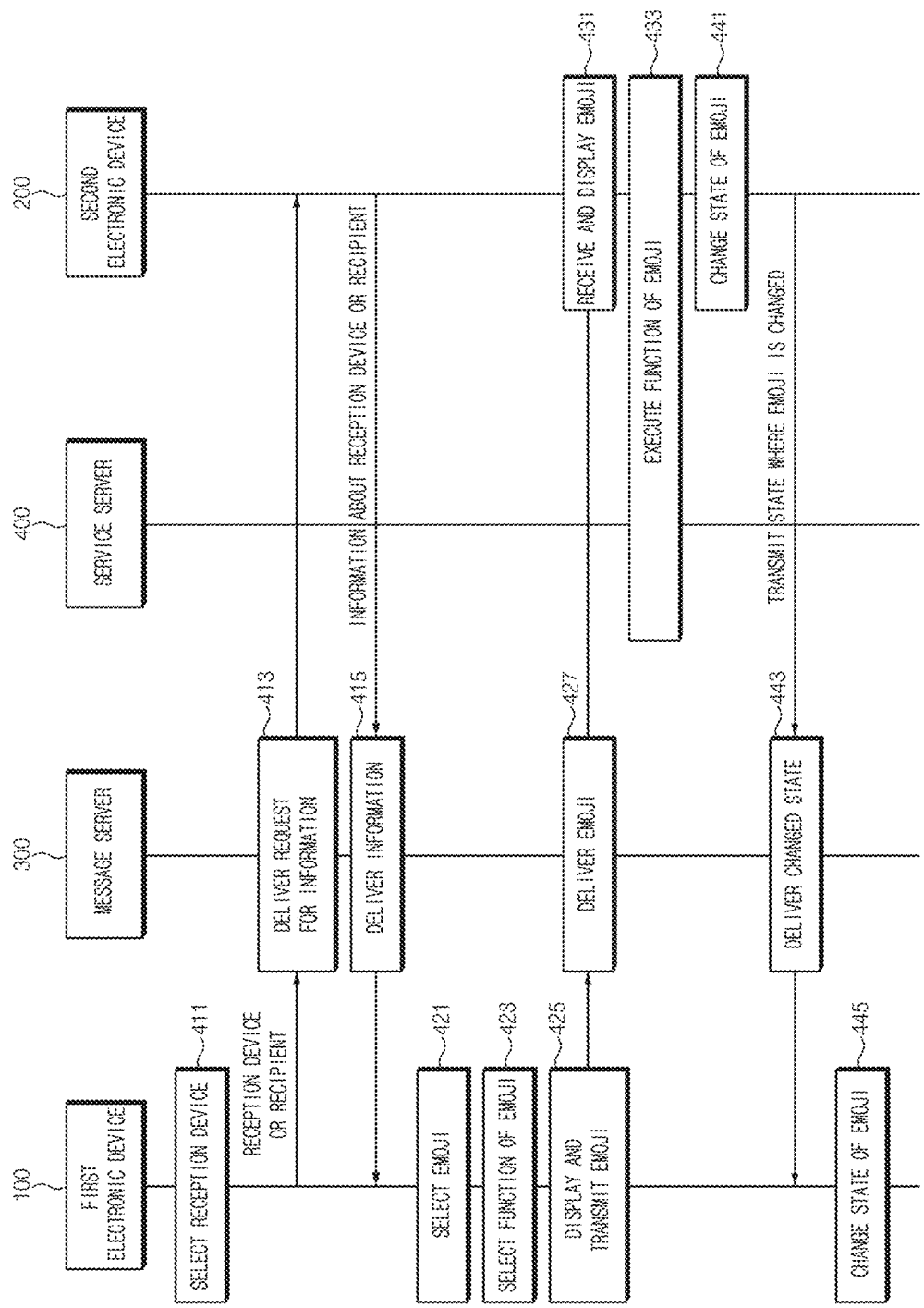
FIG. 4 is a sequence diagram illustrating a process, in which a first electronic device transmits an emoji, to which a specified function is set, to a second electronic device and a second electronic device feeds back relevant information upon executing the function set to an emoji, according to various embodiments.

FIG. 4 is a sequence diagram illustrating a process in which a first electronic device transmits an emoji, to which a specified function is set, to a second electronic device according to various embodiments.

Referring to FIG. 4, the first electronic device 100 (or a transmission device) may transmit an emoji, to which a specified function is set, to the second electronic device 200 (or a reception device).

According to an embodiment, in operation 411, the first electronic device 100 may receive a user input to select a reception device and may select a reception device depending on the user input. For example, the first electronic device 100 may select the second electronic device 200 as the reception device.

According to an embodiment, when receiving a user input for selecting a reception device, the first electronic device 100 may transmit a request for receiving information associated with the reception device to the message server 300. The information associated with the reception device may include identification information of the reception device and information about a user (or a recipient).

According to an embodiment, in operation 413, the message server 300 may deliver the request to the second electronic device 200. According to an embodiment, the second electronic device 200 may transmit the information associated with the reception device to the first electronic device 100. For example, the information associated with the reception device may include identification information of the reception device and information about a user (or a recipient) of the reception device. According to an embodiment, in operation 415, the message server 300 may deliver information associated with the reception device to the first electronic device 100. According to an embodiment, the message server 300 may store the information associated with the reception device in a database.

According to an embodiment, when storing the information associated with the reception device in the database, the message server 300 may transmit the information associated with the reception device to the first electronic device 100 through operation 415 without performing operation 413.

According to an embodiment, when receiving a user input to select a reception device, the first electronic device 100 may search for and select the information associated with the reception device from the memory 140 of the first electronic device 100. For example, when a user's name is selected from the address book, the information associated with the reception device related to the user's name may be selected. At this time, when a part of the information associated with the reception device is missing or when a specific time has elapsed based on the time updated in a memory, a request for the information associated with a reception device may be made to the message server 300.

According to an embodiment, in operation 421, the first electronic device 100 may receive a user input to select an emoji and may select the emoji depending on the user input.

According to an embodiment, in operation 423, the first electronic device 100 may receive a user input to select a function to be set to the emoji and may set the selected function to the emoji depending on the user input. According to an embodiment, the first electronic device 100 may set the selected function to the emoji by including information for executing the selected function to the emoji. For example, information for executing the selected function may be received from the service server 400. According to an embodiment, the first electronic device 100 may obtain information necessary to perform the selected function, using the information associated with the reception device. For example, the first electronic device 100 may transmit information associated with the reception device to the service server 400 and may receive information necessary to perform the selected function from the service server 400.

According to an embodiment, the first electronic device 100 may receive information about a function capable of being set to the selected emoji and may select a function to be set to the emoji in the received information depending on a user input. For example, the function capable of being set to the emoji may be determined based on information about the function that has been set to the selected emoji. According to an embodiment, the first electronic device 100 may set the selected function to an emoji. For example, the first electronic device 100 may set the selected function to the emoji by including information for executing the selected function.

According to an embodiment, the first electronic device 100 may set an authority (or a condition) capable of performing a function set to an emoji. For example, the authority may include the restriction on at least one of the number of times that a function set to the emoji is capable of being executed, the electronic device associated with the set function, or the executable period and region.

According to an embodiment, in operation 425, the first electronic device 100 may display an emoji, to which a specified function is set, on a display. For example, the first electronic device 100 may display the emoji on the UI of the application (e.g., a message app) displayed on the display. According to an embodiment, the first electronic device 100 may transmit the emoji, to which the specified function is set, to the second electronic device 200.

According to an embodiment, in operation 427, the message server 300 may deliver an emoji, to which the specified function is set, to the second electronic device 200. According to an embodiment, the message server 300 may store the emoji, to which the specified function is set, in the database.

According to an embodiment, in operation 431, the second electronic device 200 may receive an emoji, to which a specified function is set, and may display the received emoji on the display. For example, the second electronic device 200 may display the emoji on the UI of the application (e.g., a message app) displayed on the display.

According to an embodiment, in operation 433, the second electronic device 200 may receive a user input to select the received emoji and may perform a function set to the selected emoji. For example, the second electronic device 200 may perform the specified function, through the service server 400. The second electronic device 200 may transmit information necessary to perform the specified function to the service server 400 to perform the specified function.

According to an embodiment, in operation 441, the second electronic device 200 may change the emoji displayed on the display. For example, the second electronic device 200 may change the emoji depending on the state where the execution is completed. In other words, the second electronic device 200 may display a state where the execution of the function set to the emoji is completed. According to an embodiment, when completing the execution of the function set to the emoji, the second electronic device 200 may transmit information about the state where the execution is completed, to the first electronic device 100.

According to an embodiment, in operation 443, the message server 300 may deliver information about the state where the execution is completed, to the first electronic device 100. According to an embodiment, the message server 300 may store information about a state where the function of the second electronic device 200 is performed, in a database.

According to an embodiment, in operation 445, when receiving information about a state where the execution of the second electronic device 200 is completed, the first electronic device 100 may change the emoji displayed on the display depending on the received information. In other words, the first electronic device 100 may display a state where the execution of the function set to the emoji is completed in the second electronic device 200.

According to various embodiments, operation 441, operation 443, and operation 445 may also perform operations of transmission, reception, and display based on change states associated with one or more of a state before the execution of the function set to the emoji, a state during the execution of the function set to the emoji, or a state of an authority (or a condition) capable of performing the function set to the emoji, in the second electronic device 200.

Figure 5A:
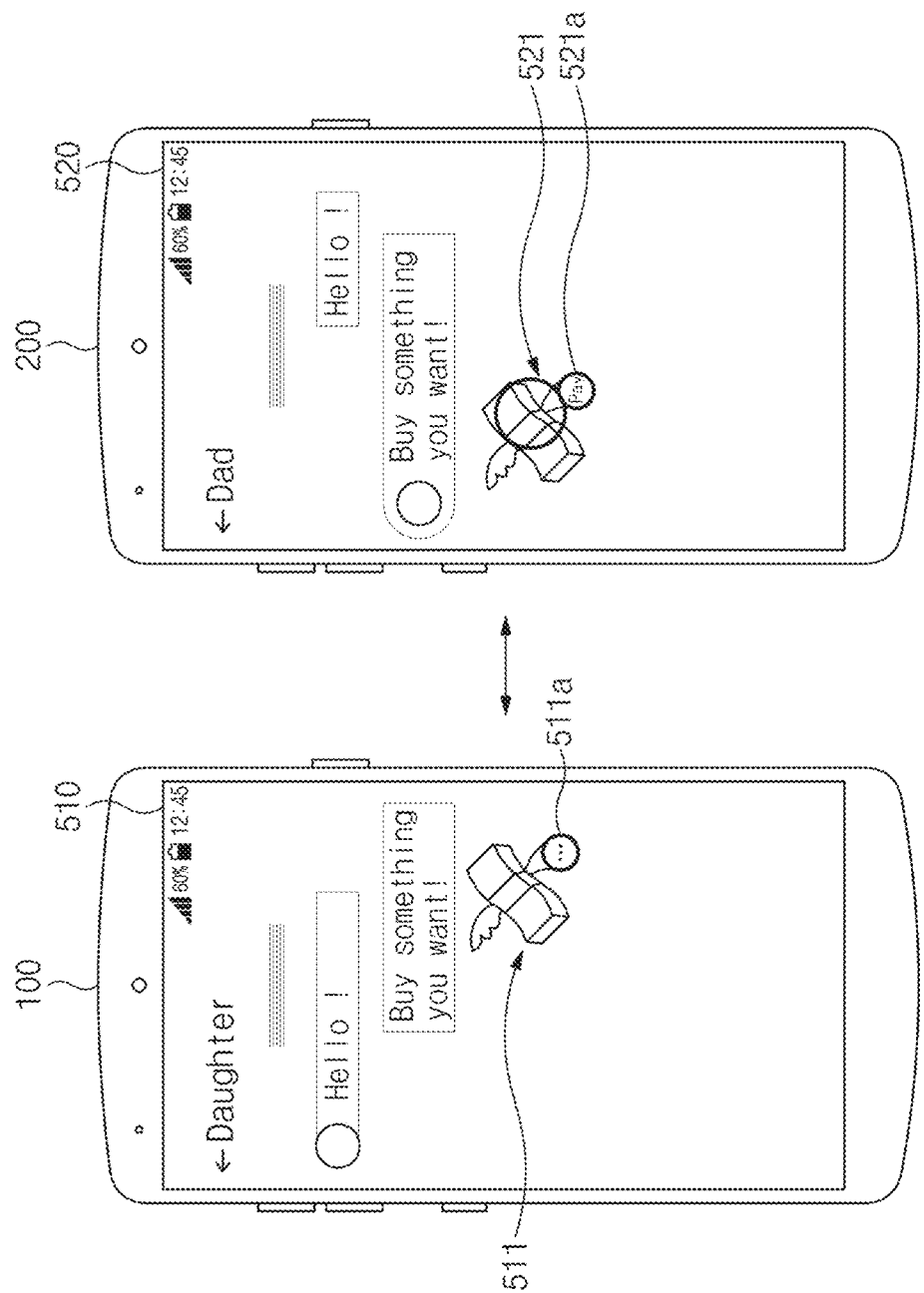
FIGS. 5A and 5B are views illustrating screens of a first electronic device and a second electronic device when a first electronic device transmits an emoji to which a specified function is set, according to an embodiment.
Figure 5B:
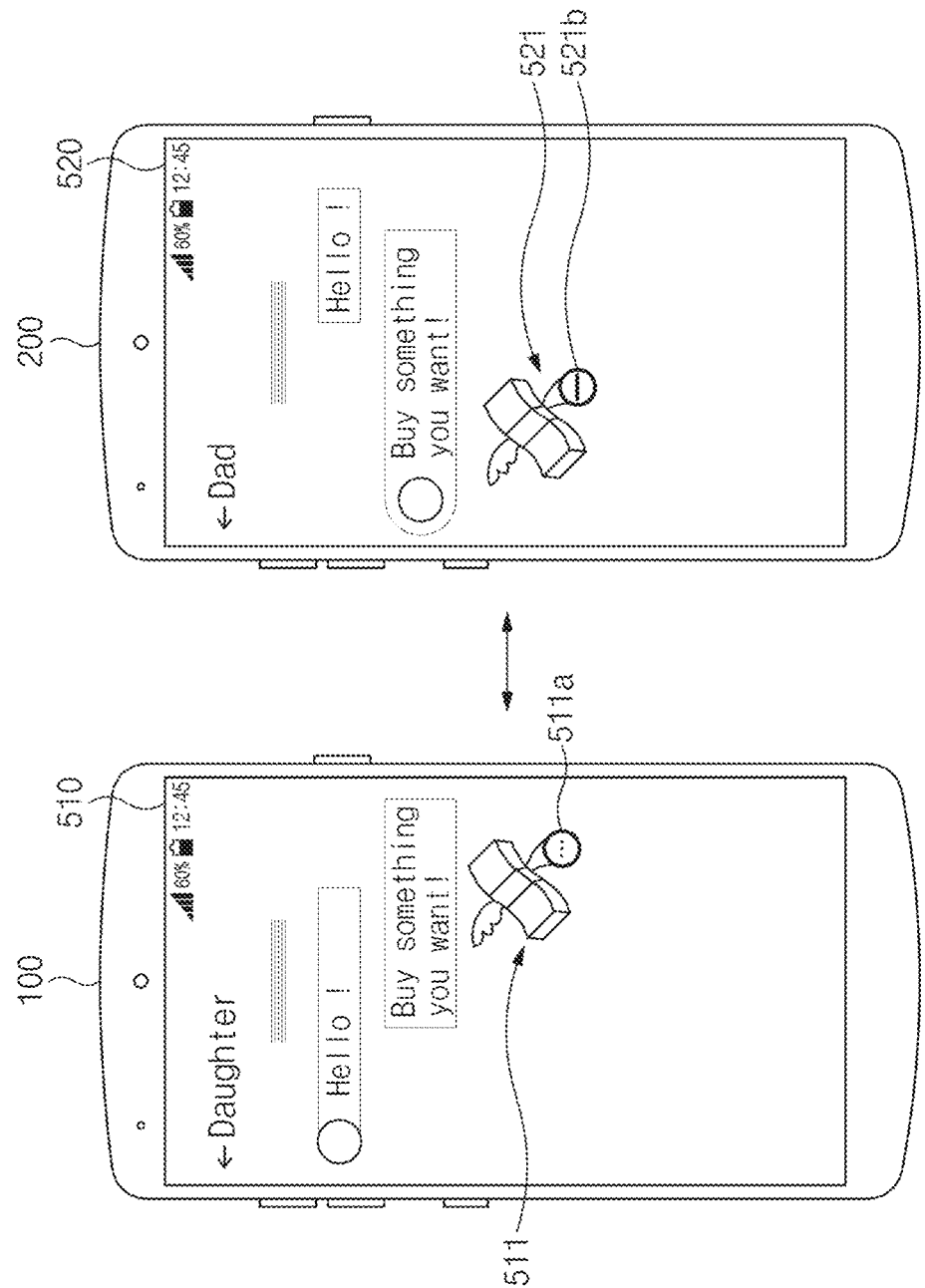

FIGS. 5A and 5B are views illustrating screens of a first electronic device and a second electronic device when the first electronic device transmits an emoji to which a specified function is set, according to an embodiment.

Referring to FIGS. 5A and 5B, the first electronic device 100 may transmit an emoji, to which a specified function is set, to a second electronic device.

Referring to FIG. 5A, a function capable of being performed by the second electronic device 200 may be set to the emoji transmitted from the first electronic device 100.

According to an embodiment, the first electronic device 100 may display an emoji 511, to which the specified function is set, on a screen 510 where the UI of the message app is displayed. The first electronic device 100 may display a state 511*a* before the specified function is performed by the second electronic device 200, on the emoji 511. According to an embodiment, the second electronic device 200 may receive an emoji 521, to which the specified function is set, and then may display the emoji 521 on a screen 520 where the UI of the message app is displayed. For example, the second electronic device 200 may display a state 521*a* where the specified function is capable of being performed, on the emoji 521. For example, the state 521*a* where the specified function is capable of being executed may indicate an app or service type for performing the specified function.

Referring to FIG. 5B, a function incapable of being performed by the second electronic device 200 may be set to the emoji transmitted from the first electronic device 100.

According to an embodiment, similarly to FIG. 5A, the first electronic device 100 may display the emoji 511, to which the specified function is set, on the screen 510 where the UI of the message app is displayed. According to an embodiment, the second electronic device 200 may display the emoji 521, to which the specified function is set, on the screen 520 where the UI of the message app is displayed. The second electronic device 200 may display a state 521*b* where the specified function is not capable of being performed, on the emoji 521.

Figure 6:
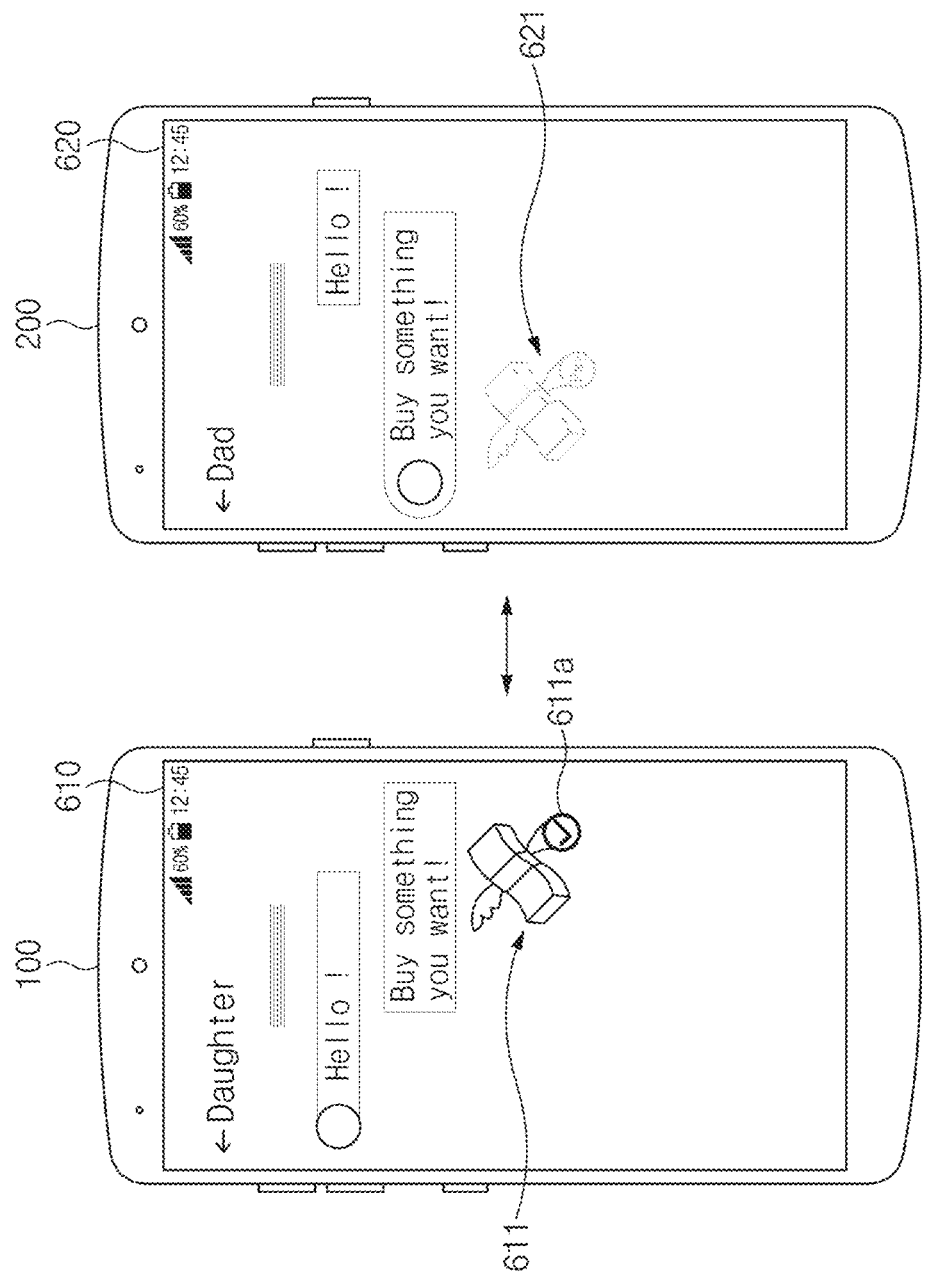
FIG. 6 is a view illustrating screens of a first electronic device and a second electronic device when the second electronic device completes execution of a function set to an emoji, according to an embodiment.

FIG. 6 is a view illustrating screens of a first electronic device and a second electronic device when the second electronic device completes execution of a function set to an emoji, according to an embodiment.

Referring to FIG. 6, the second electronic device 200 may perform a function set to the emoji received from the first electronic device 100.

According to an embodiment, the first electronic device 100 may change an emoji 611 displayed on a screen 610 where the UI of the message app is displayed, depending on whether the execution of the specified function is completed. For example, the first electronic device 100 may change the emoji (e.g., the emoji 511 of FIG. 5) where the state before the execution of the specified function is completed is displayed, into the emoji 611 where a state 611*a* in which the execution of the specified function is completed is displayed. For example, it may indicate that the corresponding function is executed by the second electronic device 200, by displaying the emoji 611 on which the state 611*a* where the execution of the specified function is completed is displayed.

According to an embodiment, the first electronic device 100 and the second electronic device 200 may change emojis 611 and 621 of the screen 610 on which the UI of the message app is displayed, depending on state information associated with the execution of a specified function. For example, in the case of a payment service, the spent amount and the used balance may be displayed. For example, the emojis 611 and 621 may be also displayed together with one or more pieces of information, such as the number of uses, the usage region, the usage time, and the app execution state related to the function.

According to an embodiment, the first electronic device 100 and the second electronic device 200 may differently display the emojis 611 and 621 displayed on the screen 610 on which the UI of the message app is displayed, depending on the state information associated with the execution of a specified function.

According to an embodiment, the second electronic device 200 may change an emoji 621 displayed on a screen 620 where the UI of the message app is displayed, depending on whether the execution of the specified function is completed. For example, the second electronic device 200 changes the emoji (e.g., the emoji 521 of FIG. 5) in the state (or an activation state) where the specified function is capable of being performed, into the emoji 621 in the state (or a deactivation state) where the execution of the specified function is completed. For example, the emoji 621 in the state where the execution of the specified function is completed may be displayed in achromatic color.

Figure 7:
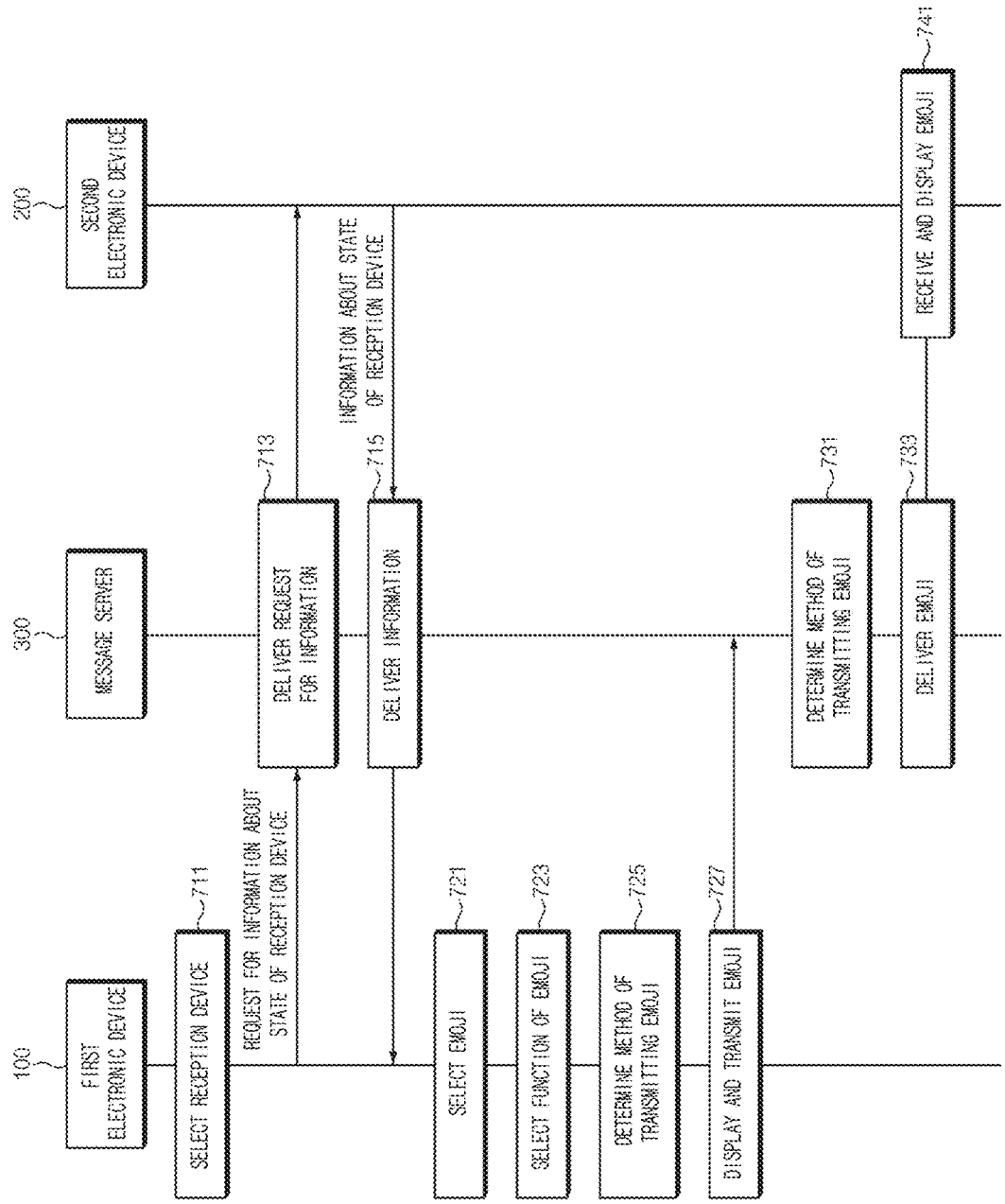
FIG. 7 is a sequence diagram illustrating a method in which a first electronic device transmits an emoji based on a state of a second electronic device, according to an embodiment.

FIG. 7 is a sequence diagram illustrating a method in which a first electronic device transmits an emoji based on a state of a second electronic device, according to an embodiment.

Referring to FIG. 7, the first electronic device 100 may transmit an emoji to the second electronic device 200 depending on a method of transmitting a message determined based on information about the state of the second electronic device 200.

According to an embodiment, in operation 711, the first electronic device 100 may select the second electronic device 200 as a reception device depending on a user input. According to an embodiment, when receiving the user input, the first electronic device 100 may transmit a request for receiving information about the state of the reception device to the second electronic device 200. For example, the information about the state of the reception device may include at least one of information about the OS of the reception device (e.g., the second electronic device 200), information about an application program installed in the reception device, and a network quality.

According to an embodiment, in operation 713, the message server 300 may deliver the request to the second electronic device 200. According to an embodiment, the second electronic device 200 may transmit information about the state of the reception device to the first electronic device 100. According to an embodiment, in operation 715, the message server 300 may deliver information about the state of the reception device to the first electronic device 100. According to an embodiment, the message server 300 may store information about the state of the reception device in a database.

According to an embodiment, in operation 721 and operation 723, the first electronic device 100 may select an emoji depending on the user input and may set a specified function to the selected emoji.

According to an embodiment, in operation 725, the first electronic device 100 may determine a method of transmitting a message based on information about the state of the reception device. For example, the processor 150 may determine a transmission format, a transmission protocol, and a transmission channel based on information about the state of the reception device (e.g., the second electronic device 200). For example, the processor 150 may determine the execution method (e.g., selecting an app, providing an app download link, or the like) of the function set to the emoji and the message transmitting method (e.g., a network type or a message type) depending on the device type (e.g., a mobile or personal computer) and the installed application information (e.g., whether an application is installed, or the type and version of the installed application), using the information about the state of the reception device. According to an embodiment, the first electronic device 100 may change an emoji, to which a specified function is set, into another message type depending on the determined message transmitting method. For example, when it is determined based on the state of the reception device that the reception device does not provide RCS, the emoji may be included in the MMS message converted in the MMS message format, and the specified function may be transmitted after being converted into the link format.

According to an embodiment, in operation 727, the first electronic device 100 may display an emoji, to which a specified function is set, on a display and may transmit the emoji to the second electronic device 200 depending on the determined transmitting method.

According to an embodiment, in operation 731, the message server 300 may determine a transmitting method of the message transmitted to the second electronic device 200. For example, when the first electronic device 100 fails to change the message depending on the state of the reception device, the message server 300 may determine a method for delivering a message depending on the state of the second electronic device 200 and may change the message including the emoji, to which the specified function is set, depending on the determined method. According to an embodiment, in operation 733, the message server 300 may deliver the emoji to the second electronic device 200 depending on the determined transmission method.

According to an embodiment, in operation 741, the second electronic device 200 may receive the emoji to which a specified function is set and may display the emoji on the display.

Accordingly, the first electronic device 100 may determine the transmission method of the message depending on the state of the second electronic device 200, may transmit the emoji, to which the specified function is set, and may allow that the second electronic device 200 to normally receive the emoji.

Figure 8:
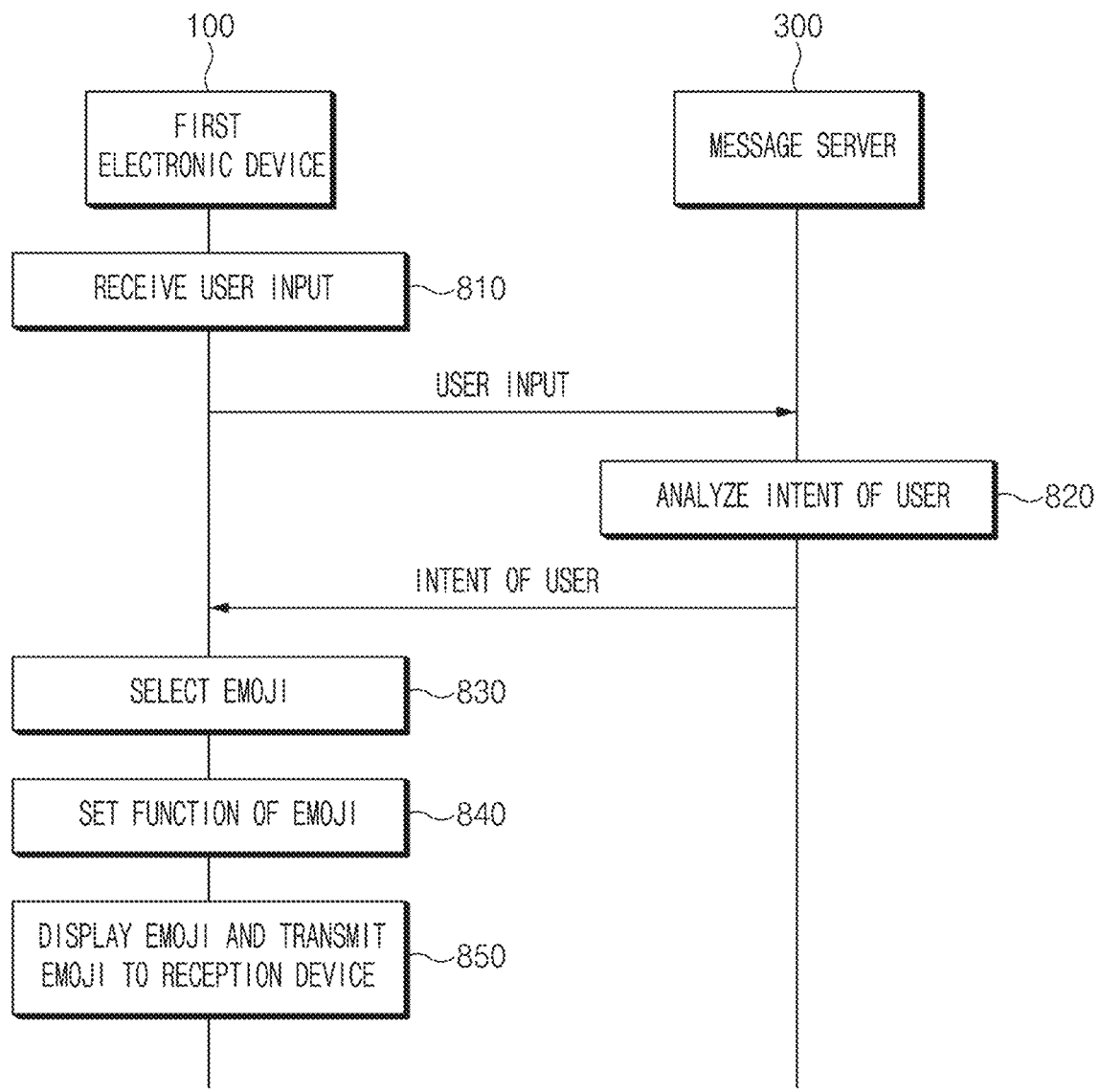
FIG. 8 is a sequence diagram illustrating a process, in which a first electronic device transmits an emoji to a second electronic device depending on a user input, according to an embodiment.

FIG. 8 is a sequence diagram illustrating a process, in which a first electronic device transmits an emoji to a second electronic device depending on a user input, according to an embodiment.

Referring to FIG. 8, the first electronic device 100 may receive a user input to transmit an emoji, to which a specified function is set, to the second electronic device 200.

According to an embodiment, in operation 810, the first electronic device 100 may receive a user input for transmitting a message. For example, the first electronic device 100 may receive a voice (e.g., a user utterance), a text, and an image (e.g., a video image) for transmitting a message. According to an embodiment, when receiving a user utterance, the first electronic device 100 may transmit the received user input to the message server 300.

According to an embodiment, in operation 820, the message server 300 may analyze the user input and may extract a user's intent. For example, the message server 300 may extract the user's intent through at least one of a speech to text (STT) module, a natural language processing module, and an image analysis module. According to an embodiment, the message server 300 may transmit information about the extracted intent of the user to the first electronic device 100.

According to an embodiment, the message server 300 may analyze the user's intent and may set a predetermined function to be assigned to an emoji. For example, it is possible to extract a text by recognizing a voice command (e.g., "payment" function or "unlock setting" function) or by recognizing a text, a bar code, or a two-dimensional code (e.g., a data matrix code or QR code) included in an image and then to associate the text with a function or app associated with the text.

According to an embodiment, in operation 830, operation 840, and operation 850, the first electronic device 100 may transmit an emoji, to which a specified function is set, to the second electronic device 200 depending on the received intent of the user.

Accordingly, the first electronic device 100 may process various user inputs and may transmit an emoji, to which a specified function is set, to the second electronic device 200.

Figure 9:
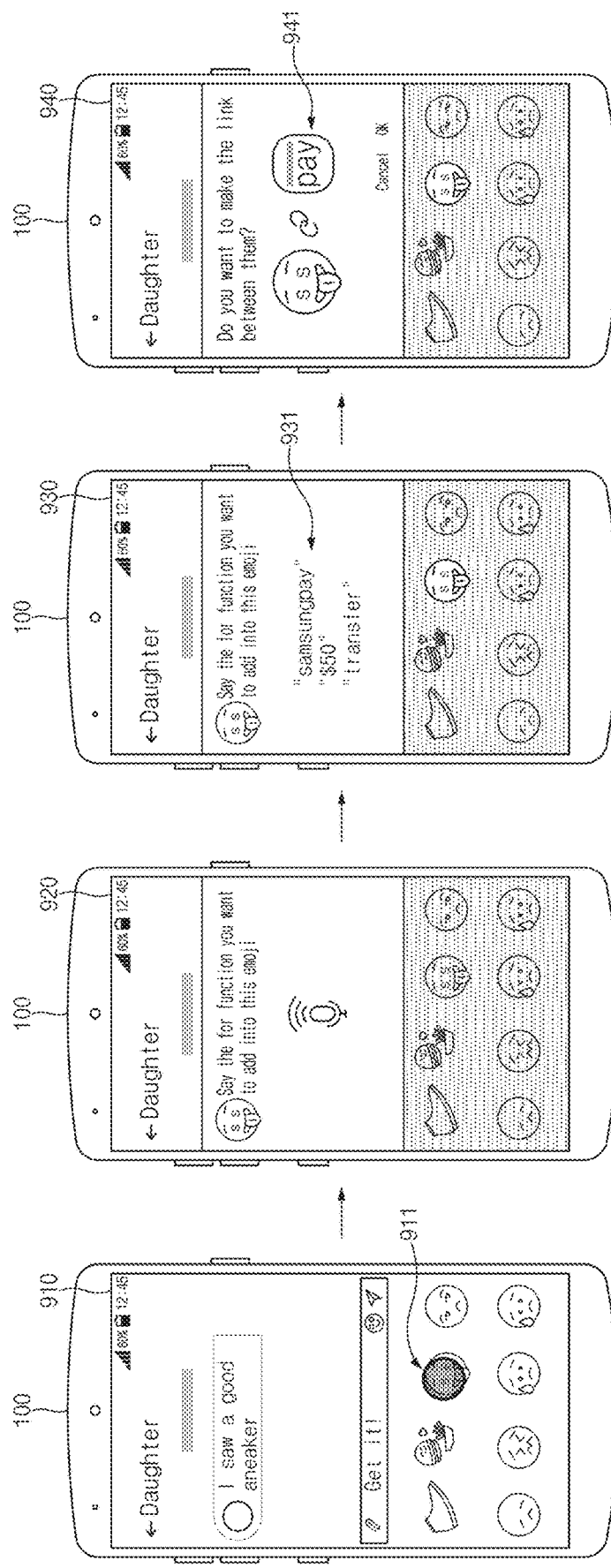
FIG. 9 is a view illustrating a screen in which a first electronic device processes a user input, according to an embodiment.

FIG. 9 is a view illustrating a screen in which a first electronic device processes a user input, according to an embodiment.

Referring to FIG. 9, the first electronic device 100 may receive a user utterance and may set a specified function to an emoji.

According to an embodiment, the first electronic device 100 may receive a user input 911 (e.g., a touch input) to select the emoji through a screen 910 for selecting the emoji.

According to an embodiment, the first electronic device 100 may receive a user utterance for setting a specified function through a screen 920 for receiving a user input.

According to an embodiment, the first electronic device 100 may display a keyword 931 of the user utterance on a screen 930 displaying the received user input. For example, the first electronic device 100 may receive the keyword from the message server 300. For example, the keyword may be a word for recognizing a function corresponding to the user utterance.

According to an embodiment, the first electronic device 100 may display an application for performing a function corresponding to a user utterance on a screen 940 for linking the specified function to the emoji.

Accordingly, the first electronic device 100 may receive the user utterance and may set the specified function to the emoji. In other words, a process in which the first electronic device 100 sets a function, which sends a predetermined amount (e.g., $50) through Samsung Pay function, to the emoji is illustrated.

Figure 10:
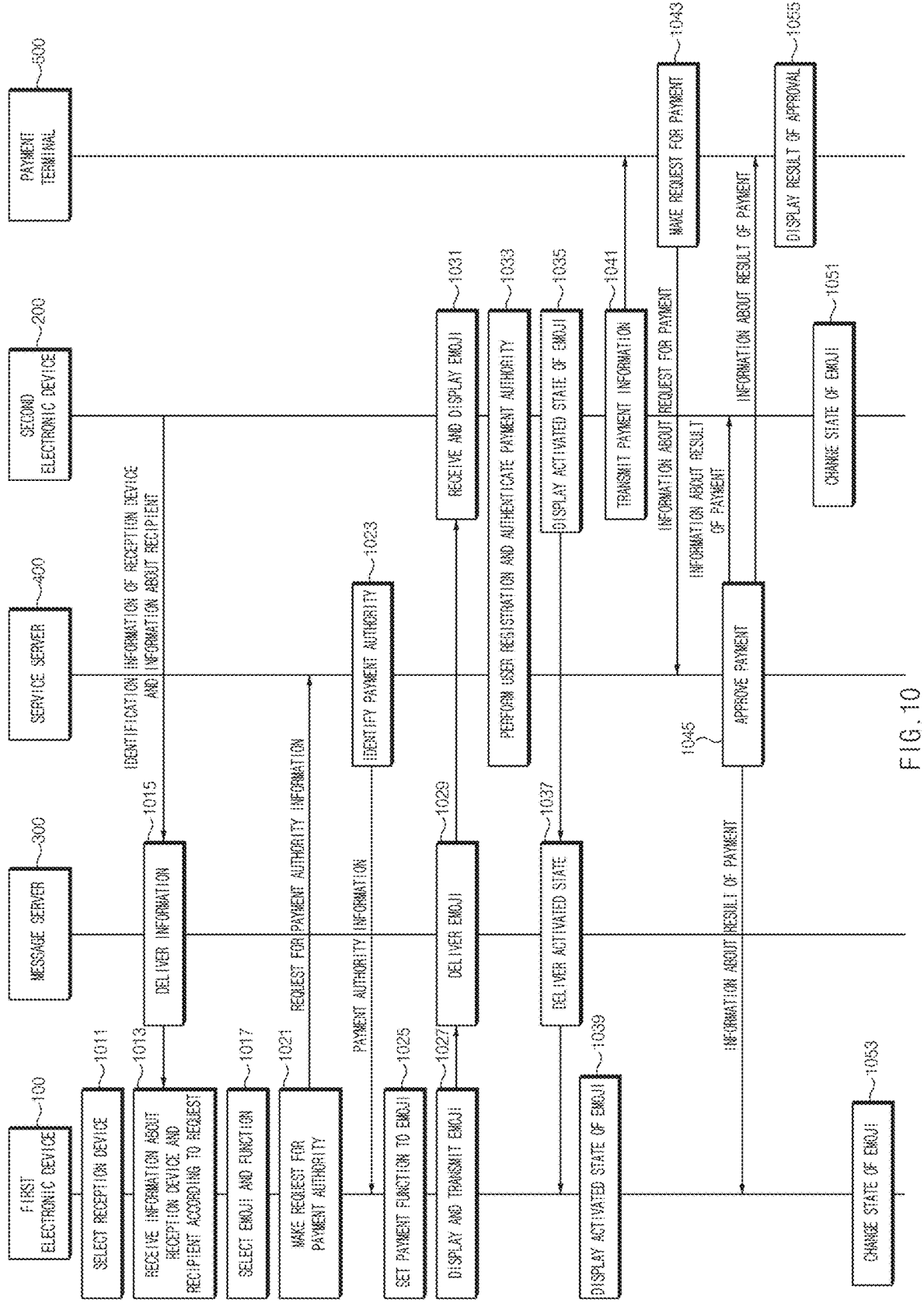
FIG. 10 is a sequence diagram illustrating a process in which a first electronic device transmits an emoji, to which a payment function is set, to a second electronic device according to an embodiment.

FIG. 10 is a sequence diagram illustrating a process in which a first electronic device transmits an emoji, to which a payment function is set, to a second electronic device according to an embodiment.

Referring to FIG. 10, the first electronic device 100 may transmit an emoji to the second electronic device 200 to execute a payment function. The second electronic device 200 may perform a payment function through the service server 400. For example, the service server 400 may include a financial server and a user authentication server. The financial server may include at least one of a bank server, a card issuer server, and an insurance server. The user authentication server may include at least one of a personal information inquiry server and a public authentication server.

According to an embodiment, in operation 1011, the first electronic device 100 may select the second electronic device 200 as a reception device depending on a user input.

According to an embodiment, in operation 1013, the first electronic device 100 may receive identification information of a reception device and information associated with a recipient as a request according to the user input. According to an embodiment, in operation 1015, the message server 300 may transmit the identification information of the reception device and the information associated with the recipient to the first electronic device 100. According to an embodiment, the message server 300 may store the identification information of the reception device and the information associated with the recipient in a database.

According to an embodiment, in operation 1017, the first electronic device 100 may select an emoji depending on the user input and may select a payment function to be set to the selected emoji.

According to an embodiment, in operation 1021, the first electronic device 100 may transmit a request for receiving payment authority information to the service server 400. For example, when user authentication (e.g., password, signature, biometric authentication, or the like) is completed, the first electronic device 100 may transmit a request for receiving the payment authority information to the service server 400. For example, the request may include information about identification information of a transmission device (e.g., the first electronic device 100), identification information of a reception device (e.g., the second electronic device 200), user authentication information, payment information (e.g., card information or payment account information), a person (e.g., a recipient) receiving payment authority, and payment authority information (e.g., amount, frequency, period, or the like).

According to an embodiment, in operation 1023, the service server 400 may identify the payment authority depending on the request. For example, the service server 400 may perform user authentication, using information included in the request. In other words, the service server 400 may determine whether an agency capable of granting payment authority is correct. In addition, the service server 400 may identify a payment limit of the agency capable of granting the payment authority. According to an embodiment, when the user authentication is completed, the service server 400 may transmit the payment authority information to the first electronic device 100. For example, the payment authority information may include card information, payment account information, and usage authority information.

According to an embodiment, in operation 1025, the first electronic device 100 may set the payment function to the emoji, using the payment authority information. For example, the first electronic device 100 may set the payment function to the emoji by including the payment authority information in the emoji. For example, the payment authority information may be encrypted.

According to an embodiment, in operation 1027, the first electronic device 100 may display the emoji, to which the payment function is set, on a display and may transmit the emoji to the second electronic device 200. According to an embodiment, in operation 1029, the message server 300 may deliver the emoji to the second electronic device 200. According to an embodiment, the message server 300 may store information about the emoji in a database.

According to an embodiment, in operation 1031, the second electronic device 200 may receive the emoji to which a payment function is set and may display the emoji on the display. For example, the second electronic device 200 may display the emoji (e.g., achromatic emoji) in a deactivated state, on the display.

According to an embodiment, in operation 1033, the second electronic device 200 may perform user registration associated with user authentication and payment authority. For example, the second electronic device 200 may perform user authentication and user registration through the service server 400. According to an embodiment, when user authentication is completed, the second electronic device 200 may transmit a request for registering the payment authority to the service server 400. For example, the request may include user authentication information and payment authority information. According to an embodiment, the service server 400 may perform user authentication, using information included in the request. According to an embodiment, when the user authentication is completed, the service server 400 may register a user having the payment authority. According to an embodiment, the service server 400 may transmit information about a state, where a payment function set to an emoji is activated, to the second electronic device 200. According to an embodiment, when selecting the received emoji, the second electronic device 200 may perform operation 1033. According to another embodiment, when selecting the received emoji, the second electronic device 200 may receive separate information (e.g., URL information or guide for authentication process) for performing operation 1033 and may perform operation 1033 by using the separate information.

According to an embodiment, in operation 1035, the second electronic device 200 may display the activated state of the function set to the emoji, on the emoji. For example, the second electronic device 200 may change an emoji (e.g., achromatic emoji) in a deactivated state into an emoji (e.g., chromatic emoji) in an activated state. For example, the second electronic device 200 may display an authority (or condition) capable of performing a function set to the emoji, on the emoji.

According to an embodiment, the second electronic device 200 may transmit information about a state, where the function of the emoji is activated, to the first electronic device 100. According to an embodiment, in operation 1037, the message server 300 may deliver information about the activated state to the first electronic device 100. According to an embodiment, the message server 300 may store information about the activated state in a database.

According to an embodiment, in operation 1039, the first electronic device 100 may display the activated state of the function set to the emoji, on the emoji. For example, the first electronic device 100 may change an emoji (e.g., achromatic emoji) in a state, where a payment function is deactivated, into an emoji (e.g., chromatic emoji) in an activated state. For example, the first electronic device 100 may display one or more of pieces of state information such as whether an emoji function of the second electronic device 200 is performed, whether to perform authentication, whether the authentication is successful, and the like.

According to an embodiment, in operation 1041, the second electronic device 200 may transmit payment account information (e.g., the identifier of the electronic device) and user authentication information to a payment terminal 500 depending on a user input for performing a payment function. According to an embodiment, in operation 1043, the payment terminal 500 may transmit payment request information to the service server 400, using the payment account information. For example, the payment request information may include payment amount information, payment account information (e.g., identification information of an electronic device), and authentication information. The payment terminal 500 may include one or more of a terminal of a payment system (e.g., point of sales (POS) system) at an offline store, an online payment terminal, or an online shopping mall server.

According to an embodiment, in operation 1045, the service server 400 may perform payment approval, using payment request information. According to an embodiment, the service server 400 may transmit information about the result of the payment approval to the first electronic device 100, the second electronic device 200, and the payment terminal 500.

According to an embodiment, in operation 1051 and operation 1053, the first electronic device 100 and the second electronic device 200 may change the state of the emoji depending on the result of the payment approval. For example, the first electronic device 100 and the second electronic device 200 may change the emoji (e.g., chromatic emoji), to which a payment function is activated, into the deactivated emoji (e.g., achromatic emoji). For example, when it is determined that the result of the payment approval indicates an abnormal transaction or when the payment limit is exceeded, it is possible to change the state of the emoji into the inactive emoji, and the use of the function set to the emoji may be prohibited later in the service server. According to an embodiment, in operation 1055, the payment terminal 500 may display the result of the payment approval on the display.

According to another embodiment, in operation 1041 and operation 1043, the second electronic device 200 may receive payment account information from the payment terminal 500, and may transmit payment request information to the service server 400 using the received information. For example, the payment terminal 500 may be the terminal of a payment system at an online store.

Accordingly, the second electronic device 200 may perform a payment function through the emoji transmitted from the first electronic device 100.

Figure 11A:
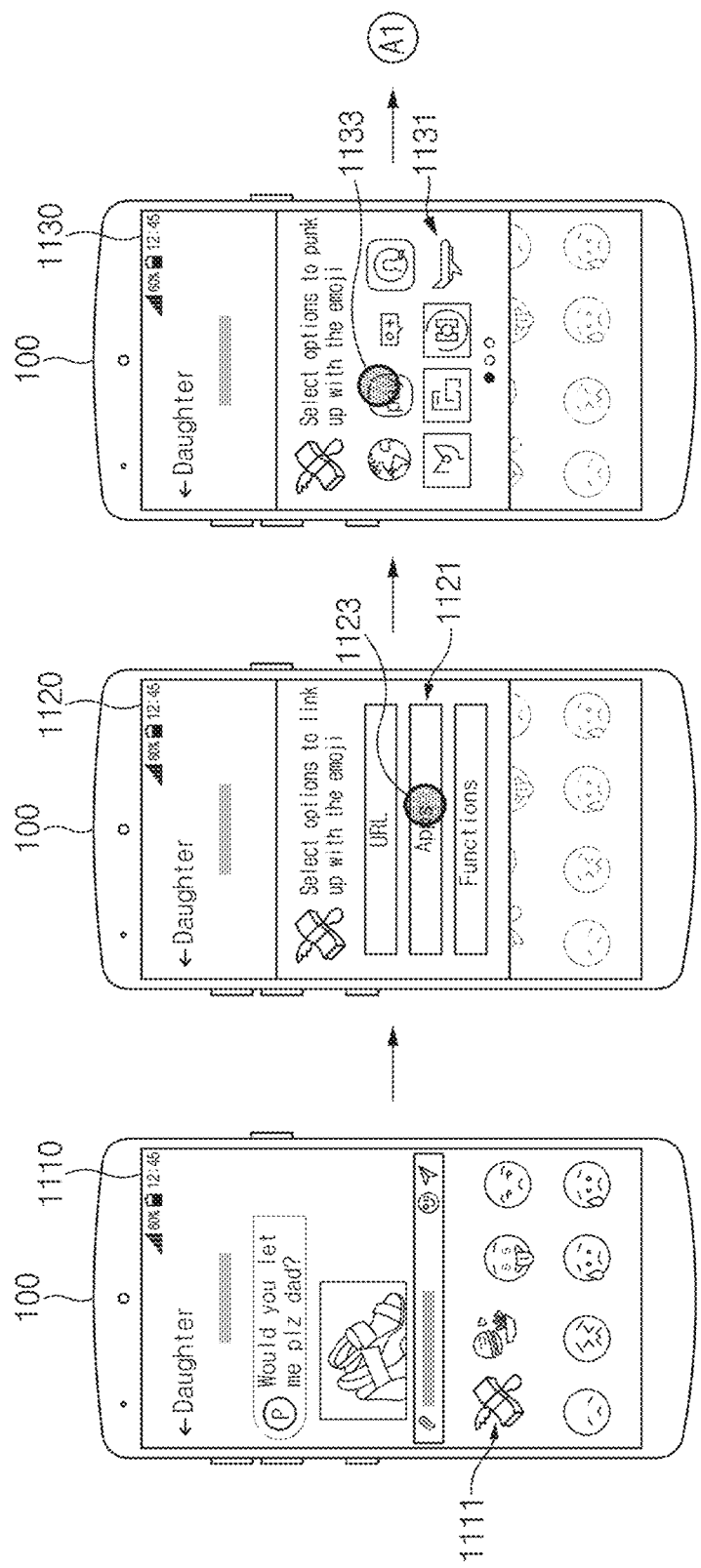
FIGS. 11A and 11B are views illustrating screens in each of which a first electronic device sets a payment function to a selected emoji, according to an embodiment.
Figure 11B:
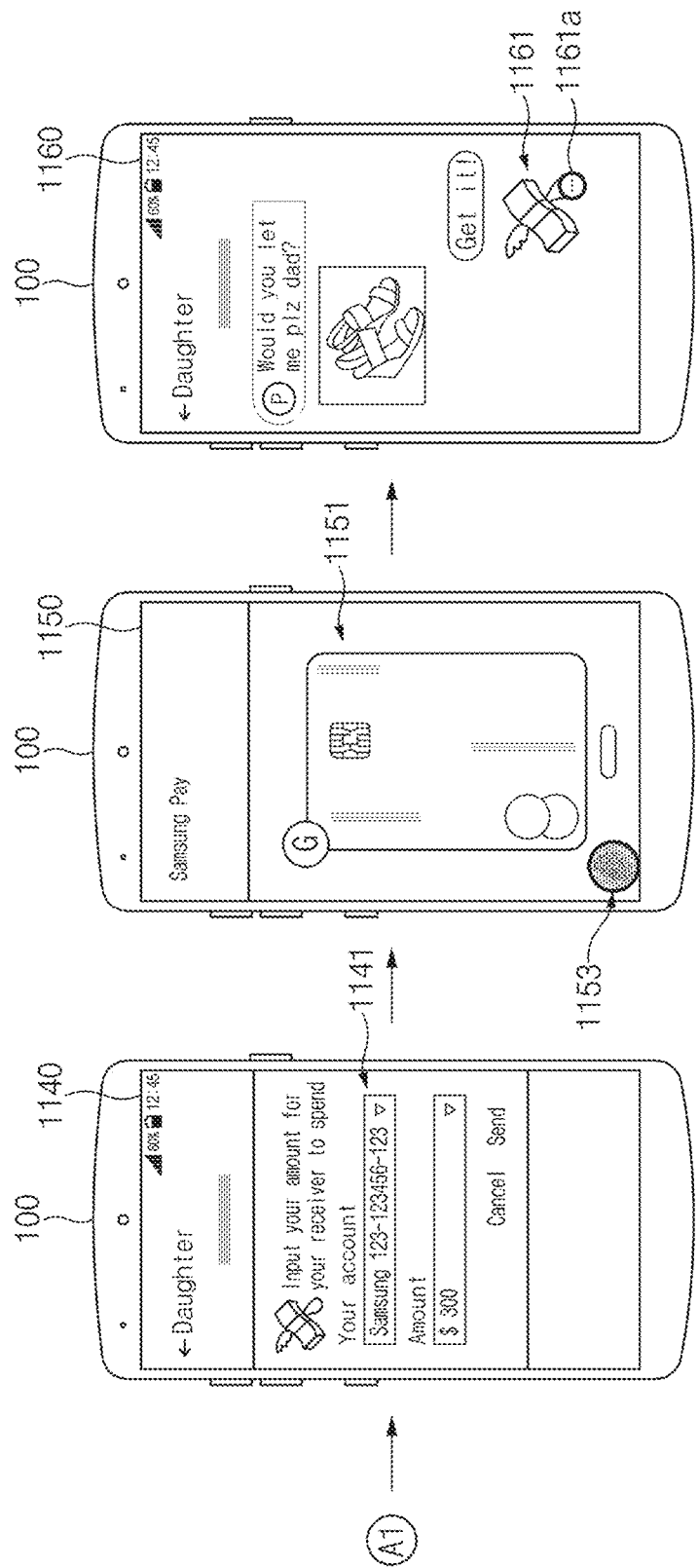

FIGS. 11A and 11B are views illustrating screens in each of which a first electronic device sets a payment function to a selected emoji, according to an embodiment.

Referring to FIGS. 11A and 11B, the first electronic device 100 may set a payment function to the selected emoji.

According to an embodiment, in screen 1110, the first electronic device 100 may receive a user input 1111 for selecting an emoji.

According to an embodiment, in screen 1120, the first electronic device 100 may display a method 1121 for setting a payment function to the selected emoji on the display and may receive a user input 1123 to select a method of executing a payment function. For example, the first electronic device 100 may receive the user input 1123 to select a method of executing the payment function, through an application.

According to an embodiment, in screen 1130, the first electronic device 100 may display an application 1131 capable of performing a specified function depending on the determined method, on a display and may receive a user input 1133 to select an application (e.g., a payment app) performing a payment function.

According to an embodiment, in screen 1140, the first electronic device 100 may display the UI of the payment app on the display and may receive payment information 1141 from a user. For example, the payment information 1141 may include card information (e.g., a card number) and amount information.

According to an embodiment, in screen 1150, the first electronic device 100 may display payment information 1151 (e.g., payment means information) on the UI of a payment app. According to an embodiment, the first electronic device 100 may perform user authentication 1153 for performing a payment function.

According to an embodiment, in screen 1160, the first electronic device 100 may display an emoji 1161, to which a payment function is set, on the UI of a message app. The first electronic device 100 may display a state 1161a before the payment function is executed, on the emoji 1161.

Accordingly, the first electronic device 100 may transmit the emoji, to which the payment function is set, to another electronic device (e.g., the second electronic device 200 of FIG. 10).

Figure 12A:
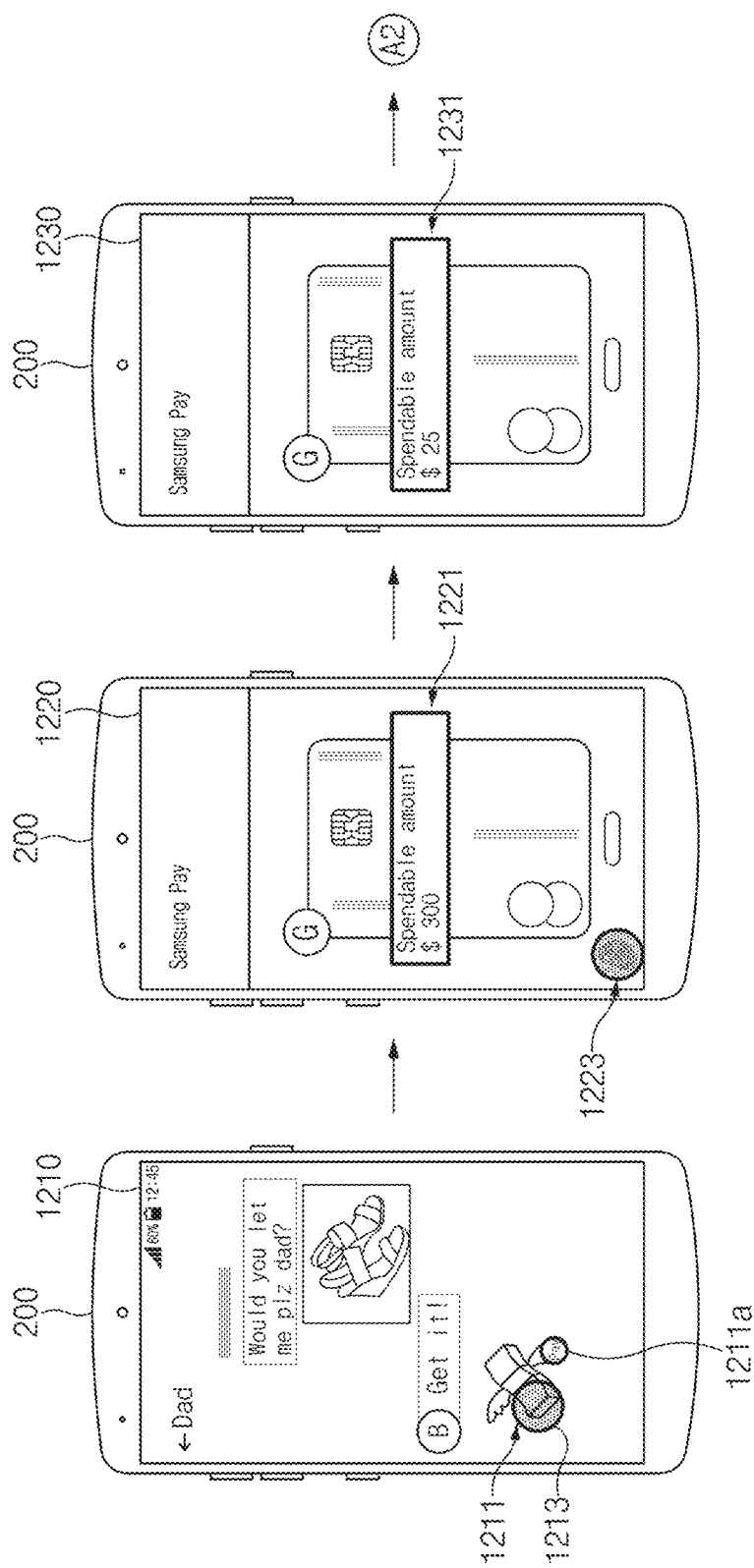
FIGS. 12A and 12B are views illustrating screens on each of which a reception device performs a payment function of a received emoji, according to an embodiment.
Figure 12B:
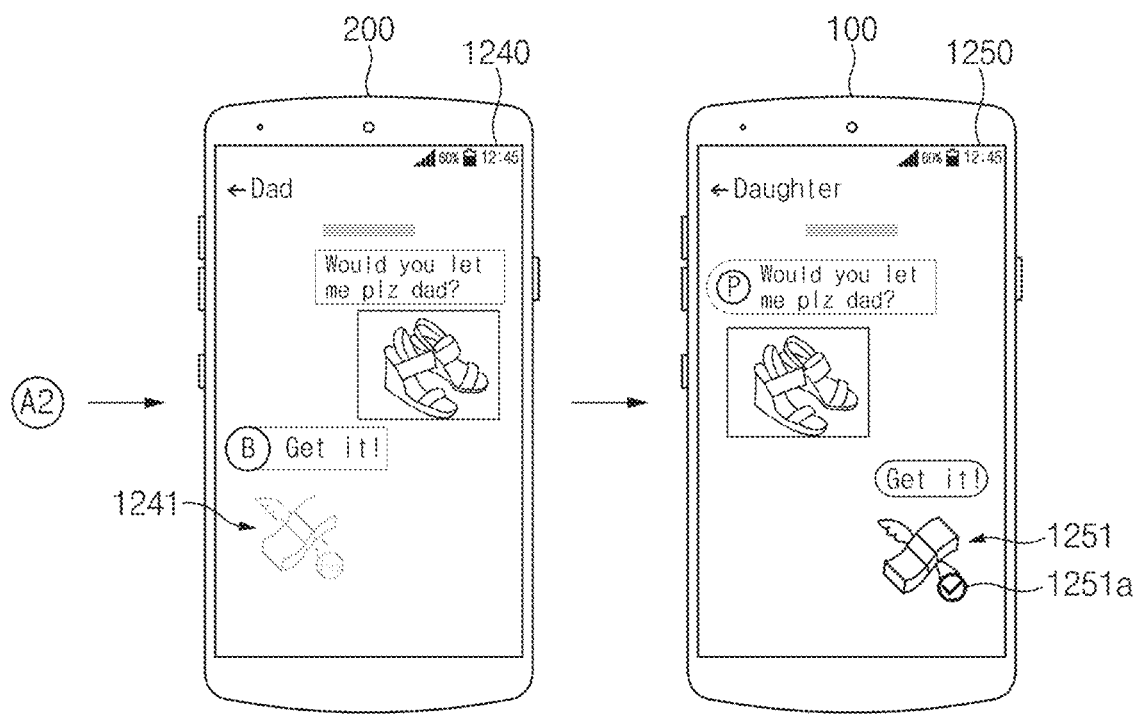

FIGS. 12A and 12B are views illustrating screens on each of which a reception device performs a payment function of a received emoji, according to an embodiment.

Referring to FIGS. 12A and 12B, the second electronic device 200 may receive an emoji, to which a payment function is set.

According to an embodiment, in screen 1210, the second electronic device 200 may receive an emoji 1211, to which a payment function is set, and may display the emoji 1211, to which the payment function is set, on the UI of a message app. The second electronic device 200 may display a payment app 1211a performing a payment function on the emoji 1211. According to an embodiment, the second electronic device 200 may receive a user input 1213 to select the emoji 1211 to which the payment function is set.

According to an embodiment, in screen 1220, the second electronic device 200 may execute an application (e.g., a payment app) for performing a payment function and may display the UI of a payment app on a display. The second electronic device 200 may display a payable amount 1221 on the UI of the payment app. According to an embodiment, the first electronic device 100 may perform user authentication 1223 for performing the payment function. For example, when the second electronic device 200 requests the service server 400 to make a payment, the service server 400 may transmit information for determining whether a payment is approved, to the first electronic device 100 and may display the transmitted information on the display. The first electronic device 100 may determine whether to approve a payment, based on the received user input. The first electronic device 100 may transmit information for determining whether to approve a payment to the service server 400. The service server 400 may determine whether to approve the request for the payment of the second electronic device 200, based on the received information for determining whether to approve a payment.

According to an embodiment, in screen 1230, when completing the execution of the payment function, the second electronic device 200 may display a balance 1231 after the payment, on the UI of the payment app.

According to an embodiment, in screen 1240, after performing the payment function, the second electronic device 200 may display an emoji 1241 in an inactivated state, on the UI of the message app. In other words, the second electronic device 200 may change the emoji 1211 (e.g., chromatic emoji) in the activated state into the emoji 1241 (e.g., achromatic emoji) in the inactivated state. For example, when all payable amounts have been spent, when the expiration date has elapsed, or when the number of uses has been exhausted, the deactivated emoji 1241 may be displayed; otherwise, the payable amount, the expiration date, and the remaining usable counts may be displayed.

According to an embodiment, in screen 1250, the first electronic device 100 may display a state 1251a, where the execution of the payment function is completed by the second electronic device 200, on an emoji 1251 displayed on the UI of the message app. In other words, the first electronic device 100 may change the emoji (e.g., the emoji 1211 of FIG. 11) where a state before the payment function is executed is displayed, into the emoji 1251 where the state 1251a where the execution of the payment function is completed is displayed.

According to an embodiment, the first electronic device 100 may display a state after the payment function is executed. For example, when the authority (e.g., when all payable amounts have been spent, when the expiration date has elapsed, when the number of uses has been exhausted, or the like) expires, the deactivated emoji 1241 may be displayed; otherwise, the remaining authorities (e.g., the payable amount, the expiration date, the remaining usable counts, and the like) may be displayed.

Accordingly, the second electronic device 200 may perform the payment function set to the emoji.

Figure 13:
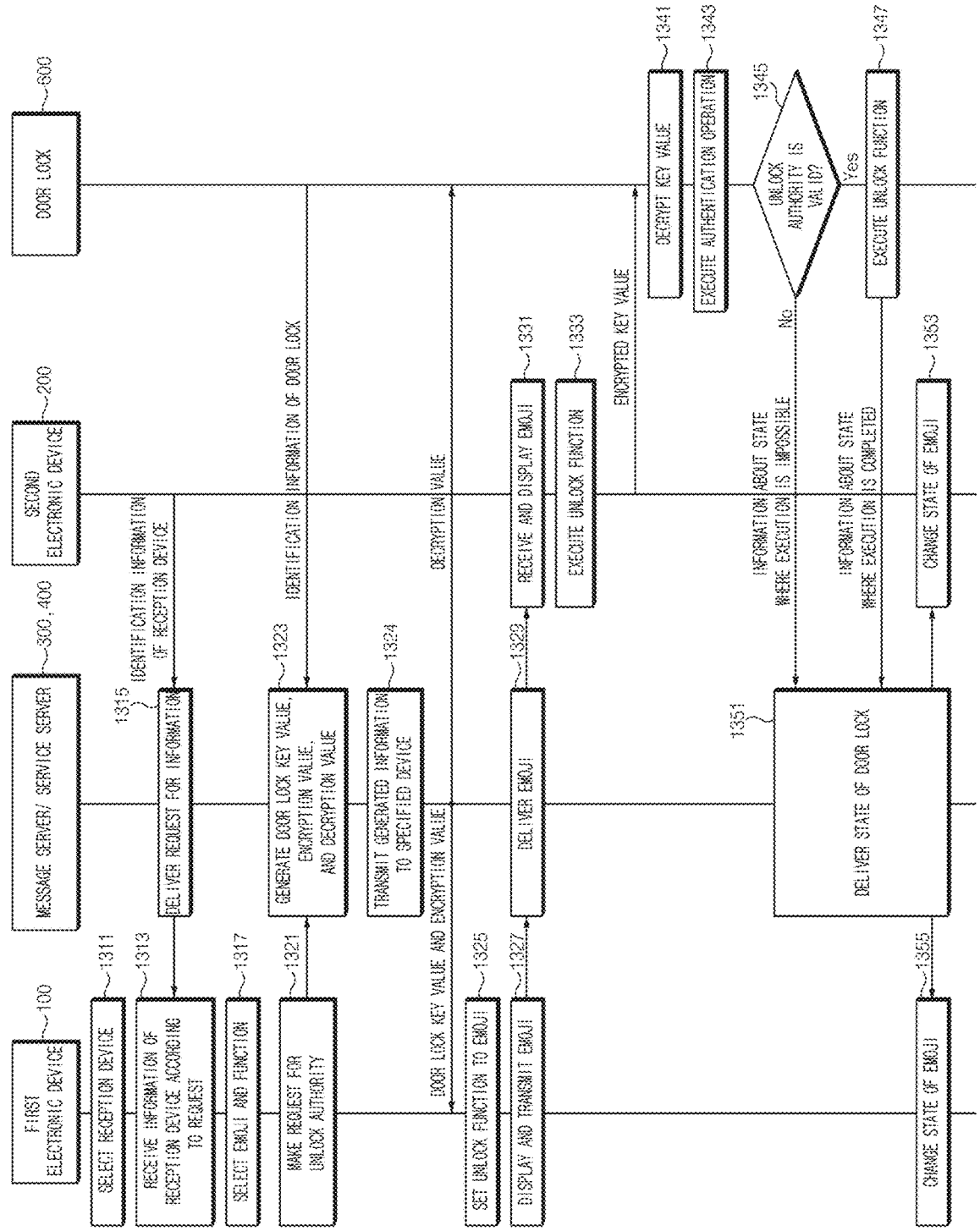
FIG. 13 is a sequence diagram illustrating a process in which a first electronic device transmits an emoji, to which a function of unlocking a door lock is set, to a second electronic device according to an embodiment.
Figure 14:
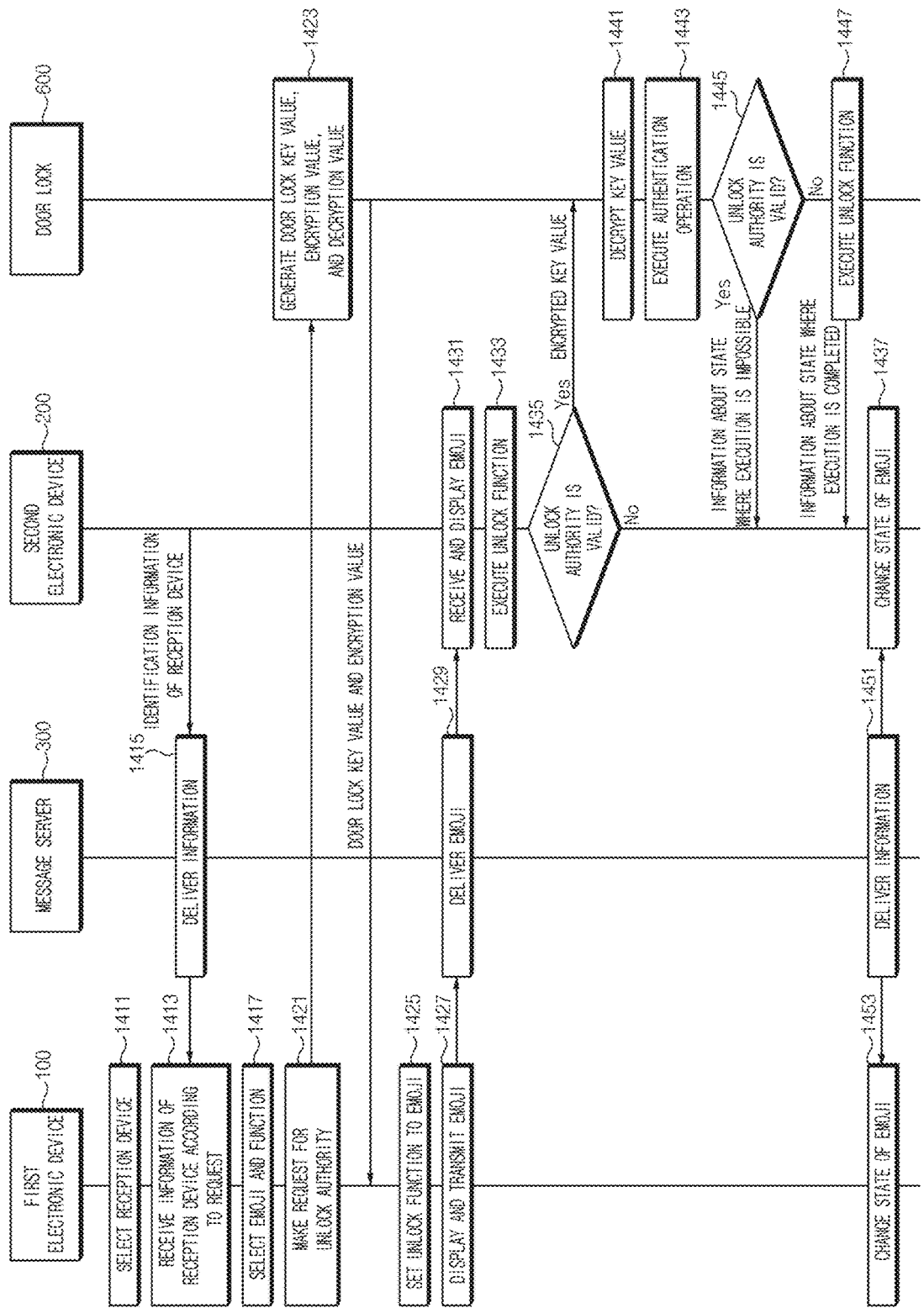
FIG. 14 is a sequence diagram illustrating a process in which a first electronic device transmits an emoji, to which a function of unlocking a door lock is set, to a second electronic device according to various embodiments.

FIGS. 13 and 14 are sequence diagrams illustrating a process in which a first electronic device transmits an emoji, to which a function of unlocking a door lock is set, to a second electronic device according to an embodiment.

Referring to FIG. 13, the first electronic device 100 may transmit an emoji to the second electronic device 200 to execute a function of unlocking a door lock 600. The door lock service server 400 may provide a door lock service to the first electronic device 100 and the second electronic device 200. For example, the message server 300 and the door lock service server 400 may be implemented as a single server.

According to an embodiment, in operation 1311, the first electronic device 100 may select the second electronic device 200 as a reception device depending on a user input.

According to an embodiment, in operation 1313, the first electronic device 100 may receive identification information of a reception device and information associated with a recipient as a request according to the user input. According to an embodiment, in operation 1315, the message server 300 may transmit identification information of the reception device to the first electronic device 100. According to an embodiment, the message server 300 may store identification information of the reception device in a database.

According to an embodiment, in operation 1317, the first electronic device 100 may select an emoji depending on the user input and may select a function of unlocking the door lock to be set to the selected emoji.

According to an embodiment, in operation 1321, the first electronic device 100 may transmit a request for receiving unlock authority information to the service server 400. For example, the request may include identification information of a transmission device (e.g., the first electronic device 100) and identification information of a reception device (e.g., the second electronic device 200).

According to an embodiment, in operation 1323, the service server 400 may generate a door lock key value for unlocking the door lock 600. In addition, the service server 400 may generate a pair of an encryption value and a decryption value for encrypting the key value. For example, the service server 400 may receive identification information of the door lock 600 from the door lock 600 and may generate the key value, using the identification information. According to an embodiment, in operation 1324, the service server 400 may transmit the generated information to the specified device. For example, the service server 400 may transmit unlock authority information to the first electronic device 100 and may transmit the decryption value to the door lock 600. For example, the unlock authority information may include a door lock key value and the encryption value.

According to an embodiment, in operation 1325, the first electronic device 100 may set a function of unlocking a door lock to an emoji, using the unlock authority information. For example, the first electronic device 100 may encrypt the key value, using the encryption value included in the unlock authority information, may include the encrypted key value in the emoji, and thus may set the function of unlocking the door lock on the emoji. According to an embodiment, the first electronic device 100 may set the authority (or condition) capable of performing the function to the emoji, depending on a user input. The first electronic device 100 may include information about the authority capable of performing the function in the emoji. For example, the authority capable of performing the function may include information about the period of use, the number of times, a room number, and the like.

According to an embodiment, in operation 1327, the first electronic device 100 may display the emoji, to which the function of unlocking a door lock is set, on a display and may transmit the emoji to the second electronic device 200. According to an embodiment, in operation 1329, the message server 300 may deliver the emoji to the second electronic device 200. According to an embodiment, the message server 300 may store information about the emoji in a database.

According to an embodiment, in operation 1331, the second electronic device 200 may receive an emoji capable of unlocking the door lock and may display the emoji on the display.

According to an embodiment, in operation 1333, the second electronic device 200 may perform a function of unlocking the door lock depending on a user input to select the emoji. According to an embodiment, the second electronic device 200 may transmit information for unlocking the door lock to the door lock 600. For example, the second electronic device 200 may transmit information for unlocking the door lock to the door lock 600 through a wireless communication module (or a wireless communication interface) such as a near filed communication (NFC) module, a Bluetooth module, or the like. For example, the information for unlocking the door lock may include a key value and identification information of the second electronic device 200. According to an embodiment, the second electronic device 200 may transmit information about the time and number of times that the function has been performed together with the key value included in the emoji to the door lock 600.

According to an embodiment, the second electronic device 200 may maintain an activation state for performing a function for unlocking a door lock during a specified time. For example, the second electronic device 200 may maintain a state, in which a key value included in an emoji is capable of being transmitted, during a specified time.

According to an embodiment, the second electronic device 200 may display the execution state of the function for unlocking the door lock on the emoji. Furthermore, the second electronic device 200 may transmit the execution state to the first electronic device 100 through the message server 300. The first electronic device 100 may display the changed execution state on the emoji.

According to an embodiment, in operation 1341, the door lock 600 may decrypt the received key value. The door lock 600 may decrypt the encrypted key value, using the decryption value received from the service server 400. According to an embodiment, in operation 1343, the door lock 600 may perform an authentication operation, using the decrypted key value. For example, the door lock 600 may determine whether the decrypted key value corresponds to identification information of the door lock 600. In other words, the door lock 600 may determine whether the decrypted key value corresponds to the key value generated using the identification information of the door lock 600.

According to an embodiment, in operation 1345, the door lock 600 may determine whether the authority is valid. In other words, the door lock 600 may determine whether a condition (e.g., the period of use, the number of times, a room number, and the like) capable of performing an unlock function is satisfied. According to an embodiment, when the authority is not valid (No), the door lock 600 may transmit information about a state, where a function is not capable of being executed, to the service server 400. According to an embodiment, in operation 1347, when the authority is valid (Yes), the door lock 600 may be changed from a lock state to an unlock state. The door lock 600 may transmit information about a state, where the execution of the function is completed, to the service server 400.

According to an embodiment, in operation 1351, the service server 400 may deliver the state of the door lock 600 according to the received information to the first electronic device 100 and the second electronic device 200. According to an embodiment, in operation 1353 and operation 1355, the first electronic device 100 and the second electronic device 200 may change the state of the emoji depending on the delivered state of the door lock 600. For example, when receiving information about a state where the execution of a function is impossible, the first electronic device 100 and the second electronic device 200 may change an emoji (e.g., chromatic emoji) in the activated state displayed on the display into an emoji (e.g., achromatic emoji) in the deactivated state. For example, when the authentication of the second electronic device 200 fails or when the authority has expired, the emoji in the inactive state may be displayed, or the reason (e.g., authentication failure, authority expiration) for the deactivated state may be overlaid or composed in the form of a button image on the emoji and then may be displayed. For another example, when receiving information about the state where the execution of a function is completed, the first electronic device 100 and the second electronic device 200 may display a state where the door lock 600 is unlocked, on the emoji displayed on the display.

Referring to FIG. 14, the first electronic device 100 may transmit an emoji to the second electronic device 200 to perform a function of unlocking the door lock 600.

The door lock 600 may provide a door lock service to the first electronic device 100 and the second electronic device 200 without passing through a door lock service server (e.g., the door lock service server 400 of FIG. 13).

According to an embodiment, in operation 1411, operation 1413, operation 1415, and operation 1417, similarly to operation 1311, operation 1313, operation 1315, and operation 1317 of FIG. 13, the first electronic device 100 may select the second electronic device 200 as a reception device, may receive identification information of the reception device and information about a recipient from the second electronic device 200, and may select an emoji to be transmitted to the second electronic device 200.

According to an embodiment, in operation 1421, the first electronic device 100 may transmit a request for receiving unlock authority information to the door lock 600. According to an embodiment, in operation 1423, the door lock 600 may generate a key value for unlocking the door lock 600. In addition, the door lock 600 may generate a pair of an encryption value and a decryption value for encrypting the key value. According to an embodiment, the door lock 600 may transmit unlock authority information to the first electronic device 100.

According to an embodiment, in operation 1425 and operation 1427, similarly to operation 1325 and operation 1327 of FIG. 13, the first electronic device 100 may set the function of unlocking a door lock to an emoji, may display the emoji on a display, and may transmit the emoji to the second electronic device 200. According to an embodiment, in operation 1429, similarly to operation 1329 of FIG. 13, the message server 300 may deliver the emoji to the second electronic device 200. According to an embodiment, the message server 300 may store information about the emoji in a database.

According to an embodiment, in operation 1431, similarly to operation 1331 of FIG. 13, the second electronic device 200 may receive an emoji capable of unlocking the door lock and may display the emoji on the display.

According to an embodiment, in operation 1433, the second electronic device 200 may perform a function of unlocking the door lock. According to an embodiment, in operation 1435, the second electronic device 200 may determine whether the authority to unlock the door lock 600 is valid. According to an embodiment, in operation 1437, when the authority is not valid (No), the second electronic device 200 may change the state of the emoji. For example, the second electronic device 200 may change an emoji (e.g., chromatic emoji) in the activated state, which is displayed on a display, into an emoji (e.g., achromatic emoji) in the inactivated state. According to an embodiment, when the authority is valid (Yes), the second electronic device 200 may transmit information for unlocking the door lock to the door lock 600. For example, the information for unlocking the door lock may include a key value and identification information of the second electronic device 200.

According to an embodiment, in operation 1441, operation 1443, and operation 1445, similarly to operation 1341, operation 1343, and operation 1345 of FIG. 13, the door lock 600 may decrypt the received key value, may perform an authentication operation, using the decrypted key value, and may determine whether the authority is valid. According to an embodiment, when the authority is not valid (No), the door lock 600 may transmit information about a state, where a function is not capable of being executed, to the second electronic device 200. According to an embodiment, in operation 1447, similarly to operation 1347 of FIG. 13, when the authority is valid (Yes), the door lock 600 may be changed from a lock state to an unlock state. The door lock 600 may transmit information about a state, where the execution of the function is completed, to the second electronic device 200.

According to an embodiment, in operation 1437, the second electronic device 200 may change the emoji depending on the delivered state of the door lock 600. For example, when receiving information about a state where the execution of a function is impossible, the second electronic device 200 may change an emoji (e.g., chromatic emoji) in the activated state displayed on the display into an emoji (e.g., achromatic emoji) in the deactivated state. For another example, when receiving information about the state where the execution of a function is completed, the second electronic device 200 may display a state where the door lock 600 is unlocked, on the emoji displayed on the display.

According to an embodiment, the second electronic device 200 may transmit information about the change state of the emoji to the first electronic device 100. According to an embodiment, the message server 300 may deliver information about the change state of the emoji to the first electronic device 100. According to an embodiment, in operation 1453, the first electronic device 100 may change the emoji according to information about the change state of the emoji.

Accordingly, the second electronic device 200 may perform a function of unlocking the door lock through the emoji transmitted from the first electronic device 100.

Figure 15A:
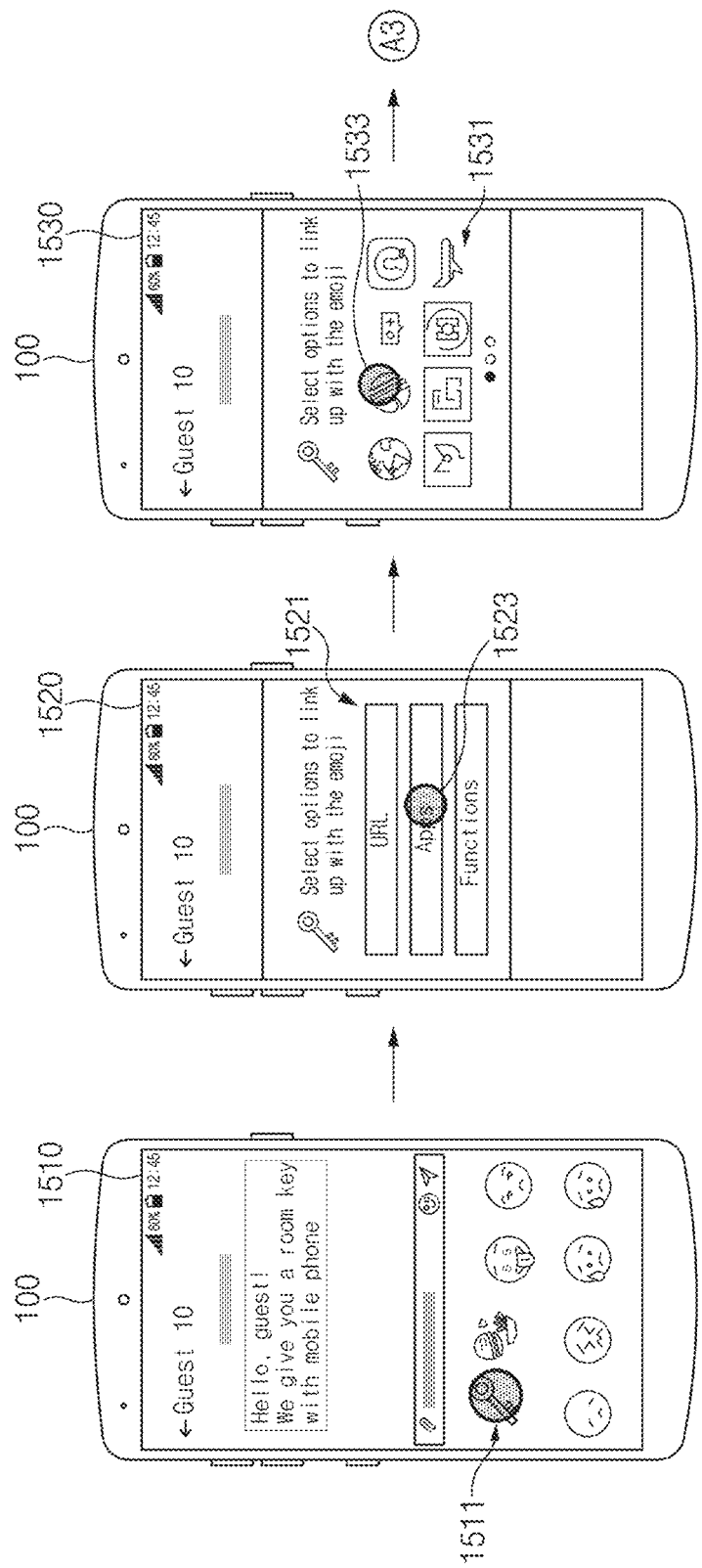
FIGS. 15A and 15B are views illustrating screens in each of which a first electronic device sets an unlock function to a selected emoji, according to an embodiment.
Figure 15B:
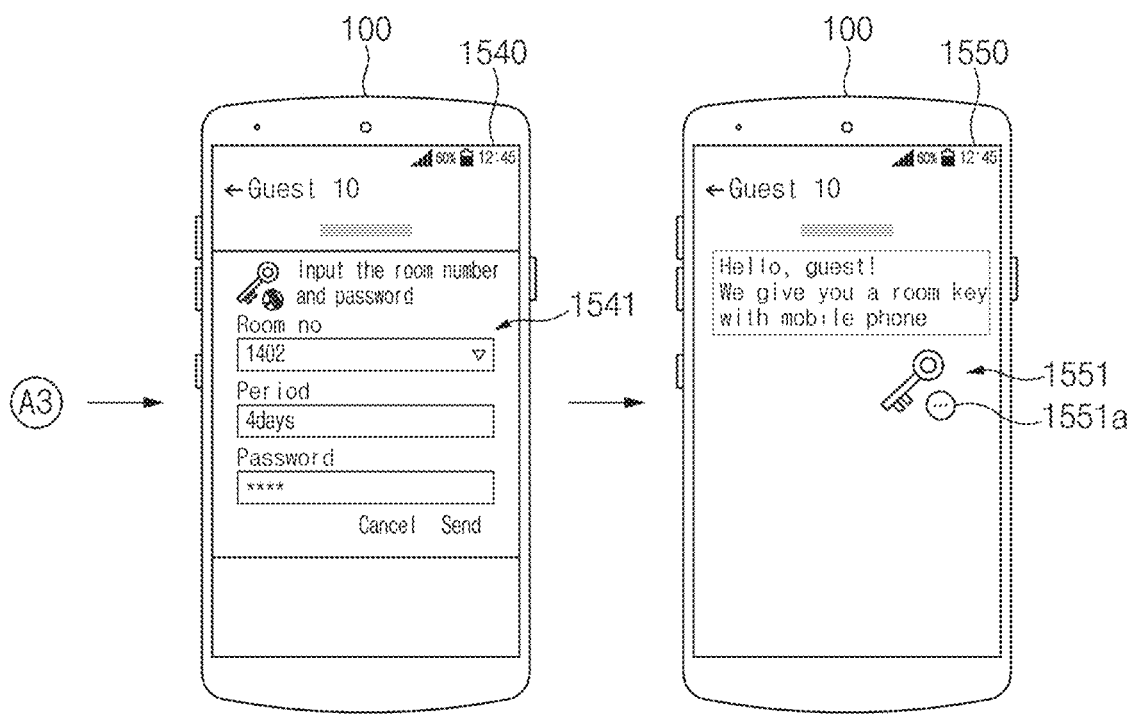

FIGS. 15A and 15B are views illustrating screens in each of which a first electronic device sets an unlock function to a selected emoji, according to an embodiment.

Referring to FIGS. 15A and 15B, the first electronic device 100 may set a function of unlocking the door lock on the selected emoji.

According to an embodiment, in screen 1510, the first electronic device 100 may receive a user input 1511 to select an emoji.

According to an embodiment, in screen 1520, the first electronic device 100 may display a method 1521 for setting a function for unlocking the door lock to the selected emoji on a display and may receive a user input 1523 for selecting a method of performing a function for unlocking a door lock. For example, the first electronic device 100 may receive the user input 1523 to select a method of performing the function for unlocking a door lock, through an application.

According to an embodiment, in screen 1530, the first electronic device 100 may display an application 1531 capable of performing a specified function depending on the determined method, on the display and may receive a user input 1533 to select an application (e.g., a door lock app) performing the function for unlocking a door lock.

According to an embodiment, in screen 1540, the first electronic device 100 may display the UI of the door lock app on the display and may receive information 1541 about the authority capable of performing the function from a user. For example, the information 1541 about authority may include information about a room number and a period.

According to an embodiment, in screen 1550, the first electronic device 100 may display an emoji 1551, to which a function of unlocking the door lock is set, on the UI of the message app. The first electronic device 100 may display a state 1551a before the function of unlocking the door lock is executed, on the emoji 1551.

Accordingly, the first electronic device 100 may transmit an emoji, to which a function of unlocking a door lock is set, to another electronic device (e.g., the second electronic device 200 of FIGS. 13 and 14).

Figure 16A:
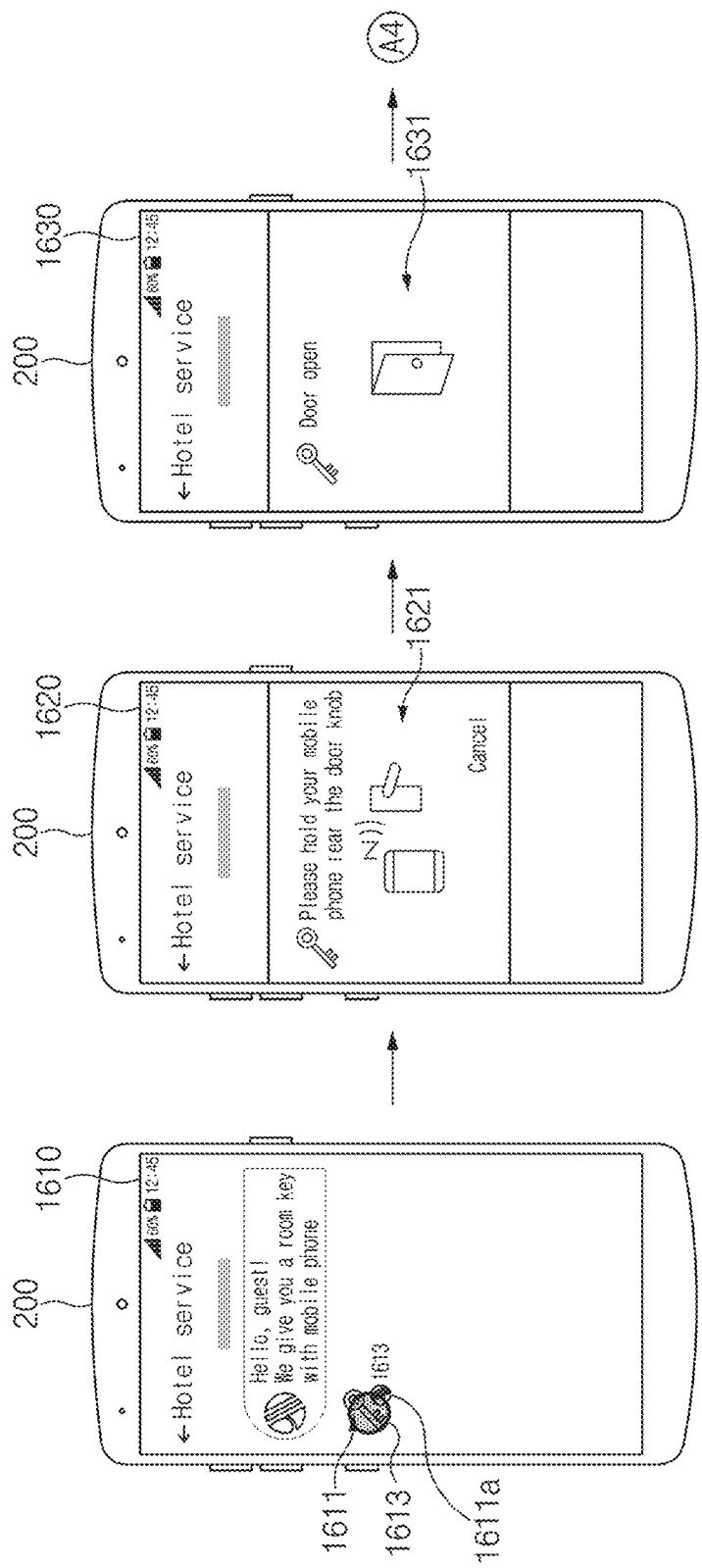
FIGS. 16A and 16B are views illustrating screens, in each of which a first electronic device receives an emoji, to which a function of unlocking a door lock is set, according to an embodiment.
Figure 16B:
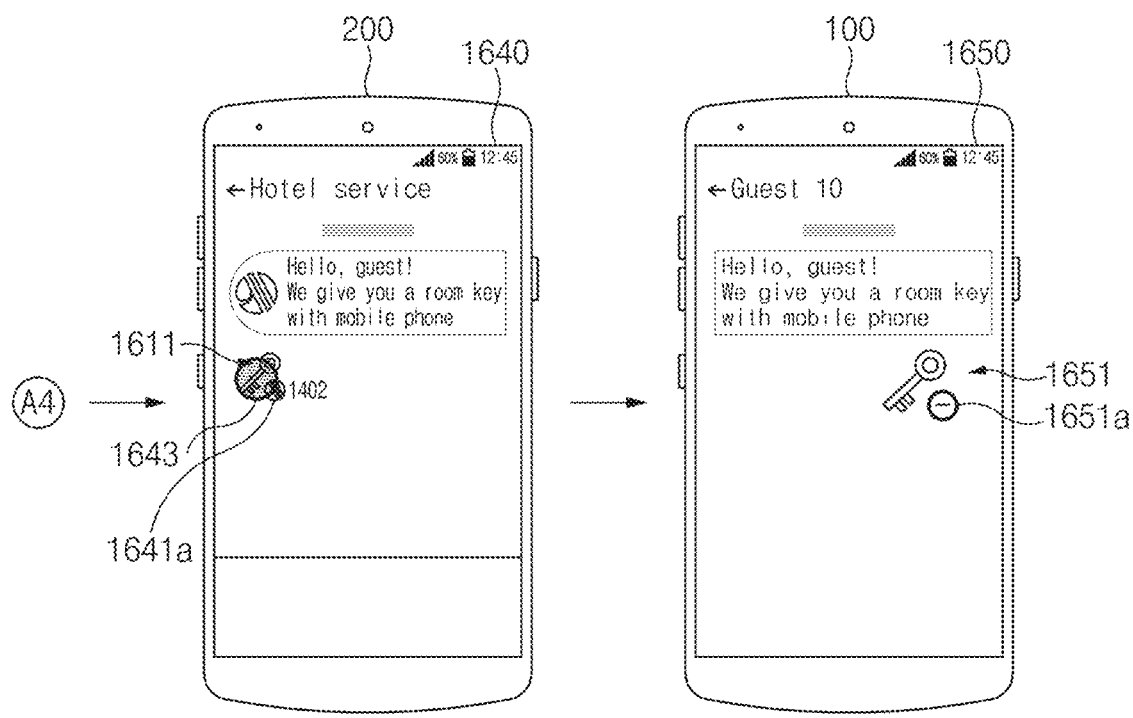

In FIGS. 16A and 16B, a first electronic device according to an embodiment may receive an emoji, to which a function of unlocking a door lock is set.

Referring to FIGS. 16A and 16B, the second electronic device 200 may receive an emoji, to which a function of unlocking the door lock is set.

According to an embodiment, in screen 1610, the second electronic device 200 may receive an emoji 1611, to which a function of unlocking the door lock is set. The second electronic device 200 may display the received emoji 1611 on the UI of a message app. The second electronic device 200 may display a door lock app 1611a performing a function of unlocking a door lock on the emoji 1611. According to an embodiment, the second electronic device 200 may receive a user input 1613 to select the emoji 1611, to which an unlock function of the door lock is set.

According to an embodiment, in screen 1620, the second electronic device 200 may execute the door lock app depending on the received user input 1613 and may display the UI of a door lock app on the display. The second electronic device 200 may display a method 1621 of performing the function on the UI of the door lock app.

According to an embodiment, in screen 1630, when completing the execution of the function of unlocking the door lock, the second electronic device 200 may display a state 1631, where the door lock is unlocked, on the UI of the door lock app.

According to an embodiment, in screen 1640, after performing the function, the second electronic device 200 may display a state 1641a, where the door lock is unlocked, on an emoji 1611 displayed on the UI of the message app.

According to an embodiment, in screen 1650, the first electronic device 100 may display an emoji 1651, in which a state 1651a where the door lock is opened is displayed, on the UI of the message app.

Accordingly, the second electronic device 200 may perform a function of unlocking the door lock set to the emoji.

Figure 17:
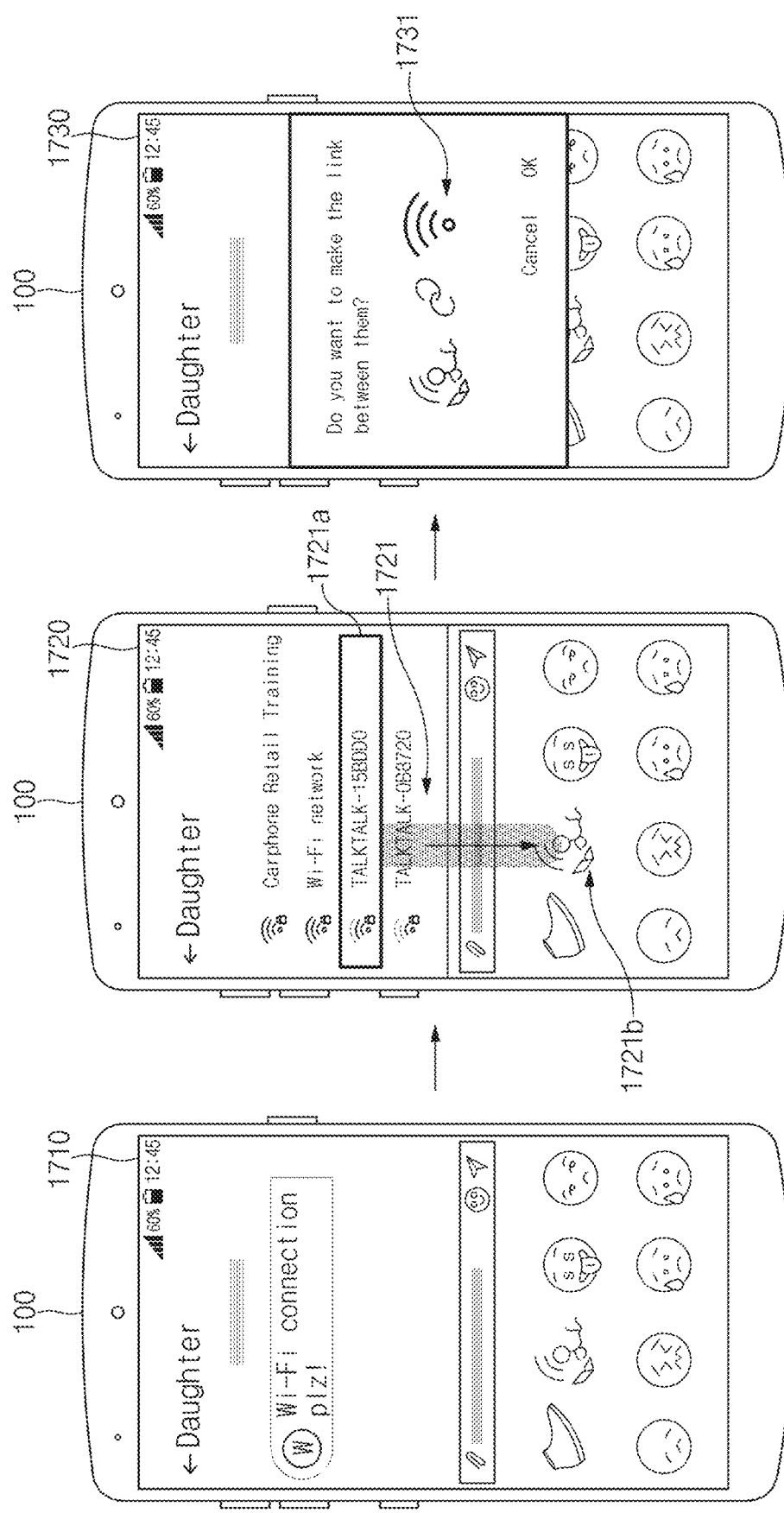
FIG. 17 is a view illustrating a screen, in which a first electronic device sets a specified function to an emoji depending on a user's drag input, according to an embodiment.

FIG. 17 is a view illustrating a screen, in which a first electronic device sets a specified function to an emoji depending on a user's drag input, according to an embodiment.

Referring to FIG. 17, the first electronic device 100 may set the function selected in response to a user's touch input to an emoji selected in response to a drag input.

According to an embodiment, in screen 1710, the first electronic device 100 may display a UI for selecting an emoji on a display. According to an embodiment, the first electronic device 100 may receive a user input for displaying a screen indicating a function to be set to the emoji, on the display. For example, the first electronic device 100 may receive a user input for displaying a screen indicating a function of connecting to a wireless network on the display.

According to an embodiment, in screen 1720, the first electronic device 100 may display a function to be set to the emoji on the display. According to an embodiment, the first electronic device 100 may receive a drag input 1721 for setting a specified function to the emoji. For example, the first electronic device 100 may receive the drag input 1721 for setting a selected wireless network 1721a to a specified emoji 1721b. For example, the wireless network 1721a may be one or more of a Wi-Fi AP, a Cell AP (e.g., 5G CPE), or an electronic device (e.g., a home server, a home appliance, a robot, a drone, or wireless communication device) associated with a corresponding network ID.

According to an embodiment, in screen 1730, the first electronic device 100 may display information 1731 for setting the selected function on the emoji selected by the drag input 1721.

Accordingly, a user may set the specified function to the emoji, using an intuitive drag input.

Figure 18:
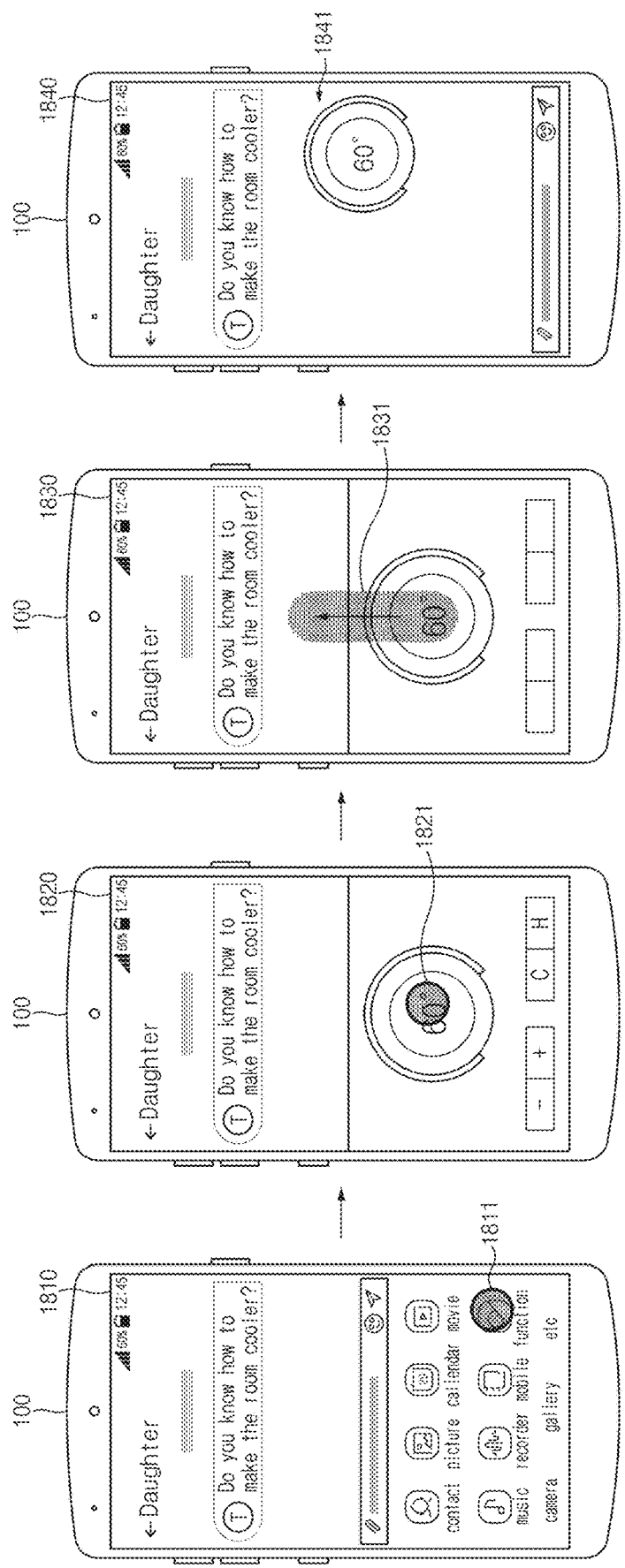
FIG. 18 is a diagram illustrating a screen in which a first electronic device uses at least part of a user interface (UI) of an executed application as an emoji, according to an embodiment.

FIG. 18 is a diagram illustrating a screen in which a first electronic device uses at least part of a user interface (UI) of an executed application as an emoji, according to an embodiment.

Referring to FIG. 18, the first electronic device 100 may use at least part of the UI of the application for performing the specified function as an emoji, to which the specified function is set.

According to an embodiment, in screen 1810, the first electronic device 100 may receive a user input 1811 for selecting a function to be set to the emoji. For example, the first electronic device 100 may receive the user input 1811 to select a function for adjusting a room temperature.

According to an embodiment, in screen 1820, the first electronic device 100 may display the UI of an application capable of performing the selected function on a display and may receive a user input 1821 to select at least part to be used as the emoji, in the displayed UI. For example, the first electronic device 100 may receive the user input 1821 to select a dial for displaying the room temperature.

According to an embodiment, in screen 1830, the first electronic device 100 may receive a user input 1831 for transmitting at least part of the UI of the application to the emoji. For example, the first electronic device 100 may receive a drag input 1831 to move a dial for displaying the room temperature to the UI of a message app.

According to an embodiment, in screen 1840, the first electronic device 100 may display at least part of the application as an emoji 1841 on the UI of the message app. For example, the first electronic device 100 may display a dial for displaying the room temperature as the emoji 1841 on the UI of a message displayed on the display.

Accordingly, the first electronic device 100 may select at least part of the UI of an application executing a specified function as an emoji and may use the selected part as an emoji to which the specified function is set.

Figure 19A:
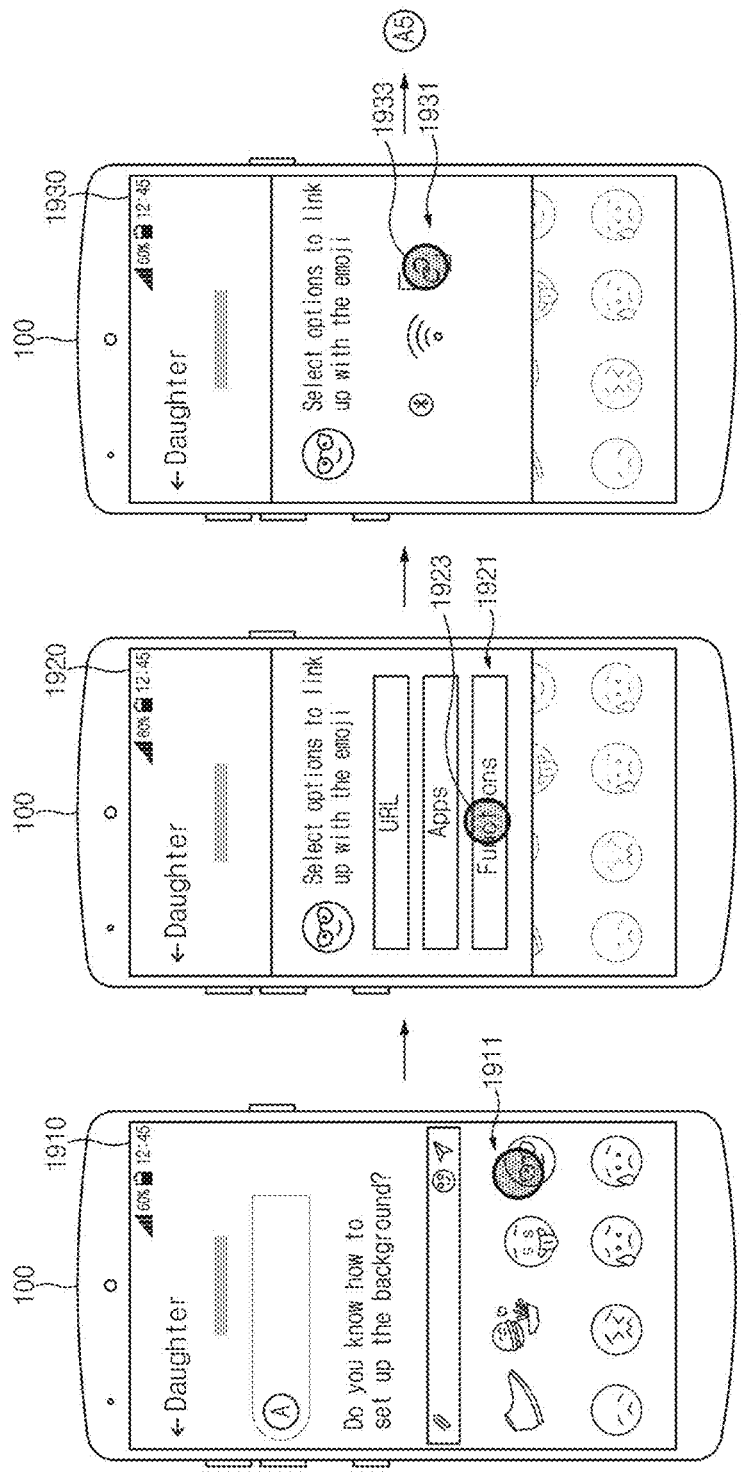
FIGS. 19A and 19B are views illustrating screens, in each of which a first electronic device sets a function becoming a specified state to an emoji, according to an embodiment.
Figure 19B:
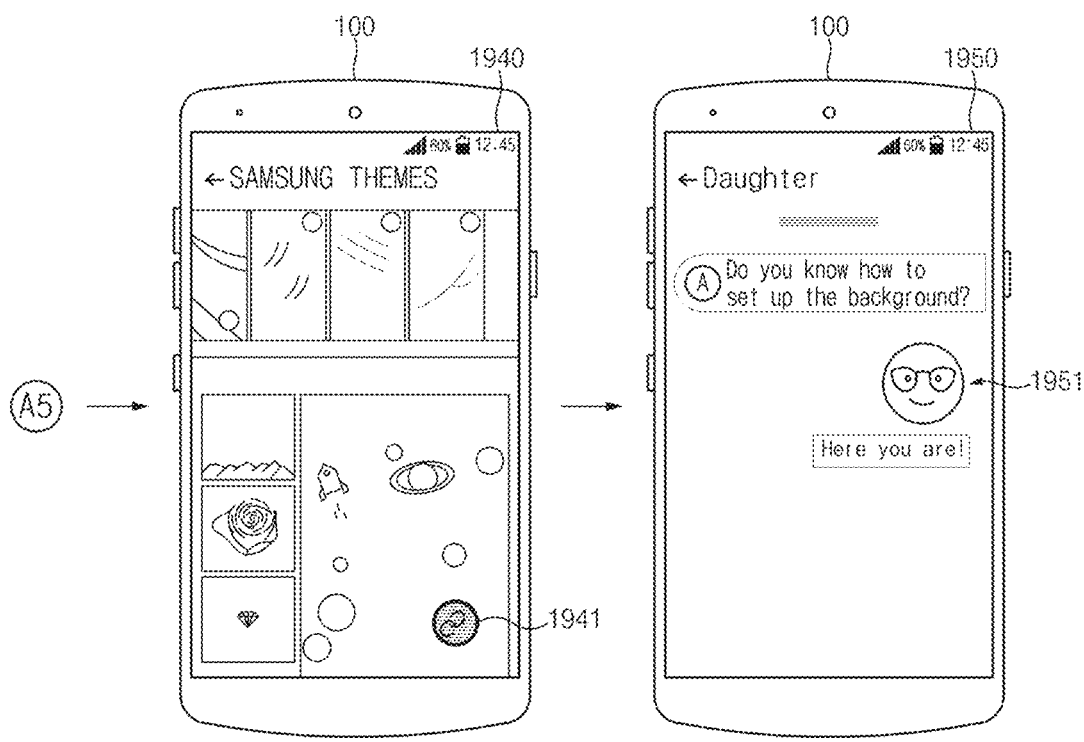

FIGS. 19A and 19B are views illustrating screens, in each of which a first electronic device sets a function becoming a specified state to an emoji, according to an embodiment.

Referring to FIGS. 19A and 19B, when the second electronic device 200 selects an emoji, the first electronic device 100 may set a function changed to the specified state to the emoji. For example, the first electronic device 100 may set a function of executing an app for setting a theme UI (e.g., wallpaper image) to the emoji.

According to an embodiment, in screen 1910, the first electronic device 100 may receive a user input 1911 for selecting an emoji.

According to an embodiment, in screen 1920, the first electronic device 100 may display a method 1921 for setting a function to be assigned to the selected emoji on a display and may receive a user input 1923 to select the displayed method. For example, the first electronic device 100 displays the emoji as menus corresponding to URL, apps, and control functions on the display and displays user input 1923 to select the control functions from the menus.

According to an embodiment, in screen 1930, the first electronic device 100 may display a plurality of methods (or control functions) 1931 for performing a specified operation according to the determined method on a display and may receive a user input 1933 to select one of the plurality of methods. For example, the first electronic device 100 may receive the user input 1933 to select one of functions for being changed to the specified state among a Bluetooth control function, a Wi-Fi control function, and a control function of being executed in a specified state.

According to an embodiment, in screen 1940, the first electronic device 100 may display a UI corresponding to the specified state on the display and may receive a user input 1941 for linking the specified state. For example, the specified state may be a state for setting up a background screen.

According to an embodiment, in screen 1950, the first electronic device 100 may display an emoji, to which a function of performing a specified operation is set, on a UI of a message app to become a specified state. According to an embodiment, the first electronic device 100 may transmit an emoji, to which a function of becoming a specified state is set, to another electronic device (e.g., the second electronic device 200 of FIG. 1).

Figure 20:
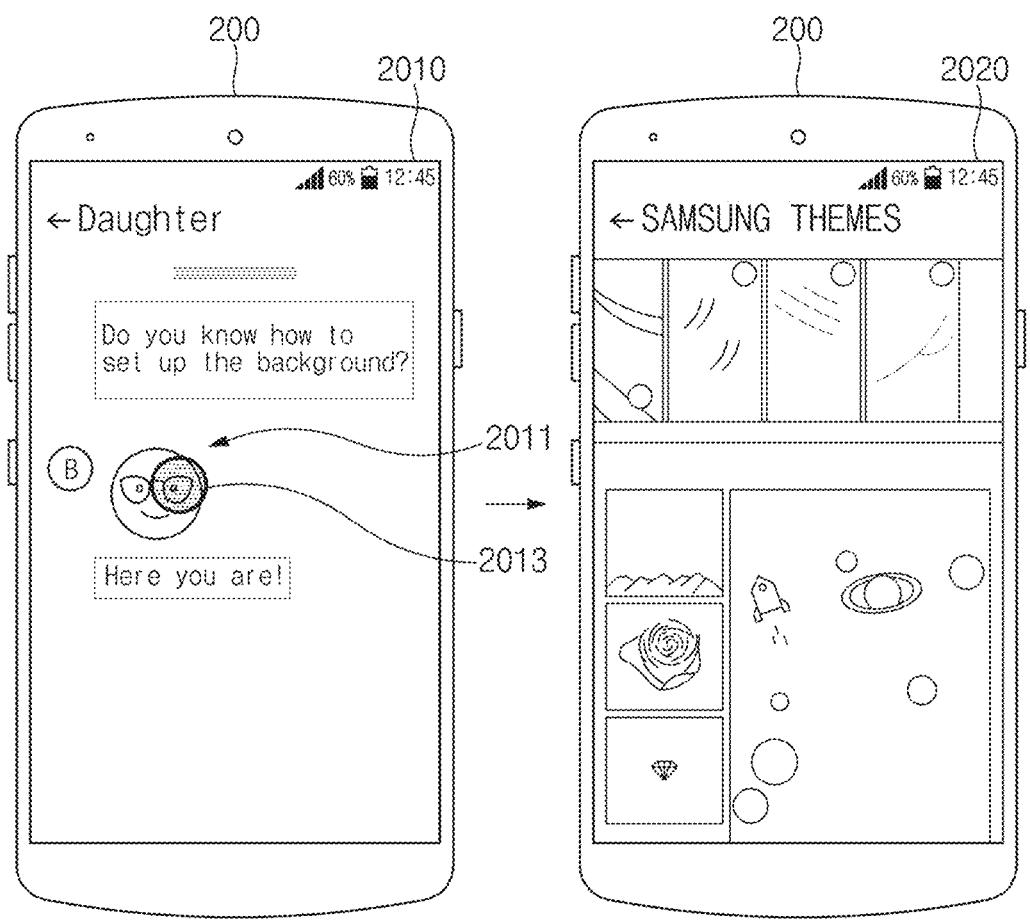
FIG. 20 is a view illustrating a screen, in which a second electronic device performs an operation of becoming a specified state of a received emoji, according to an embodiment.

FIG. 20 is a view illustrating a screen, in which a second electronic device performs an operation of becoming a specified state of a received emoji, according to an embodiment.

Referring to FIG. 20, the second electronic device 200 may receive an emoji, to which a function of becoming a specified state is set.

According to an embodiment, in screen 2010, the second electronic device 200 may receive an emoji 2011, to which a function (or a control function) of becoming a specified state is set. The second electronic device 200 may display the received emoji 2011 on the UI of a message app. According to an embodiment, the second electronic device 200 may receive a user input 2013 to select the emoji 2011, to which a function of becoming a specified state is set.

According to an embodiment, in screen 2020, the second electronic device 200 may become in a specified state by performing a specified operation depending on the received user input 2013. For example, the second electronic device may be in a state for setting up the background screen.

Accordingly, the second electronic device 200 may be in a specified state by performing a specified operation through an emoji.

Figure 21A:
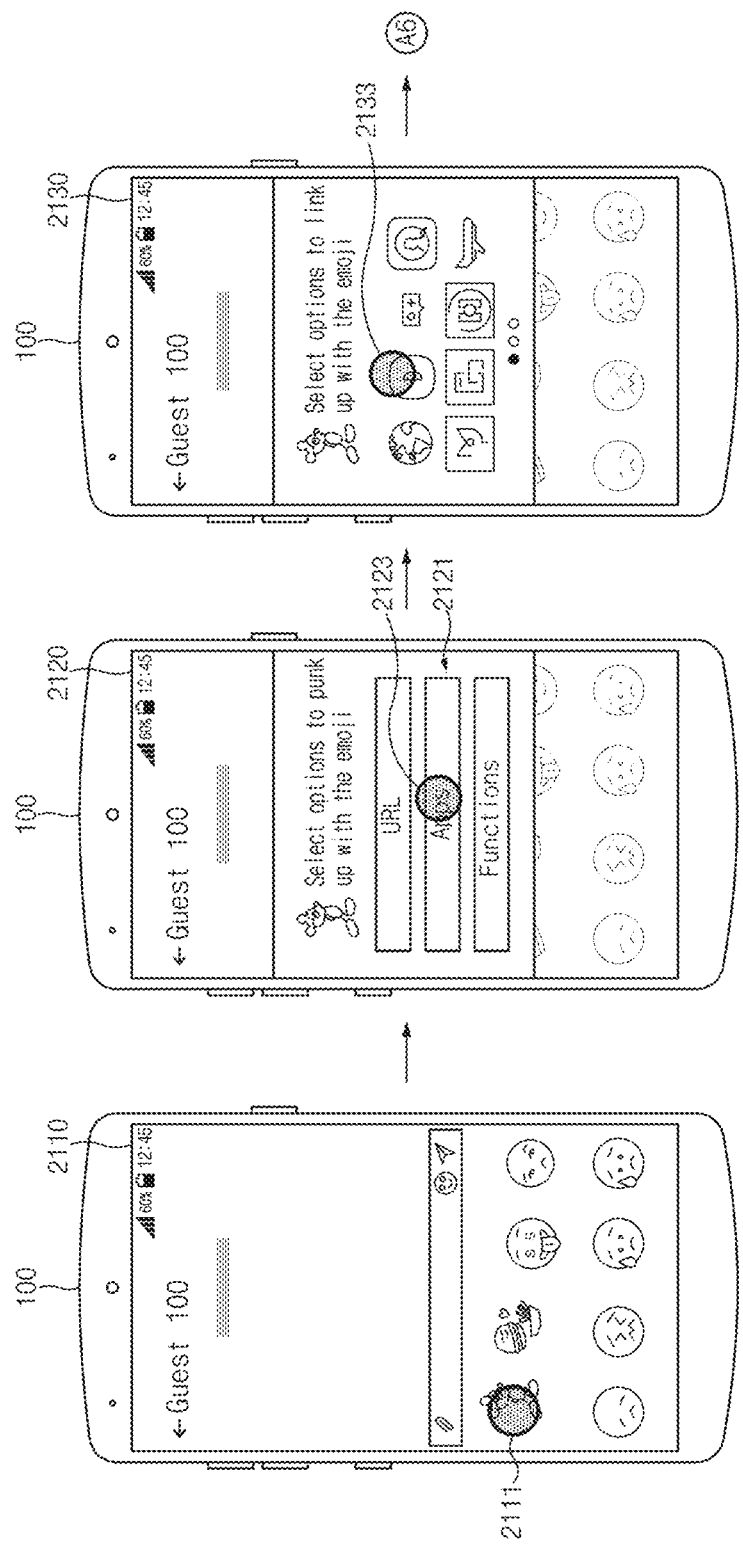
FIGS. 21A and 21B are views illustrating screens, in each of which a first electronic device sets an admission permission function to an emoji, according to an embodiment.
Figure 21B:
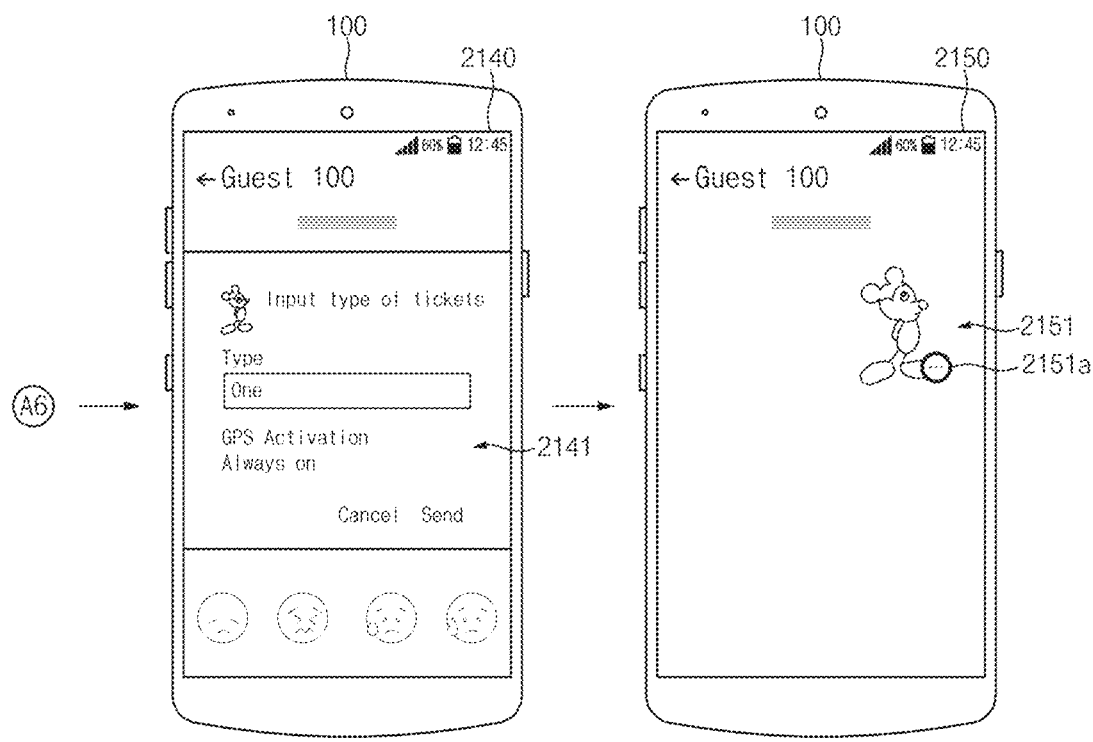

FIGS. 21A and 21B are views illustrating screens, in each of which a first electronic device sets an admission permission function to an emoji, according to an embodiment.

Referring to FIGS. 21A and 21B, the first electronic device 100 may set an admission permission function to the selected emoji. An operation of setting the admission permission function of the first electronic device 100 to an emoji may be similar to an operation of setting the function of unlocking a door lock of the first electronic device 100 of FIG. 15 to an emoji.

According to an embodiment, in screen 2110, the first electronic device 100 may receive a user input 2111 to select an emoji.

According to an embodiment, in screen 2120, the first electronic device 100 may display a method 2121 for setting an admission permission function to the selected emoji on a display and may receive a user input 2123 to select the displayed method 2121. For example, the first electronic device 100 may receive the user input 2123 to select a method in which an admission permission function is executed through an application.

According to an embodiment, in screen 2130, the first electronic device 100 may display an application 2131 capable of performing a specified function depending on the determined method on the display and may receive a user input 2133 to select an application for performing the admission permission function.

According to an embodiment, in screen 2140, the first electronic device 100 may display the UI of the selected application and may receive information 2141 about the authority capable of performing the function from the user to receive admission permission information. For example, the information 2141 about authority may include information about a period or a region.

According to an embodiment, in screen 2150, the first electronic device 100 may display an emoji 2151, to which the admission permission function is set, on the UI of the message app. The first electronic device 100 may display a state 2151a before the admission permission function is executed, on the emoji 2151.

Accordingly, the first electronic device 100 may transmit an emoji, to which a function of allowing admission is set, to another electronic device (e.g., the second electronic device 200 of FIG. 2).

Figure 22:
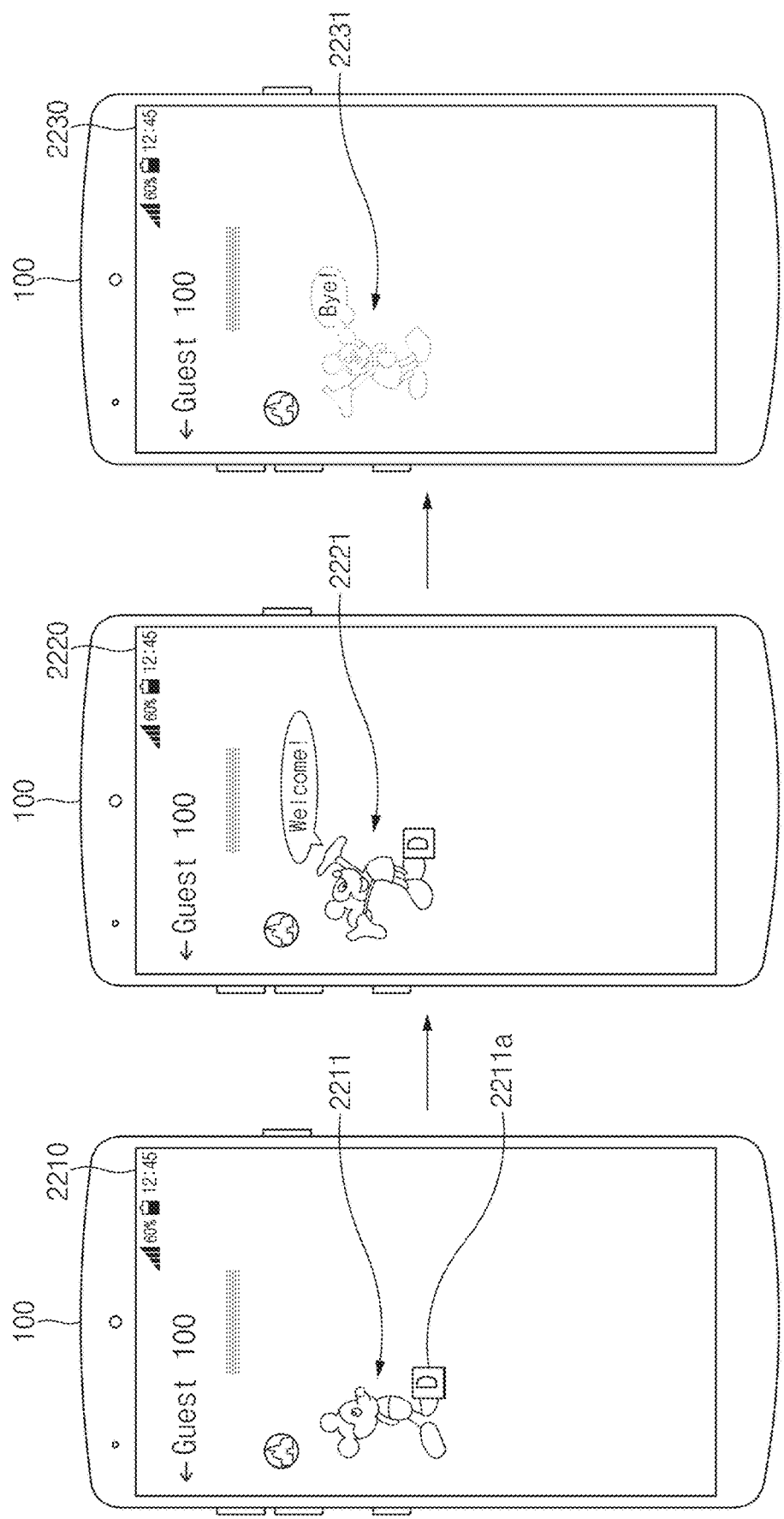
FIG. 22 is a diagram illustrating a screen, in which a reception device performs an admission permission function, according to an embodiment.

FIG. 22 is a diagram illustrating a screen, in which a reception device performs an admission permission function, according to an embodiment.

Referring to FIG. 22, the second electronic device 200 may receive an emoji, to which an admission permission function is set.

According to an embodiment, in screen 2210, the second electronic device 200 may display an emoji 2211, to which the admission permission function is set, on the UI of the message app. The second electronic device 200 may display an app 2111a performing an admission permission function on the emoji 2211. According to an embodiment, when recognizing the device for identifying admission authority, the second electronic device 200 may perform the admission permission function set to the emoji. For example, the second electronic device 200 may perform an admission permission function by transmitting or receiving information about the admission permission with a device for identifying the admission authority.

According to an embodiment, in screen 2220, when performing the entry function, the second electronic device 200 may change an emoji 2221 displayed on the UI of the message app to indicate the entered state.

According to an embodiment, in screen 2230, when a user leaves (or exits) from the specified area, the second electronic device 200 may change an emoji 2231 in which the UI of the message app is displayed, to an inactive state. For example, the inactivation state may be a state where the admission permission function is not capable of being performed through an emoji. According to an embodiment, the second electronic device 200 may identify that the user leaves from a specified region, using location information (e.g., one or more of global positioning system (GPS), cell network information, AP information, or gate access records).

Accordingly, the second electronic device 200 may perform the admission permission function set to the emoji.

Figure 23A:
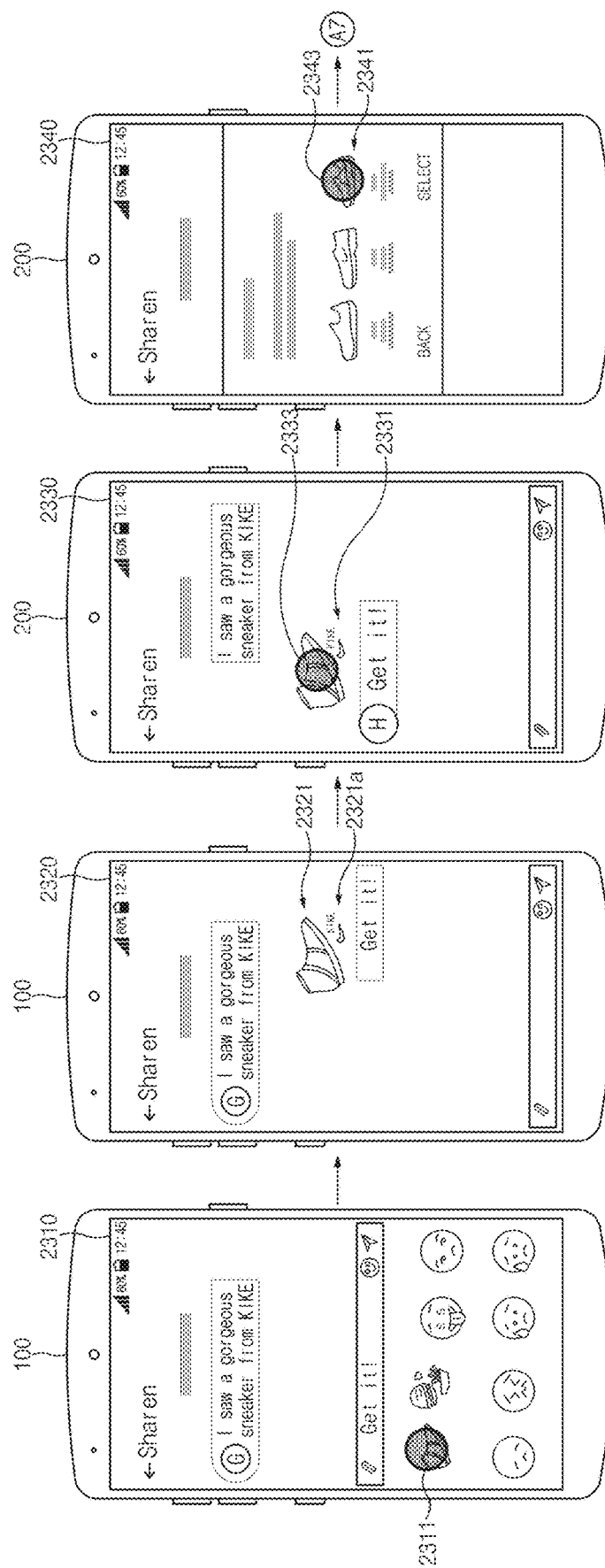
FIGS. 23A and 23B are views illustrating screens, in each of which a first electronic device transmits an emoji, to which a function of making a payment for specified goods is set, to a second electronic device, according to an embodiment.
Figure 23B:
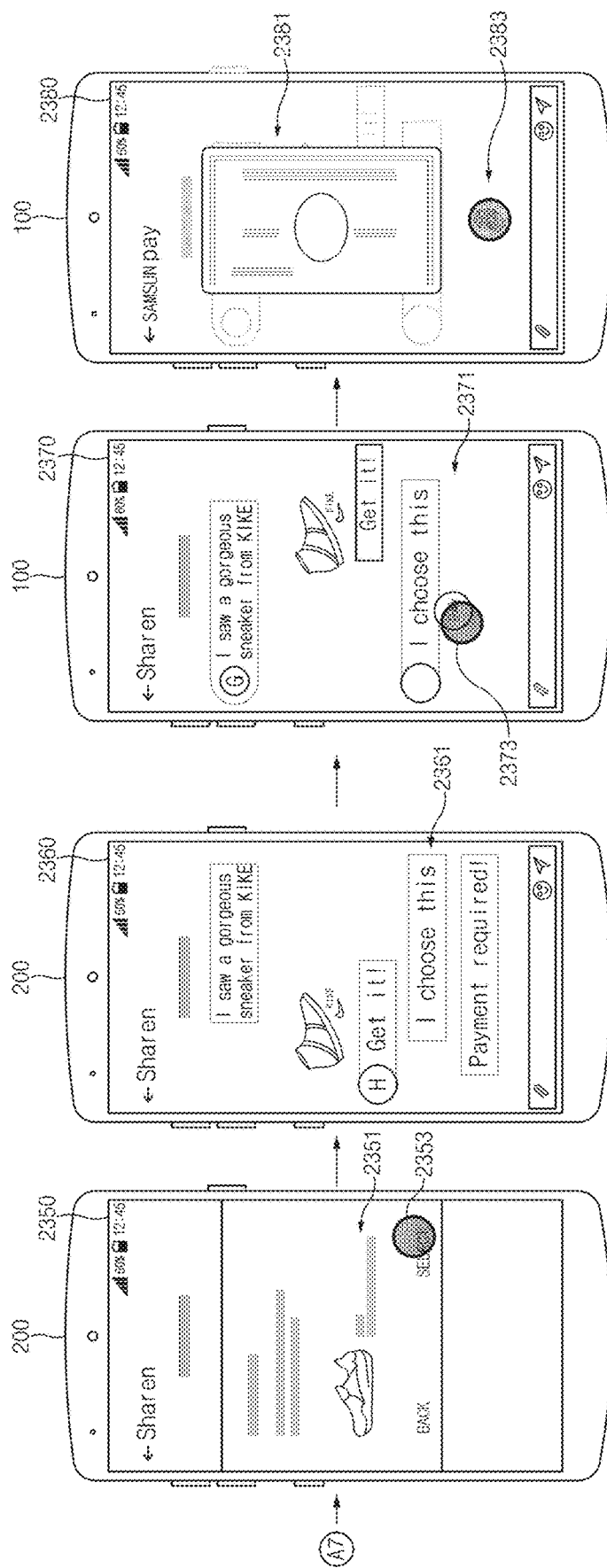

FIGS. 23A and 23B are views illustrating screens, in each of which a first electronic device transmits an emoji, to which a function of making a payment for specified goods is set, to a second electronic device, according to an embodiment.

Referring to FIGS. 23A and 23B, the first electronic device 100 may transmit an emoji, to which a function for making a payment for the product selected by a recipient is set, to the second electronic device 200. An operation of making a payment among the functions set to the emoji of the first electronic device 100 may be similar to the operation of making a payment of the first electronic device 100 of FIG. 9.

According to an embodiment, in screen 2310, the first electronic device 100 may receive a user input 2311 to select an emoji. For example, a function, in which a sender (or the first electronic device 100) provides information about a product of a specified brand to a recipient (or the second electronic device 200) and makes a payment for the product selected by a recipient, may be set to the emoji.

According to an embodiment, in screen 2320, the first electronic device 100 may display a selected emoji 2321 on the UI of a message app. For example, the first electronic device 100 may display a brand 2321a of a product capable of being selected, on the selected emoji 2321. According to an embodiment, the first electronic device 100 may transmit the selected emoji 2321 to the second electronic device 200.

According to an embodiment, in screen 2330, the second electronic device 200 may receive an emoji 2331 and may display the received emoji 2331 on the UI of the message app. According to an embodiment, the second electronic device 200 may receive a user input 2333 for performing a function set to the received emoji 2331.

According to an embodiment, in screen 2340, the second electronic device 200 may execute an application for providing product information and may display a selectable product 2341 on the UI of the executed application. According to an embodiment, in screen 1110, the second electronic device 200 may receive a user input 2343 for selecting a product.

According to an embodiment, in screen 2350, the second electronic device 200 may display detailed information 2351 of the selected product, on the UI of the executed application. According to an embodiment, the second electronic device 200 may receive a user input 2353 to make a request for a payment for the selected product.

According to an embodiment, in screen 2360, the second electronic device 200 may transmit a message 2361 for performing the function of making a payment for the selected product to the first electronic device 100.

According to an embodiment, in screen 2370, the first electronic device 100 may display a message 2371 for performing a function of making a payment for the selected product on the UI of the message app. According to an embodiment, the first electronic device 100 may receive a user input 2373 for performing the payment function.

According to an embodiment, in screen 2380, the first electronic device 100 may execute a payment app for performing a payment function and may display payment information 2381 on the UI of the payment app. According to an embodiment, the first electronic device 100 may perform user authentication 2383 for performing a payment function. Accordingly, the first electronic device 100 may make a payment for the product selected by the recipient.

Figure 24A:
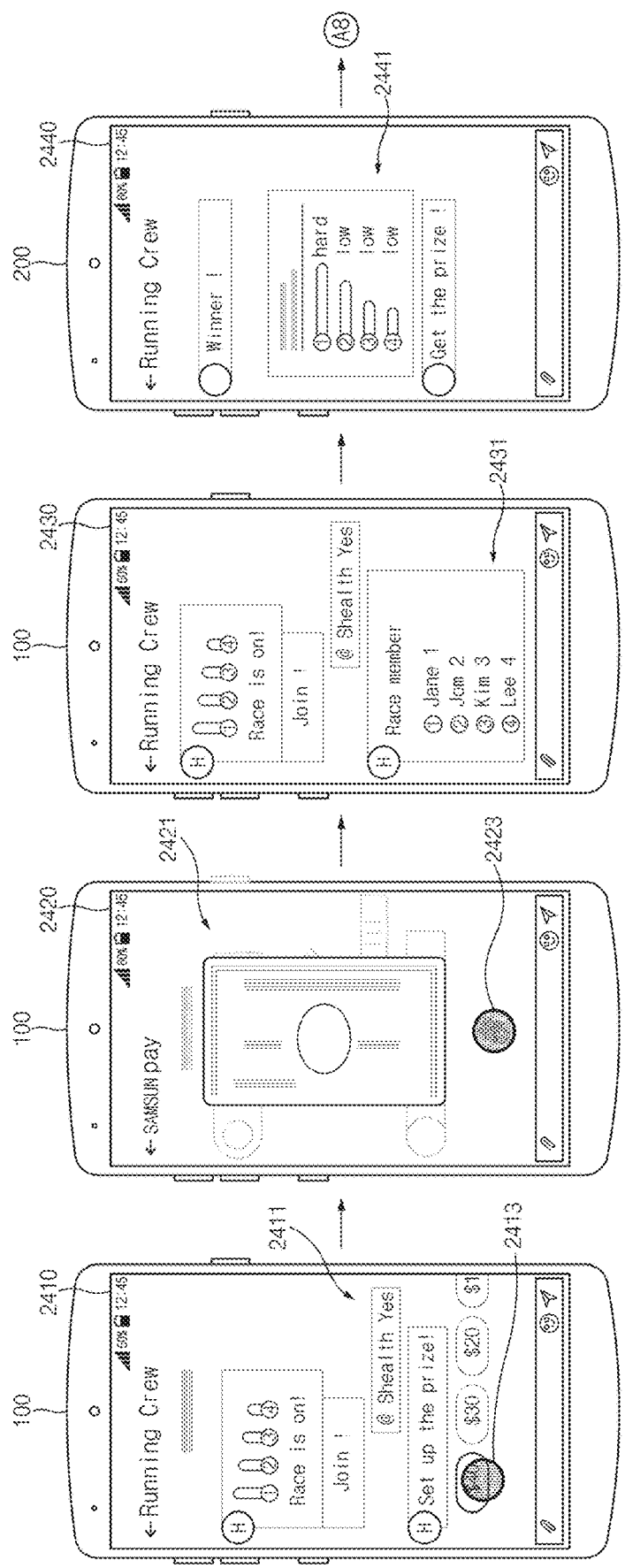
FIGS. 24A and 24B are views illustrating screens, in each of which a first electronic device transmits an emoji, to which a function of providing a reward is set, to a second electronic device, according to an embodiment.
Figure 24B:
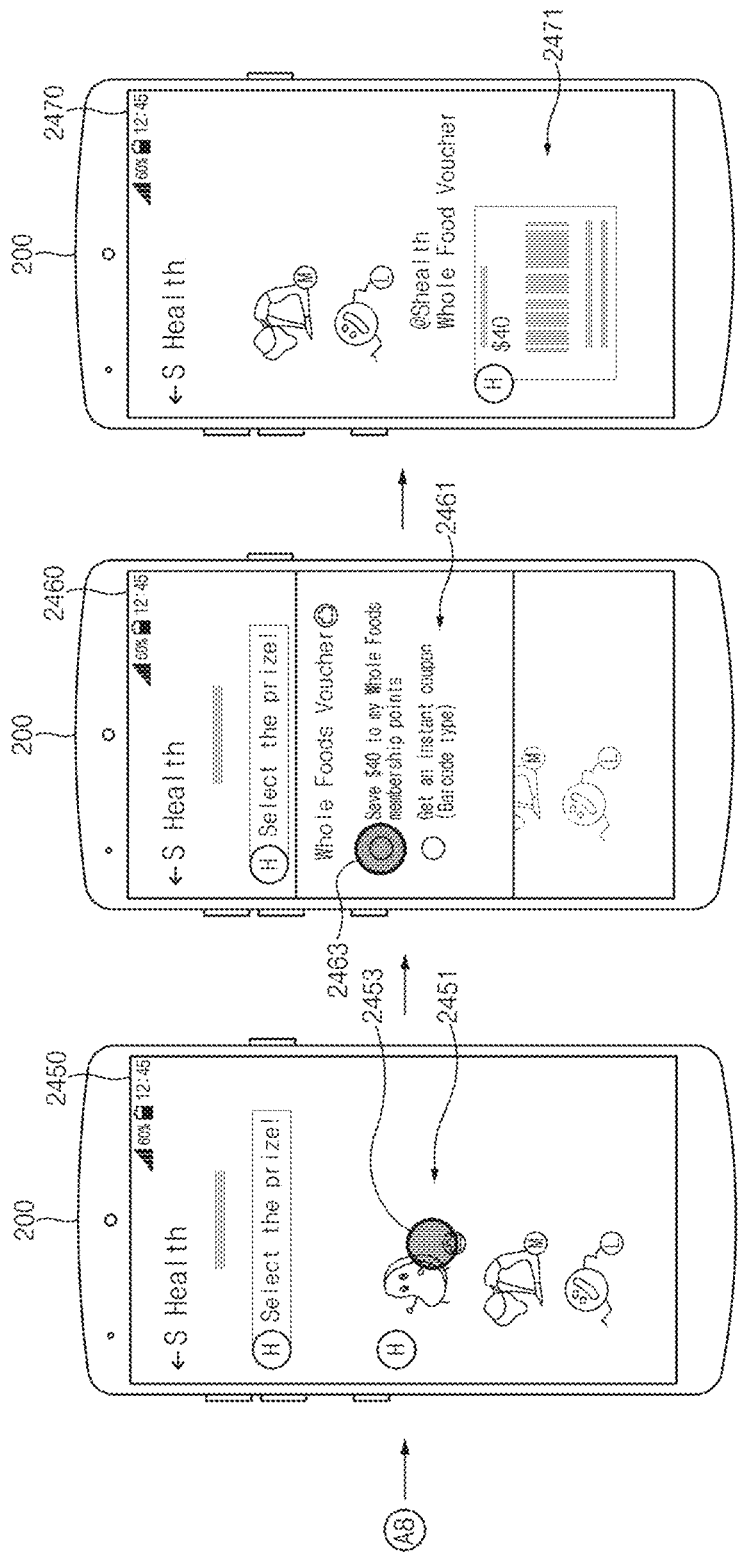

FIGS. 24A and 24B are views illustrating screens, in each of which a first electronic device transmits an emoji, to which a function of providing a reward is set, to a second electronic device, according to an embodiment.

Referring to FIGS. 24A and 24B, when achieving a specified goal, the first electronic device 100 may transmit an emoji, to which a function of providing a reward is set, to the second electronic device 200. An operation of setting the payment function of providing a reward to an emoji of the first electronic device 100 may be similar to an operation of setting a payment function to an emoji of the first electronic device 100 in FIG. 9.

According to an embodiment, in screen 2410, the first electronic device 100 may display a message 2411 for setting a specified goal and a reward on the UI of a message app. According to an embodiment, the first electronic device 100 may receive a user input 2413 for setting the reward. For example, the first electronic device 100 may receive the user input 2413 for setting a payment function to an emoji for providing the reward. For example, the user input 2413 may be an input to select a payment amount.

According to an embodiment, in screen 2420, the first electronic device 100 may execute an application for setting a payment function and may display the UI of an application, in which payment information 2421 is displayed, on a display. According to an embodiment, the first electronic device 100 may perform user authentication 2423 for performing a payment function.

According to an embodiment, in screen 2430, the first electronic device 100 may display information 2431 for achieving a specified purpose on the UI of the message app. According to an embodiment, in screen 2440, the second electronic device 200 may display information 2441 about a person (e.g., the user of the second electronic device 200) who has achieved the specified purpose, on the display.

According to an embodiment, in screen 2450, the first electronic device 100 may display an emoji 2451 for awarding the reward on the UI of the message app. According to an embodiment, the first electronic device 100 may receive a user input 2453 to select an emoji to which a function of providing a reward is set.

According to an embodiment, in screen 2460, the first electronic device 100 may execute an application for awarding a reward and may display information 2461 about the reward on the UI of the executed application. According to an embodiment, the first electronic device 100 may receive a user input 2463 to select the reward.

According to an embodiment, in screen 2470, the first electronic device 100 may execute the payment function set to the emoji to award the reward. According to an embodiment, the first electronic device 100 may provide a reward to a user. For example, the first electronic device 100 may display a message 2471 including reward information on the UI of the message app.

Figure 25:
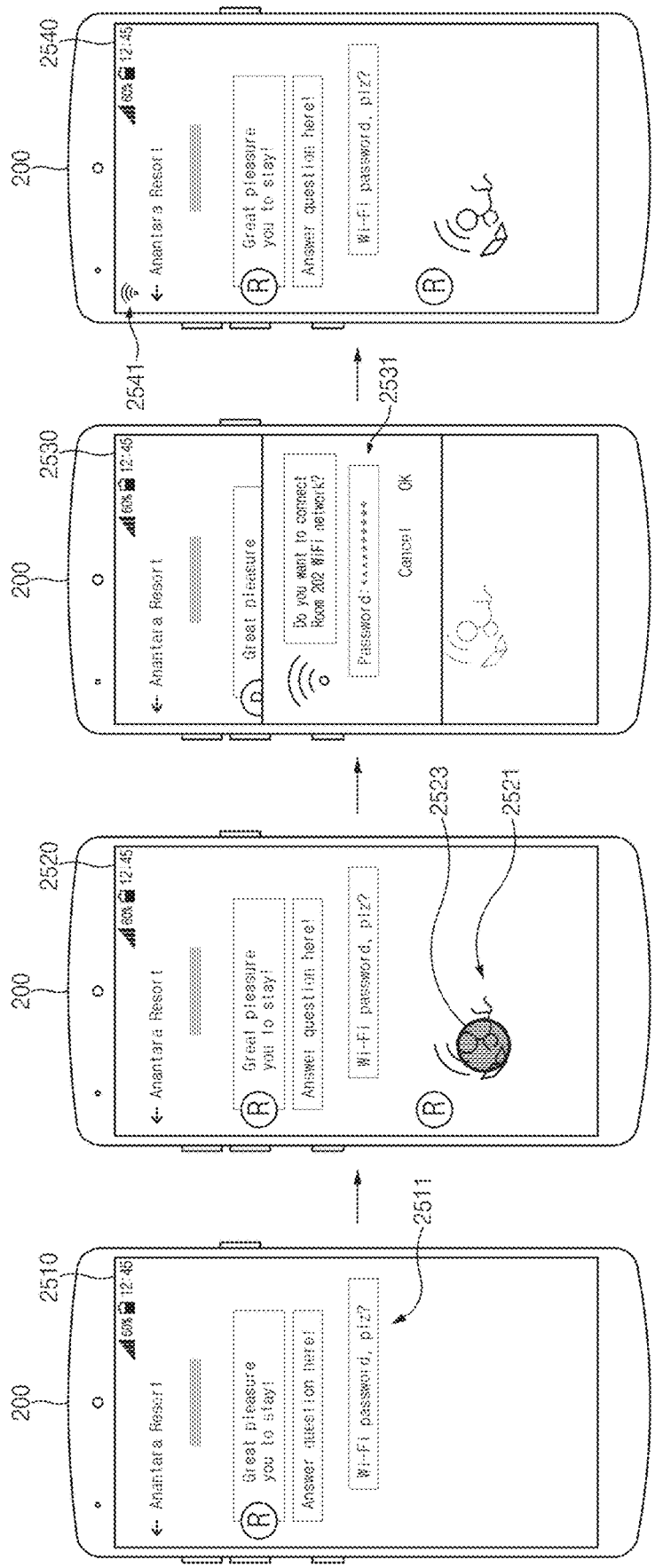
FIG. 25 is a diagram illustrating a screen, in which a second electronic device performs a network connection function set to a received emoji, according to an embodiment.

FIG. 25 is a diagram illustrating a screen, in which a second electronic device performs a network connection function set to a received emoji, according to an embodiment.

Referring to FIG. 25, the second electronic device 200 may perform a function for connecting to a Wi-Fi network through the received emoji.

According to an embodiment, in screen 2510, the second electronic device 200 may transmit a message 2511 for making a request for a Wi-Fi network connection to another electronic device (e.g., the first electronic device 100). The second electronic device 200 may display the message 2511 for making a request for a Wi-Fi network connection on the UI of a message app.

According to an embodiment, in screen 2520, the second electronic device 200 may receive an emoji 2521 to which a function of connecting to a Wi-Fi network is set. According to an embodiment, the second electronic device 200 may display the received emoji 2521 on the UI of the message app and may receive a user input 2523 for performing a function set to the emoji.

According to an embodiment, in screen 2530, the second electronic device 200 may execute an application for executing a function of connecting to a Wi-Fi network and may input connection authority information 2531 included in the emoji on the UI of the executed application. For example, the connection authority information 2531 may include password information for connecting to a specified Wi-Fi network.

According to an embodiment, in screen 2540, the second electronic device 200 may transmit connection authority information included in the emoji to the access point (AP) and may perform network connection. According to an embodiment, the second electronic device 200 may display a connected state 2541 on the display.

Figure 26:
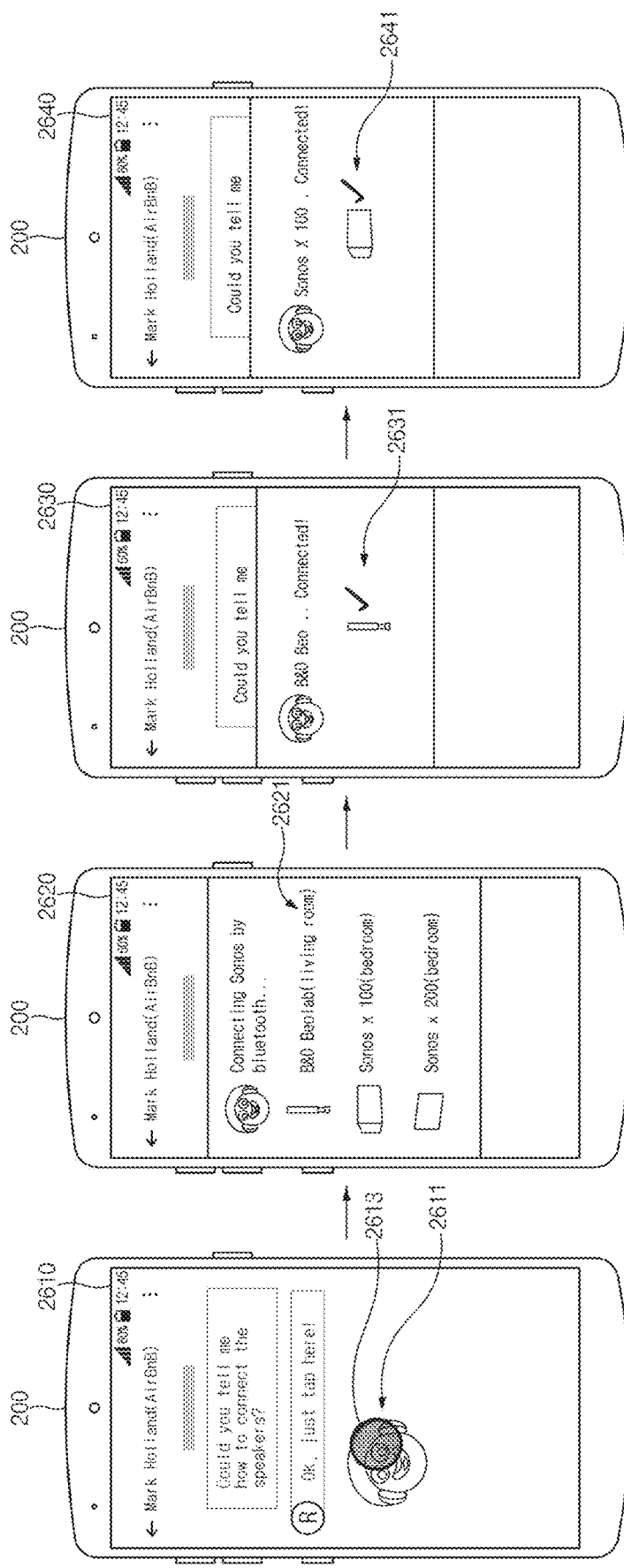
FIG. 26 is a diagram illustrating a screen, in which a second electronic device performs a wireless speaker connection function set to a received emoji, according to an embodiment.

FIG. 26 is a diagram illustrating a screen, in which a second electronic device performs a wireless speaker connection function set to a received emoji, according to an embodiment.

Referring to FIG. 26, the second electronic device 200 may perform a function of connecting to a wireless speaker through the received emoji.

According to an embodiment, in screen 2610, the second electronic device 200 may receive an emoji 2611, to which a function of connecting to a wireless speaker is set. According to an embodiment, the second electronic device 200 may receive a user input 2613 for performing the function set to the emoji.

According to an embodiment, in screen 2620, the second electronic device 200 may execute an application for performing the function of connecting to the speaker and may display information 2621 about the speaker capable of being connected wirelessly, on the UI of the executed application.

According to an embodiment, in screen 2630, the second electronic device 200 may establish a connection with a connectable speaker 2631, using connection information included in the emoji. According to an embodiment, in screen 2640, the second electronic device 200 may establish a connection with another connectable speaker 2641, using the connection information included in the emoji. The connectable speakers 2631 and 2641 may be determined based on a user's location.

Figure 27:
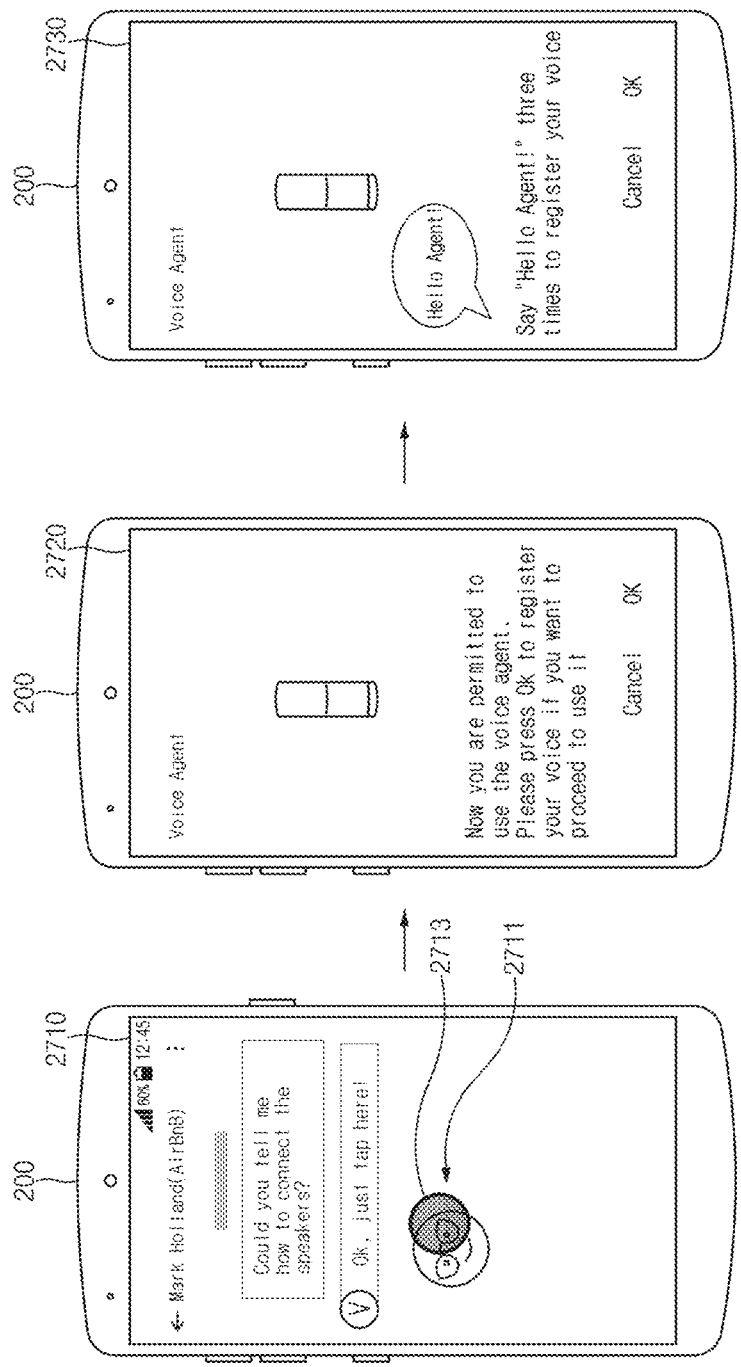
FIG. 27 is a diagram illustrating a screen, in which a second electronic device performs a voice agent setting function set to a received emoji, according to an embodiment.

FIG. 27 is a diagram illustrating a screen, in which a second electronic device performs a voice agent setting function set to a received emoji, according to an embodiment.

Referring to FIG. 27, the second electronic device 200 may perform a function for registering a user in a voice agent through the received emoji.

According to an embodiment, in screen 2710, the second electronic device 200 may receive an emoji 2711 to which a function for registering a user in the voice agent is set. According to an embodiment, the second electronic device 200 may receive a user input 2713 for performing the function set to the emoji.

According to an embodiment, in screen 2720, the second electronic device 200 may execute an application associated with the voice agent and may execute a user registration function, using the registration permission information included in the received emoji. According to an embodiment, in screen 2730, the second electronic device 200 may receive a user input for registering a user.

Figure 28:
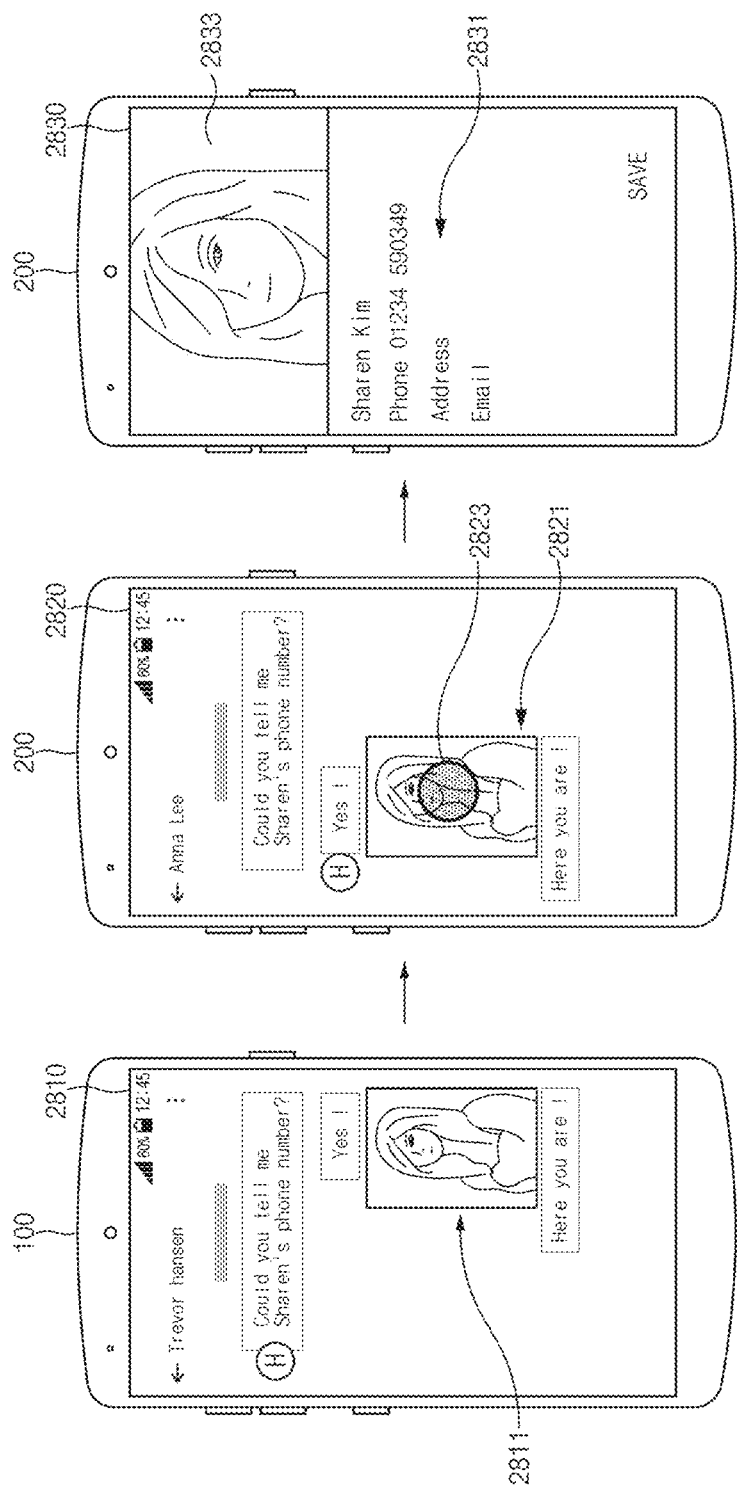
FIG. 28 is a view illustrating that a first electronic device transmits an image, to which a function of storing specified information is set, to the second electronic device, according to an embodiment.

In FIG. 28, a first electronic device according to an embodiment may transmit an image, to which a function of storing specified information is set, to the second electronic device.

Referring to FIG. 28, the first electronic device 100 may transmit an image, to which a function of storing contacts is set, to the second electronic device 200.

According to an embodiment, in screen 2810, the first electronic device 100 may set a function of storing contact information in an image 2811. The first electronic device 100 may display the image 2811 on the UI of a message app. According to an embodiment, the first electronic device 100 may transmit the image 2811, to which a function of storing the contact information is set, to the second electronic device 200.

According to an embodiment, in screen 2820, the second electronic device 200 may receive an image 2821, to which a function for storing the contact information is set. According to an embodiment, the second electronic device 200 may execute a message app and may display the received image 2821 on the UI of a message app. According to an embodiment, the second electronic device 200 may receive a user input 2823 for performing a function set to the image 2821.

According to an embodiment, in screen 2830, the second electronic device 200 may execute the contact app and may store contact information 2831 and image information 2833 included in the emoji.

Figure 29:
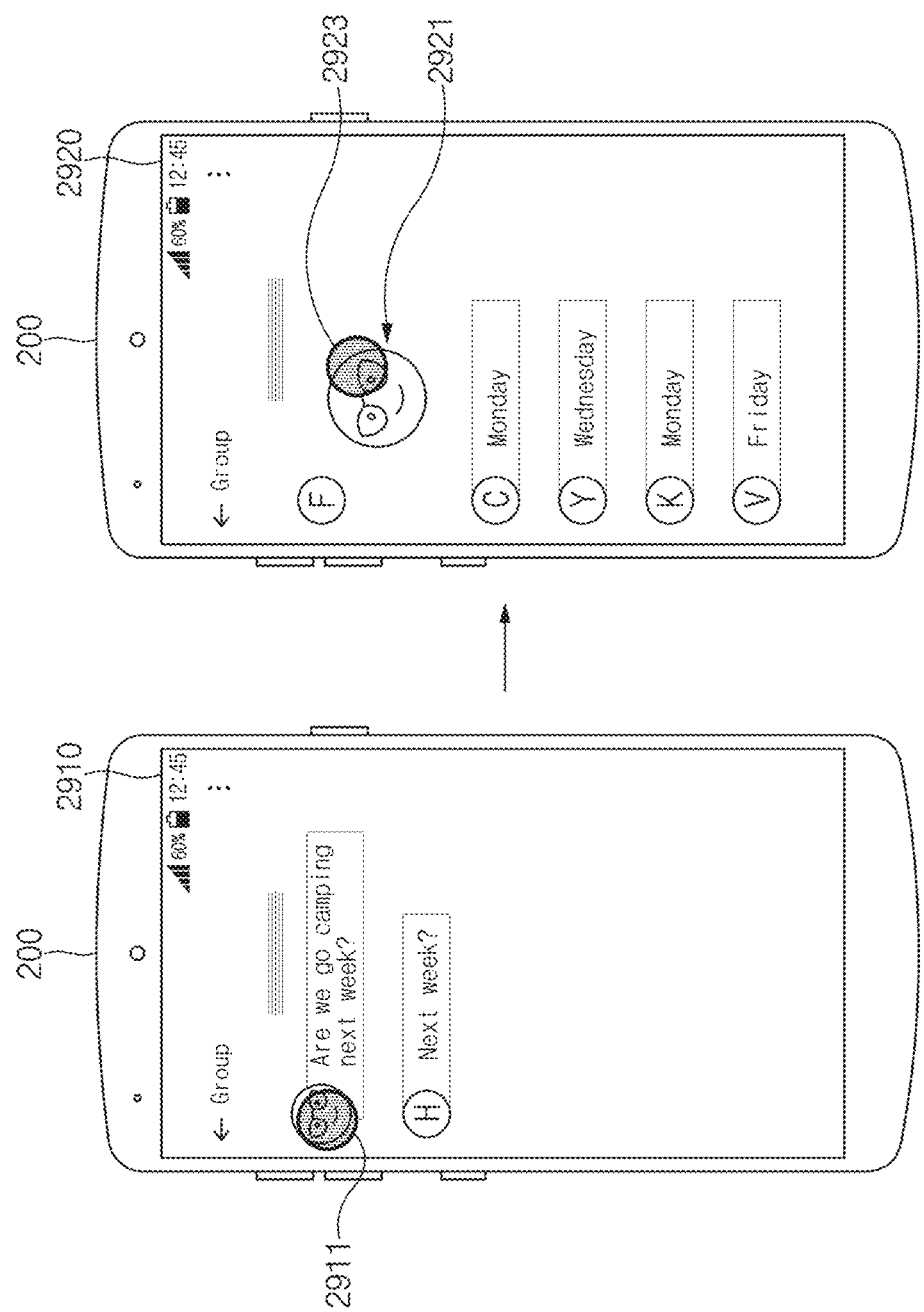
FIG. 29 is a view illustrating a screen in which a second electronic device displays an emoji, to which a specified function is set, depending on a user input on a display according to an embodiment.

FIG. 29 is a view illustrating a screen in which a second electronic device displays an emoji, to which a specified function is set, depending on a user input on a display according to an embodiment.

Referring to FIG. 29, when the second electronic device 200 fails to display the received emoji on the UI of a message app, the second electronic device 200 may display an indicator for displaying the emoji on the UI, on a display.

According to an embodiment, in screen 2910, to display the received message on the UI of a message app, the second electronic device 200 may delete the emoji displayed on the display. For example, the emoji may be an emoji, to which a specified function is set. According to an embodiment, the second electronic device 200 may display an indicator 2911 for again displaying the deleted emoji on the UI of the message app on the UI of the message app.

According to an embodiment, in screen 2920, when the second electronic device 200 receives a user input, the second electronic device 200 may display an emoji 2921, to which the specified function is set, on the UI of the message app. Accordingly, the second electronic device 200 may receive a user input 2923 for performing the function set to the emoji.

Figure 30:
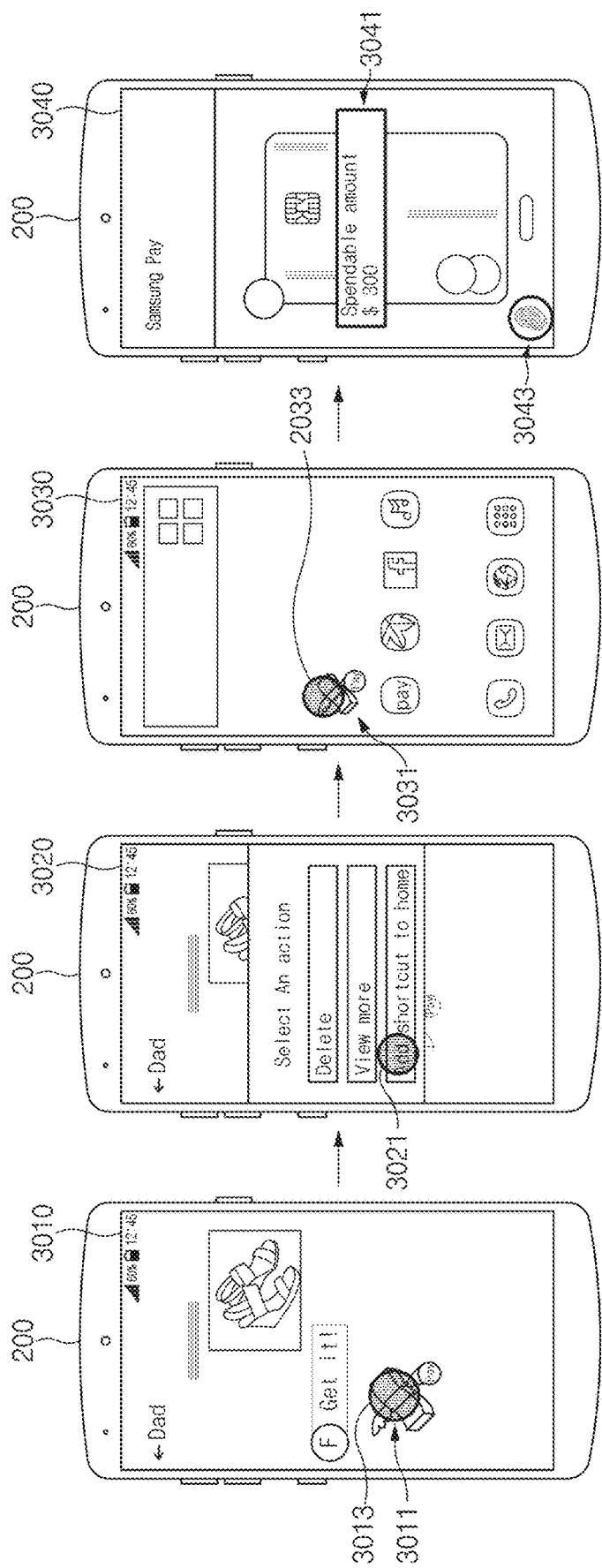
FIG. 30 is a view illustrating a screen in which a second electronic device displays an emoji, to which a specified function is set, on a specified page according to an embodiment.

FIG. 30 is a view illustrating a screen in which a second electronic device displays an emoji, to which a specified function is set, on a specified page according to an embodiment.

Referring to FIG. 30, the second electronic device 200 may display an indicator for performing a specified function while the indicator is linked to an emoji, to which a specified function is set, on a specified page.

According to an embodiment, in screen 3010, the second electronic device 200 may receive an emoji 3011, to which the specified function is set. For example, the specified function may be a payment function. According to an embodiment, the second electronic device 200 may receive a user input 3013 for performing an operation associated with the emoji 3011 displayed on the UI.

According to an embodiment, in screen 3020, the second electronic device 200 may display operation 3021 associated with the emoji 3011 on the display. For example, operation 3021 associated with the emoji 3011 may include executing the set function, deleting, and creating a shortcut. According to an embodiment, the second electronic device 200 may receive a user input for creating (or displaying) a shortcut linked to the emoji 3011 on a specified page. For example, the second electronic device 200 may generate a shortcut by displaying an indicator on the specified page.

According to an embodiment, in screen 3030, the second electronic device 200 may display the emoji 3011, to which the specified function is set, and a linked indicator 3031 on the specified page. For example, the specified pay may be a main page (or a home page). According to an embodiment, the second electronic device 200 may receive a user input 3033 to select the indicator 3031.

According to an embodiment, in screen 3040, the second electronic device 200 may perform a function set to the emoji. For example, the second electronic device 200 may perform a payment function. The second electronic device 200 may display payment related information 3041 on the UI of a payment app and may perform user authentication 3043.

According to various embodiments given with reference to FIGS. 1 to 30, when generating an emoji that makes it possible to perform the set function in a reception device, an electronic device may use information associated with the reception device. Accordingly, the electronic device may set various functions, to which security technologies requiring information about a recipient or the reception device need to be applied, in the emoji. Furthermore, the electronic device may set a function, which is executable by the reception device, to an emoji, using the information of the reception device, thereby preventing an error from occurring when a function set to the emoji is performed by the reception device.

Figure 31:
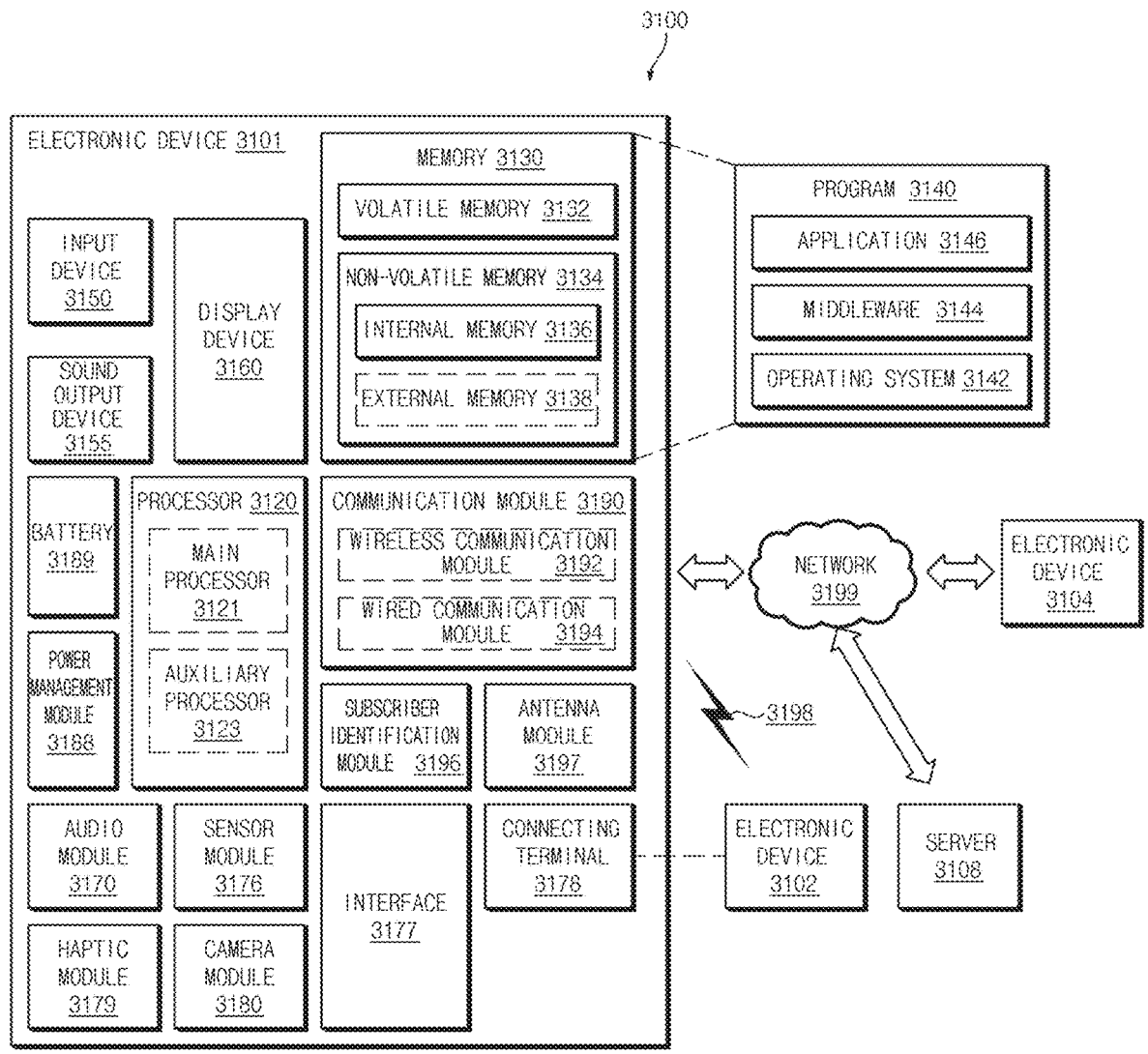
FIG. 31 is a block diagram illustrating an electronic device in a network environment according to various embodiments.

FIG. 31 is a block diagram illustrating an electronic device 3101 in a network environment 3100 according to various embodiments. Referring to FIG. 31, the electronic device 3101 in the network environment 3100 may communicate with an electronic device 3102 via a first network 3198 (e.g., a short-range wireless communication network), or an electronic device 3104 or a server 3108 via a second network 3199 (e.g., a long-range wireless communication network). According to an embodiment, the electronic device 3101 may communicate with the electronic device 3104 via the server 3108. According to an embodiment, the electronic device 3101 may include a processor 3120, memory 3130, an input device 3150, a sound output device 3155, a display device 3160, an audio module 3170, a sensor module 3176, an interface 3177, a haptic module 3179, a camera module 3180, a power management module 3188, a battery 3189, a communication module 3190, a subscriber identification module (SIM) 3196, or an antenna module 3197. In some embodiments, at least one (e.g., the display device 3160 or the camera module 3180) of the components may be omitted from the electronic device 3101, or one or more other components may be added in the electronic device 3101. In some embodiments, some of the components may be implemented as single integrated circuitry. For example, the sensor module 3176 (e.g., a fingerprint sensor, an iris sensor, or an illuminance sensor) may be implemented as embedded in the display device 3160 (e.g., a display).

The processor 3120 may execute, for example, software (e.g., a program 3140) to control at least one other component (e.g., a hardware or software component) of the electronic device 3101 coupled with the processor 3120, and may perform various data processing or computation. According to one embodiment, as at least part of the data processing or computation, the processor 3120 may load a command or data received from another component (e.g., the sensor module 3176 or the communication module 3190) in volatile memory 3132, process the command or the data stored in the volatile memory 3132, and store resulting data in non-volatile memory 3134. According to an embodiment, the processor 3120 may include a main processor 3121 (e.g., a central processing unit (CPU) or an application processor (AP)), and an auxiliary processor 3123 (e.g., a graphics processing unit (GPU), an image signal processor (ISP), a sensor hub processor, or a communication processor (CP)) that is operable independently from, or in conjunction with, the main processor 3121. Additionally or alternatively, the auxiliary processor 3123 may be adapted to consume less power than the main processor 3121, or to be specific to a specified function. The auxiliary processor 3123 may be implemented as separate from, or as part of the main processor 3121.

The auxiliary processor 3123 may control at least some of functions or states related to at least one component (e.g., the display device 3160, the sensor module 3176, or the communication module 3190) among the components of the electronic device 3101, instead of the main processor 3121 while the main processor 3121 is in an inactive (e.g., sleep) state, or together with the main processor 3121 while the main processor 3121 is in an active state (e.g., executing an application). According to an embodiment, the auxiliary processor 3123 (e.g., an image signal processor or a communication processor) may be implemented as part of another component (e.g., the camera module 3180 or the communication module 3190) functionally related to the auxiliary processor 3123.

The memory 3130 may store various data used by at least one component (e.g., the processor 3120 or the sensor module 3176) of the electronic device 3101. The various data may include, for example, software (e.g., the program 3140) and input data or output data for a command related thereto. The memory 3130 may include the volatile memory 3132 or the non-volatile memory 3134.

The program 3140 may be stored in the memory 3130 as software, and may include, for example, an operating system (OS) 3142, middleware 3144, or an application 3146.

The input device 3150 may receive a command or data to be used by other component (e.g., the processor 3120) of the electronic device 3101, from the outside (e.g., a user) of the electronic device 3101. The input device 3150 may include, for example, a microphone, a mouse, a keyboard, or a digital pen (e.g., a stylus pen).

The sound output device 3155 may output sound signals to the outside of the electronic device 3101. The sound output device 3155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 3160 may visually provide information to the outside (e.g., a user) of the electronic device 3101. The display device 3160 may include, for example, a display, a hologram device, or a projector and control circuitry to control a corresponding one of the display, hologram device, and projector. According to an embodiment, the display device 3160 may include touch circuitry adapted to detect a touch, or sensor circuitry (e.g., a pressure sensor) adapted to measure the intensity of force incurred by the touch.

The audio module 3170 may convert a sound into an electrical signal and vice versa. According to an embodiment, the audio module 3170 may obtain the sound via the input device 3150, or output the sound via the sound output device 3155 or a headphone of an external electronic device (e.g., an electronic device 3102) directly (e.g., wiredly) or wirelessly coupled with the electronic device 3101.

The sensor module 3176 may detect an operational state (e.g., power or temperature) of the electronic device 3101 or an environmental state (e.g., a state of a user) external to the electronic device 3101, and then generate an electrical signal or data value corresponding to the detected state. According to an embodiment, the sensor module 3176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 3177 may support one or more specified protocols to be used for the electronic device 3101 to be coupled with the external electronic device (e.g., the electronic device 3102) directly (e.g., wiredly) or wirelessly. According to an embodiment, the interface 3177 may include, for example, a high definition multimedia interface (HDMI), a universal serial bus (USB) interface, a secure digital (SD) card interface, or an audio interface.

A connecting terminal 3178 may include a connector via which the electronic device 3101 may be physically connected with the external electronic device (e.g., the electronic device 3102). According to an embodiment, the connecting terminal 3178 may include, for example, a HDMI connector, a USB connector, a SD card connector, or an audio connector (e.g., a headphone connector).

The haptic module 3179 may convert an electrical signal into a mechanical stimulus (e.g., a vibration or a movement) or electrical stimulus which may be recognized by a user via his tactile sensation or kinesthetic sensation. According to an embodiment, the haptic module 3179 may include, for example, a motor, a piezoelectric element, or an electric stimulator.

The camera module 3180 may capture a still image or moving images. According to an embodiment, the camera module 3180 may include one or more lenses, image sensors, image signal processors, or flashes.

The power management module 3188 may manage power supplied to the electronic device 3101. According to one embodiment, the power management module 3188 may be implemented as at least part of, for example, a power management integrated circuit (PMIC).

The battery 3189 may supply power to at least one component of the electronic device 3101. According to an embodiment, the battery 3189 may include, for example, a primary cell which is not rechargeable, a secondary cell which is rechargeable, or a fuel cell.

The communication module 3190 may support establishing a direct (e.g., wired) communication channel or a wireless communication channel between the electronic device 3101 and the external electronic device (e.g., the electronic device 3102, the electronic device 3104, or the server 3108) and performing communication via the established communication channel. The communication module 3190 may include one or more communication processors that are operable independently from the processor 3120 (e.g., the application processor (AP)) and supports a direct (e.g., wired) communication or a wireless communication. According to an embodiment, the communication module 3190 may include a wireless communication module 3192 (e.g., a cellular communication module, a short-range wireless communication module, or a global navigation satellite system (GNSS) communication module) or a wired communication module 3194 (e.g., a local area network (LAN) communication module or a power line communication (PLC) module). A corresponding one of these communication modules may communicate with the external electronic device via the first network 3198 (e.g., a short-range communication network, such as Bluetooth™ wireless-fidelity (Wi-Fi) direct, or infrared data association (IrDA)) or the second network 3199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips)

separate from each other. The wireless communication module 3192 may identify and authenticate the electronic device 3101 in a communication network, such as the first network 3198 or the second network 3199, using subscriber information (e.g., international mobile subscriber identity (IMSI)) stored in the subscriber identification module 3196.

The antenna module 3197 may transmit or receive a signal or power to or from the outside (e.g., the external electronic device) of the electronic device 3101. According to an embodiment, the antenna module 3197 may include an antenna including a radiating element composed of a conductive material or a conductive pattern formed in or on a substrate (e.g., PCB). According to an embodiment, the antenna module 3197 may include a plurality of antennas. In such a case, at least one antenna appropriate for a communication scheme used in the communication network, such as the first network 3198 or the second network 3199, may be selected, for example, by the communication module 3190 (e.g., the wireless communication module 3192) from the plurality of antennas. The signal or the power may then be transmitted or received between the communication module 3190 and the external electronic device via the selected at least one antenna. According to an embodiment, another component (e.g., a radio frequency integrated circuit (RFIC)) other than the radiating element may be additionally formed as part of the antenna module 3197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 3101 and the external electronic device 3104 via the server 3108 coupled with the second network 3199. Each of the electronic devices 3102 and 3104 may be a device of a same type as, or a different type, from the electronic device 3101. According to an embodiment, all or some of operations to be executed at the electronic device 3101 may be executed at one or more of the external electronic devices 3102, 3104, or 3108. For example, if the electronic device 3101 should perform a function or a service automatically, or in response to a request from a user or another device, the electronic device 3101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 3101. The electronic device 3101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 3140) including one or more instructions that are stored in a storage medium (e.g., internal memory 3136 or external memory 3138) that is readable by a machine (e.g., the electronic device 3101). For example, a processor(e.g., the processor 3120) of the machine (e.g., the electronic device 3101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
communication circuitry configured to connect to an external electronic device;
input circuitry configured to receive a user input;
a memory configured to store at least one application;
a display configured to display an image; and
a processor electrically connected to the communication circuitry, the input circuitry, the memory, and the display,
wherein the processor is configured to:
select a target application to be executed at the external electronic device based on a user input for selecting the target application,
set authority capable of performing the target application, wherein the authority includes restriction on at least one of a frequency, a period, and a region in which the target application is capable of being executed,
include first information associated with selected target application and second information associated with the authority in an emoji, and
transmit the emoji including the first information and the second information to the external electronic device through the communication circuitry, such that the external electronic device is instructed to execute the target application corresponding to the first information included in the emoji when the emoji is selected,
display the transmitted emoji in a first form on a user interface, UI, of an application that is stored in the memory and configured to transmit or receive a message,
when receiving information about a state where an execution of the target application is completed from the external electronic device, change the emoji displayed in the first form to a second form, and
when the frequency is set as the authority, display a remaining usable counts for the target application while the transmitted emoji is displayed, and
wherein the target application is different from an application that is stored in the external electronic device and configured to transmit or receive a message.

2. The electronic device of claim 1, wherein the processor is further configured to:
obtain information necessary to perform the target application, using identification information of the external electronic device.

3. The electronic device of claim 2, wherein the processor is further configured to:
transmit identification information of the external electronic device to an external server through the communication circuitry, and
receive the information necessary to perform a specified function from the external server.

4. The electronic device of claim 1, wherein the processor is further configured to:
determine a method of transmitting the emoji, based on information about a state of the external electronic device, and
transmit the emoji to the external electronic device depending on the determined method.

5. The electronic device of claim 4, wherein the processor is further configured to:
when receiving a user input for selecting the external electronic device, receive the information about a state of the external electronic device through the communication circuitry.

6. The electronic device of claim 5,
wherein the information about the state of the external electronic device includes at least one of hardware information and installed software information of the external electronic device, and
wherein the processor is further configured to:
determine at least one of a transmission format, a transmission protocol, and a transmission channel based on the information about the state of the external electronic device, in a transmission method of the emoji.

7. The electronic device of claim 1,
wherein the target application is associated with a payment function,
wherein the processor is further configured to:
perform user authentication for determining whether an agency capable of granting payment authority is correct,
when the user authentication is completed, transmit a request for obtaining information necessary to perform the payment function to a server providing a payment service through the communication circuitry, and
receive the information necessary to perform the payment function through the communication circuitry.

8. The electronic device of claim 7, wherein the request includes identification information of the electronic device, the identification information of the external electronic device, payment information, user authentication information, and information about a person receiving the payment authority and payment authority information.

9. The electronic device of claim 1,
wherein the target application is associated with a function of unlocking a door lock, and
wherein the processor is further configured to:
transmit identification information of the external electronic device to a server providing a service of unlocking the door lock through the communication circuitry, and
receive information necessary to unlock the door lock through the communication circuitry.

10. A method of an electronic device, the method comprising:
- selecting a target application to be executed at an external electronic device based on a user input for selecting the target application;
- setting authority capable of performing the target application, wherein the authority includes restriction on at least one of a frequency, a period, and a region in which the target application is capable of being executed;
- including first information associated with selected target application and second information associated with the authority in an emoji;
- transmitting the emoji including the first information and the second information to the external electronic device, such that the external electronic device is instructed to execute the target application corresponding to the first information included in the emoji when the emoji is selected;
- displaying the transmitted emoji in a first form on a user interface, UI, of an application that is stored in the electronic device and configured to transmit or receive a message;
- when receiving information about a state where an execution of the target application is completed from the external electronic device, changing the emoji displayed in the first form to a second form; and
- when the frequency is set as the authority, displaying a remaining usable counts for the target application while the transmitted emoji is displayed,
- wherein the target application is different from an application that is stored in the external electronic device and configured to transmit or receive a message.

11. The method of claim 10, further comprising:
- obtaining information necessary to perform the target application, using identification information of the external electronic device; and
- including the obtained information in the emoji.

12. The method of claim 11, further comprising:
- transmitting the identification information of the external electronic device to an external server; and
- receiving the information necessary to perform the target application from the external server.

13. The method of claim 10, further comprising:
- determining a method of transmitting the emoji, based on information about a state of the external electronic device; and
- transmitting the emoji to the external electronic device depending on the determined method.

14. The method of claim 13, further comprising:
- when receiving a user input for selecting the external electronic device, receive the information about a state of the external electronic device through communication circuitry.

15. The method of claim 13, wherein the information about the state of the external electronic device includes at least one of hardware information or installed software information of the external electronic device, and further comprising:
- determining at least one of a transmission format, a transmission protocol, or a transmission channel based on the information about the state of the external electronic device, in a transmission method of the emoji.

16. The method of claim 10, wherein the target application is associated with a payment function,
further comprising:
- performing user authentication for determining whether an agency capable of granting payment authority is correct;
- when the user authentication is completed, transmitting a request for obtaining information necessary to perform the payment function to a server providing a payment service through communication circuitry; and
- receiving the information necessary to perform the payment function through communication circuitry.

17. The method of claim 16, wherein the request includes identification information of the electronic device, the identification information of the external electronic device, payment information, user authentication information, and information about a person receiving the payment authority and payment authority information.

18. The method of claim 10, wherein the target application is associated with a function of unlocking a door lock, and
further comprising:
- transmitting identification information of the external electronic device to a server providing a service of unlocking the door lock through communication circuitry; and
- receiving information necessary to unlock the door lock through the communication circuitry.

* * * * *